US012640400B2

(12) United States Patent
Bao et al.

(10) Patent No.: US 12,640,400 B2
(45) Date of Patent: May 26, 2026

(54) LIQUID AND SOLID ELECTROLYTES WITH LITHIUM-FLUORINE SOLVATION STRUCTURE FOR LITHIUM-METAL BATTERIES

(71) Applicant: The Board of Trustees of the Leland Stanford Junior University, Stanford, CA (US)

(72) Inventors: Zhenan Bao, Stanford, CA (US); Yi Cui, Stanford, CA (US); Zhiao Yu, Stanford, CA (US); Snehashis Choudhury, Stanford, CA (US); Hansen Wang, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 915 days.

(21) Appl. No.: 17/773,578

(22) PCT Filed: Aug. 28, 2020

(86) PCT No.: PCT/US2020/048423
§ 371 (c)(1),
(2) Date: Apr. 29, 2022

(87) PCT Pub. No.: WO2021/086485
PCT Pub. Date: May 6, 2021

(65) Prior Publication Data

US 2023/0117171 A1 Apr. 20, 2023

Related U.S. Application Data

(60) Provisional application No. 62/928,638, filed on Oct. 31, 2019.

(51) Int. Cl.
*H01M 10/0569* (2010.01)
*H01M 10/0565* (2010.01)
*H01M 10/0525* (2010.01)

(52) U.S. Cl.
CPC ... *H01M 10/0569* (2013.01); *H01M 10/0565* (2013.01); *H01M 10/0525* (2013.01); *H01M 2300/0034* (2013.01)

(58) Field of Classification Search
CPC ............ H01M 4/587; H01M 10/0569; H01M 10/0565; H01M 2300/0034
See application file for complete search history.

(56) References Cited

U.S. PATENT DOCUMENTS

2004/0126668 A1 7/2004 Nishimura et al.
2016/0190647 A1* 6/2016 Seo .................. H01M 10/0569 429/339

(Continued)

FOREIGN PATENT DOCUMENTS

JP 2016-139512 A 8/2016
KP 10-2018-0026358 A 3/2018

OTHER PUBLICATIONS

Yue, "Synthesis and electrochemical properties of partially fluorinated ether solvents for lithium-sulfur battery electrolytes", 2018, Journal of Power Sources, 401, 271-277, https://doi.org/10.1016/j.jpowsour.2018.08.097 (Year: 2018).*

(Continued)

*Primary Examiner* — Mariee a Laios
*Assistant Examiner* — Ziheng Lu
(74) *Attorney, Agent, or Firm* — Foley & Lardner LLP

(57) ABSTRACT

Provided herein are solvents for an electrolyte of a battery comprising fluorinated compounds of the present disclosure, batteries comprising: an anode structure including an anode current collector, a cathode structure including a cathode (Continued)

current collector and a cathode material disposed on the cathode current collector, and the electrolyte of the disclosure. Also provided herein are layers of a battery, comprising a fluorinated polymer compounds of the present disclosure.

23 Claims, 48 Drawing Sheets

(56) References Cited

U.S. PATENT DOCUMENTS

| | | | | |
|---|---|---|---|---|
| 2018/0062206 | A1* | 3/2018 | Yang | H01M 4/382 |
| 2018/0076485 | A1 | 3/2018 | Zhang et al. | |
| 2022/0399574 | A1* | 12/2022 | Viswanathan | H01M 10/0569 |

OTHER PUBLICATIONS

Yu, "Molecular design for electrolyte solvents enabling energy-dense and long-cycling lithium metal batteries", Jul. 2020, Nature Energy, 5, 526-533, https://doi.org/10.1038/s41560-020-0634-5 (Year: 2020).*

Foreign Search Report on PCT PCT/US2020/048423 Dtd Mar. 30, 2021.

Zhigang Xue, et al. "Poly(ethylene oxide)-based electrolytes for lithium-ion batteries" Abstract, J. Mater. Chem. A, vol. 3, No. 38, https://doi.org/10.1039/C5TA03471J, Jul. 20, 2015, pp. 19218-19253.

* cited by examiner d

| Parameters | Cu\|\|NMC532 | Cu\|\|NMC622 | Cu\|\|NMC811 |
|---|---|---|---|
| Areal capacity (mAh cm⁻²) | ~2.9 | ~3.0 | ~3.8 |
| NMC : carbon : binder | 94.0 : 4.0 : 2.0 | 96.4 : 1.8 : 2.0 | 96.4 : 1.8 : 2.0 |
| Cycling voltage range (V) | 2.7-4.2 | 2.7-4.4 | 2.8-4.4 |
| Cycling rate | C/5 charge, C/3 discharge | | |
| External conditions | ~300 kPa external pressure, ~20 °C temperature | | |
| Total capacity (mAh) | ~190 | ~220 | ~250 |
| E/C ratio (g (Ah)⁻¹) | ~2.9 | ~2.5 | ~2.3 |

e Cu||NMC anode-free pouch cells a)

b)

a)

| #FSI | #DME | Probability (%) |
| --- | --- | --- |
| 1 | 2 | 8.2 |
| 2 | 1 | 13.2 |
| 2 | 2 | 17.9 |
| 3 | 0 | 1.5 |
| 3 | 1 | 41.2 |
| 3 | 2 | 1.8 |
| 4 | 0 | 7.7 |
| 4 | 1 | 6.0 |
| 5 | 0 | 2.0 |

Average FSI : DME in solvation sheath = 2.315 : 1 b)

c)

a)

| #FSI | #DMB | Probability (%) |
|---|---|---|
| 2 | 1 | 5.8 |
| 2 | 2 | 15.3 |
| 2 | 3 | 2.3 |
| 3 | 0 | 3.0 |
| 3 | 1 | 41.4 |
| 3 | 2 | 15.6 |
| 4 | 0 | 5.8 |
| 4 | 1 | 9.3 |

b)

Average solvation in solvation sheath FSI : DMB = 2.2940 1 c)

d)

a)

| #FSI | #FDMB | Probability (%) |
|---|---|---|
| 1 | 1 | 1.9 |
| 1 | 2 | 3.6 |
| 2 | 0 | 2.3 |
| 2 | 1 | 18.4 |
| 2 | 2 | 7.7 |
| 3 | 0 | 10.4 |
| 3 | 1 | 33.8 |
| 3 | 2 | 2.1 |
| 4 | 0 | 9.9 |
| 4 | 1 | 3.8 |
| 5 | 0 | 4.2 |
| 5 | 1 | 1.1 |

b)

Average solvation in solvation sheath FSI : FDMB ≈ 3.2930: 1

Cu|NMC532 coin cells, Cu side after charging a) 1 M LiFSI/FDMB 70 cycles b) 1 M LiFSI/DMB 10 cycles c) 1 M LiFSI/DME 10 cycles Li|NMC532 coin cells, Li side after discharging d) 1 M LiFSI/FDMB 100 cycles e) 1 M LiFSI/DMB 10 cycles f) 1 M LiFSI/DME 10 cycles Li metal soaked in three liquids for over one month

LIQUID AND SOLID ELECTROLYTES WITH LITHIUM-FLUORINE SOLVATION STRUCTURE FOR LITHIUM-METAL BATTERIES

CROSS-REFERENCE TO RELATED APPLICATIONS

This application is a 371 National Stage Entry of International Application No. PCT/US2020/048423, filed Aug. 28, 2020, which claims the benefit of and priority to U.S. Patent Application No. 62/928,638, filed on Oct. 31, 2019, the contents of which are incorporated herein in their entirety.

STATEMENT REGARDING FEDERALLY SPONSORED RESEARCH OR DEVELOPMENT

This invention was made with Government support under contract DE-AC02-76SF00515 awarded by the Department of Energy. The Government has certain rights in the invention.

BACKGROUND

With the rising spread of portable electronics and electrical vehicles, lithium (Li)-ion batteries have been a roaring success in the public market over the past few decades. However, as the specific energy (and energy density) of Li-ion batteries approaches the physicochemical limit, the Li-metal chemistry calls for imminent development to achieve higher specific energy. Albeit desired, Li-metal batteries encounter obstacles due to the constraint of an electrolyte. For the anode side, uncontrollable parasitic reactions between Li metal and electrolyte will form a heterogeneous and fragile solid-electrolyte interphase (SEI), cause Li dendrite or "dead Li" formation, lead to irreversible Li consumption, and finally lower the Coulombic efficiency (CE) and devastate the cycle life of Li-metal anodes. For the cathode side, the high voltage (usually >about 4 V) vastly constrains the choices of electrolytes since some electrolytes such as ether-based ones will be oxidized on the cathode. Therefore, to realize practical Li-metal batteries, it is highly desired to develop advanced electrolyte systems that are compatible with lithium-metal batteries and lithium-ion batteries.

It is against this background that a need arose to develop the embodiments described herein.

SUMMARY

In an aspect, the disclosure is related to a layer of a battery and/or a solvent for an electrolyte of a battery, which is a compound represented by the chemical formula (I):

(I)

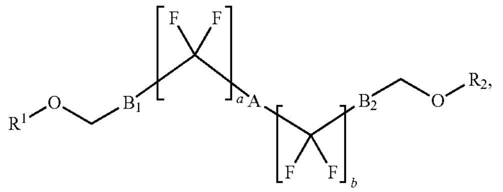

wherein $R_1$ and $R_2$ are independently selected from $C_1$-$C_5$ alkyl groups and silicon-containing groups, A is a bond or is selected from $C_1$-$C_{12}$ alkylene groups, silicon-containing groups, and ether groups, $B_1$ and $B_2$ are independently selected from bonds and $C_1$-$C_3$ alkylene groups, and a and b are independently 0 or 1. In some embodiments, $B_1$ and $B_2$ are bonds, and the compound is represented by the chemical formula:

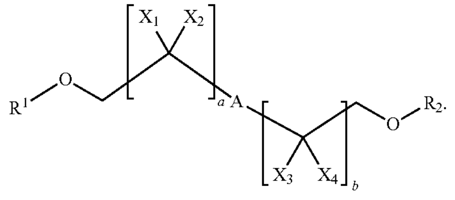

In some embodiments, A is a bond, and the compound is represented by the chemical formula:

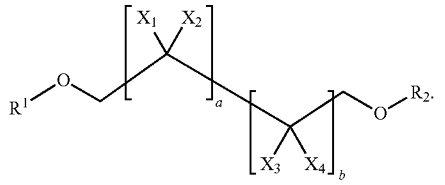

In some embodiments, $R_1$=$R_2$=methyl, and the compound is represented by the chemical formula:

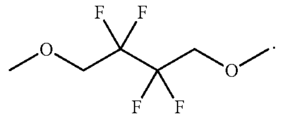

In some embodiments, a and b are 1. In some embodiments, a and b are 0, and $R_1$ and $R_2$ are selected from $CH_3$, $CF_3$, $CH_2CH_3$, and $CH_2CF_3$, wherein at least one of $R_1$ and $R_2$ is $CF_3$ or $CH_2CF_3$.

Additional embodiments include an electrolyte of a battery, comprising the compound of any embodiment herein, and (a) a lithium salt, potassium salt, sodium salt, or a mixture thereof; or (b) at least one of ethylene carbonate (EC), propylene carbonate (PC), dimethyl carbonate (DMC), diethyl carbonate (DEC), ethyl methyl carbonate (EMC), vinyl carbonate (VC), fluoroethylene carbonate (FEC), difluoroethylene carbonate (DFEC), 1,2-dimethyoxylethane (DME), 1,3-dioxolane (DOL), 1,4-dioxane (DOX), tetrahydrofuran (HF), 1,3,2-dioxathiolane-2,2-dioxide (DTD), 1,3-propanesultone (PS), acetonitrile (AN), ethyl acetate (EA), methyl acetate (MA), methyl propanoate (MP), succinonitrile (SN), Trimethyl phosphate (TMP), triethyl phosphate (TEP); tris(trimethylsilyl)phosphate (TTSP), prop-1-ene-1,3-sultone (PES), ethylene sulfite (ES), 1,4-butane sultone (BS), dimethyl sulfoxide (DMSO), methylene methanedisulfonate (MMDS), N,N-Dimethylformamide (DMF), and gamma-butyrolactone (BL). In some embodiments, an amount of the solvent in the electrolyte is at least about 60% by weight of a total weight of the electrolyte.

Additional embodiments include a battery comprising: an anode structure including an anode current collector; a cathode structure including a cathode current collector and a cathode material disposed on the cathode current collector; and the electrolyte of any embodiment herein disposed between the anode structure and the cathode structure. In some embodiments, the anode structure further includes an anode material disposed on the anode current collector, and the anode material includes lithium metal, graphite, silicon, or a graphite/silicon composite anode.

Additional embodiments include a layer of a battery, comprising a polymer which includes a backbone and side chains bonded to the backbone, and at least one of the side chains includes a moiety represented by the chemical formula:

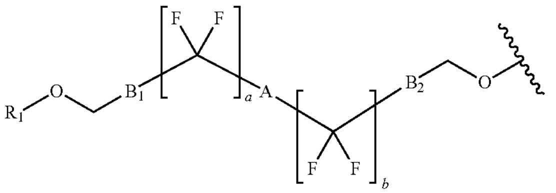

wherein $R_1$ is selected from $C_1$-$C_5$ alkyl groups and silicon-containing groups, A is a bond or is selected from $C_1$-$C_{12}$ alkylene groups, silicon-containing groups, and ether groups, $B_1$ and $B_2$ are independently selected from bonds and $C_1$-$C_3$ alkylene groups, and a and b are independently 0 or 1. In some embodiments, a and b are 1. In some embodiments, a and b are 0, and $R_1$ is selected from $CF_3$ and $CH_2CF_3$.

Additional embodiments include a layer of a battery, comprising a polymer which is represented by the chemical formula:

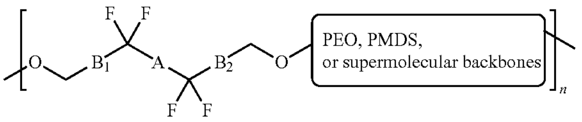

wherein A is a bond or is selected from $C_1$-$C_{12}$ alkylene groups, silicon-containing groups, and ether groups, $B_1$ and $B_2$ are independently selected from bonds and $C_1$-$C_3$ alkylene groups, and n is an integer that is 1 or greater than 1.

Additional embodiments include a layer of a battery, comprising a polymer which is represented by the chemical formula:

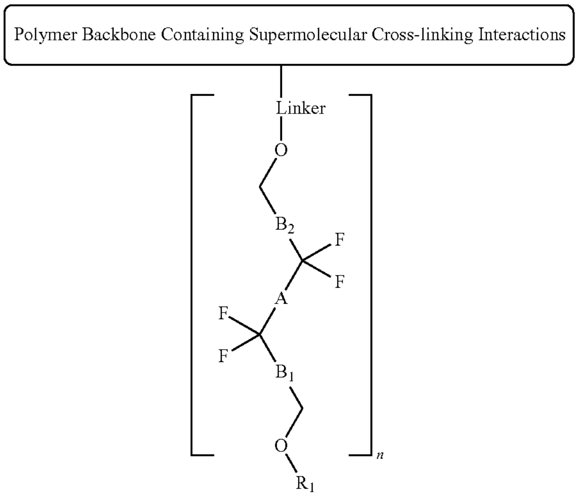

wherein $R_1$ is selected from $C_1$-$C_5$ alkyl groups and silicon-containing groups, A is a bond or is selected from $C_1$-$C_{12}$ alkylene groups, silicon-containing groups, and ether groups, $B_1$ and $B_2$ are independently selected from bonds and $C_1$-$C_3$ alkylene groups, and n is an integer that is 1 or greater than 1.

Additional embodiments include a layer of a battery, comprising a polymer which is represented by the chemical formula:

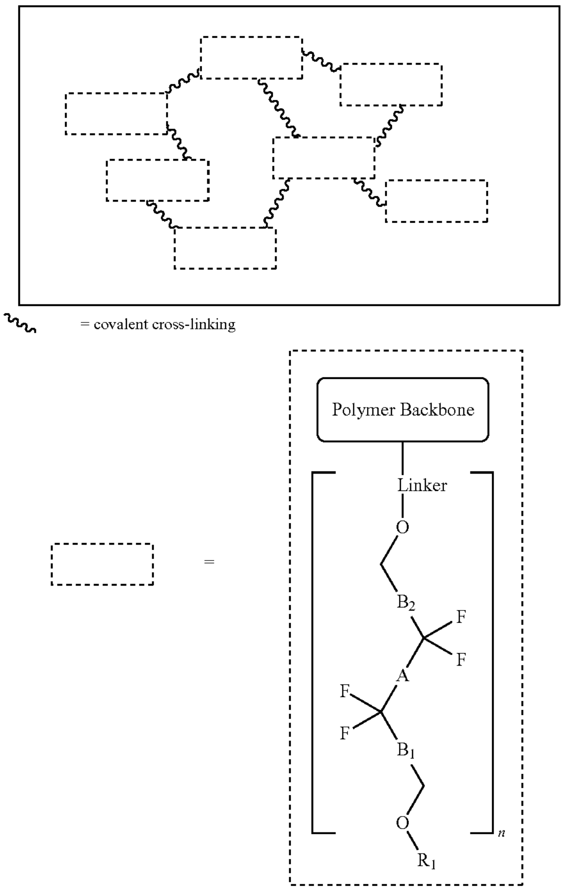

wherein $R_1$ is selected from $C_1$-$C_5$ alkyl groups and silicon-containing groups, A is a bond or is selected from $C_1$-$C_{12}$ alkylene groups, silicon-containing groups, and ether groups, $B_1$ and $B_2$ are independently selected from bonds and $C_1$-$C_3$ alkylene groups, and n is an integer that is 1 or greater than 1.

Additional embodiments include a battery comprising: an anode structure including an anode current collector; a cathode structure including a cathode current collector and a cathode material disposed on the cathode current collector; and the layer of any embodiment herein disposed as a solid electrolyte between the anode structure and the cathode structure. In some embodiments, the anode structure further includes an anode material disposed on the anode current collector, and the anode material includes lithium metal, graphite, silicon, or a graphite/silicon composite.

Additional embodiments include an electrode structure comprising: a current collector, and the layer of any embodiment herein disposed as an interfacial coating on the current collector. In some embodiments, the electrode structure further comprises an electrode material disposed between the current collector and the interfacial coating.

Additional embodiments include a layer of a battery comprising a compound of Formula (I), or an oligomer or polymer or 2D polymer or inorganic organic framework that incorporates the compound of Formula (I), (I)

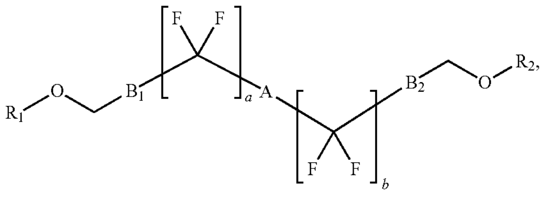

wherein $R_1$ and $R_2$ are independently selected from $C_1$-$C_5$ alkyl groups and silicon-containing groups, A is a bond or is selected from $C_1$-$C_{12}$ alkylene groups, silicon-containing groups, and ether groups, $B_1$ and $B_2$ are independently selected from bonds and $C_1$-$C_3$ alkylene groups, and a and b are independently 0 or 1. In some embodiments, the compound of Formula (I) is incorporated into an oligomer or polymer or 2D polymer or inorganic organic framework through a bond and optional linker at $R_1$ and/or $R_2$.

Additional embodiments include the layer of a battery of any embodiment herein, wherein the layer of the battery is a binder of a battery electrode, an ex-situ independent coating layer on the surface of a battery electrode, a chemically linked/modified layer(s) on the surface of a battery electrode or a matrix for an inorganic organic composite electrolyte.

BRIEF DESCRIPTION OF THE DRAWINGS

FIGS. 1*a-c*, show design scheme and molecular structures of three liquids studied in this example: DME (FIG. 1*a*), DMB (FIG. 1*b*), and FDMB (FIG. 1*c*). FIG. 1*d* shows a comparison of HOMO levels and oxidation voltages ($E_{ox}$) of three simulated electrolytes. Considering the calculation complexity, 2 M LiFSI electrolytes were used as representatives. FIG. 1*e* shows physicochemical properties of three about 1 M LiFSI electrolytes. The boiling point (b.p.) refers to that of pure liquid. Figure if shows optical image showing FDMB (left) and about 1 M LiFSI/FDMB electrolyte with special color (right).

FIG. 2*a* shows optical image of three liquids and their about 1 M LiFSI electrolytes. FIG. 2*b* shows single crystal of LiTf/FDMB showing Li—F interactions between $Li^+$ ion and F atom on FDMB. For clarity, just one LiTf and one FDMB are shown. c-e, ESP comparison of DME (FIG. 2*c*), DMB (FIG. 2*d*), and FDMB (FIG. 26). FIGS. 2*f-h* shows solvation structure of about 1 M LiFSI/DME (FIG. 2*f*), 1 M LiFSI/DMB (FIG. 2*g*), and 1 M LiFSI/FDMB (FIG. 2*h*) given by MD simulations and the corresponding average ratio of solvation bindings from $FSI^-$ anions to those from solvents in the solvation sheath. FIG. 2*i* shows $^{19}$F-NMR of LiFSI/FDMB electrolytes. FIG. 2*j* shows UV-vis spectra of about 1 M LiFSI/FDMB. FIG. 2*k* shows a logic flow of the structure-property relationship. Color scheme of in FIG. 2*b*, and FIGS. 2*f-h*: dark gray, Li; pink, F; red, O; light blue, C; navy, N; yellow, S. For clarity, all H atoms are faded in FIG. 2*b*, and FIGS. 2*f-h*.

FIG. 3*a* shows oxidation voltage of three electrolytes in Li|Al half cells detected by LSV. FIG. 3*b* shows a comparison of Li metal CE in Li|Cu half cells using different electrolytes.

FIGS. 4*a-d* show Li morphology in anode-free Cu|NMC532 coin cells using about 1 M LiFSI/DME after 10 cycles (FIG. 4*a*), about 1 M LiFSI/DMB after 10 cycles (FIG. 4*b*), and about 1 M LiFSI/FDMB after 70 cycles (FIGS. 4*c,d*). FIG. 4*e,f* show cryo-EM images showing the SEI of about 1 M LiFSI/DME (FIG. 4*e*) and about 1 M LiFSI/FDMB (FIG. 4*f*). FIG. 4*g* shows F is XPS depth profiles of Li metal surface in about 1 M LiFSI/DME (left) and about 1 M LiFSI/FDMB (right). FIG. 4*h* shows Li metal SEI composition in about 1 M LiFSI/FDMB given by Cryo-EM/EDS.

FIG. 5*a* shows configurations of practical Li-metal batteries. b,c, Li-metal full battery performance (about 50 μm thin Li in FIG. 5*b* and about 20 μm thin Li in FIG. 5*c*). Before cycling at C/3, three pre-cycles at C/10 were conducted. The average CE was calculated from the $5^{th}$ to the final cycle. Accident 1: over-cooled from about 25° C. to about 18° C.; accident 2 and accident 3: cooling system down for two days, drastically from room temperature to >about 40° C. FIG. 5*d* shows anode-free pouch cell parameters. The areal capacities are based on the corresponding cycling voltage ranges. FIG. 5*e* shows anode-free pouch cell performance. The specific energy was calculated based on the real mass of the whole pouch cell. Before cycling at C/5 charge and C/3 discharge, two pre-cycles at C/10 charge and C/3 discharge were conducted.

(FIGS. 7*a,c,e*) Potentiostatic polarization (about 20 mV) curves of different electrolytes. (FIGS. 7*b,d,f*) Electrochemical impedance spectra of different electrolytes before and after measurements.

FIG. 9(*a*) about 1 M LiFSI/DME; FIG. 9(*b*) about 1 M LiFSI/DMB; FIG. 9(*c*) about 1 M LiFSI/FDMB.

FIG. 14*a* shows all cases of FSI– and DME numbers in the solvation sheath and corresponding probability. FIGS. 14*b,c* show two snapshots of the solvation sheath.

FIG. 15*a* all cases of $FSI^-$ and DMB numbers in the solvation sheath and corresponding probability. FIGS. 15(*b-d*) Three snapshots of the solvation sheath.

Figure 34:
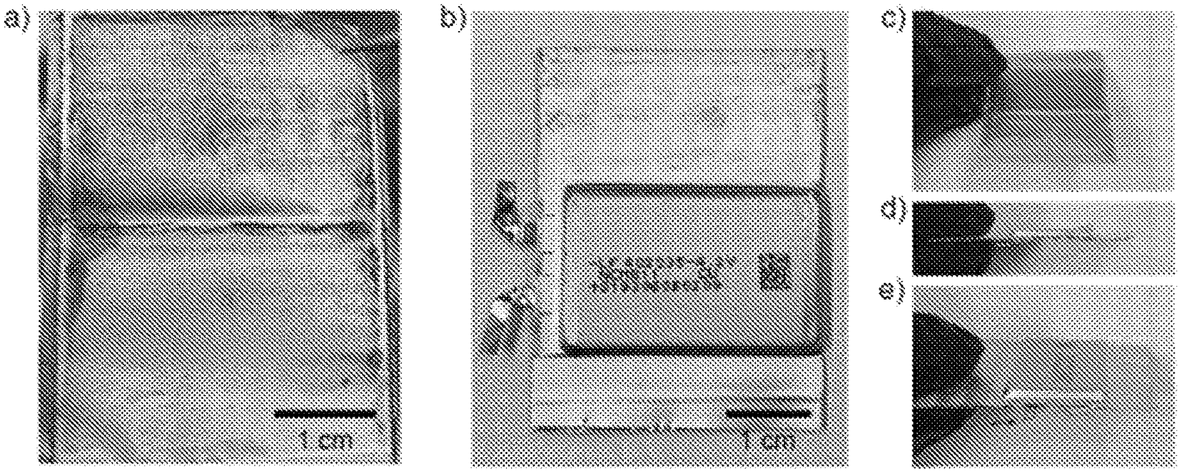

FIG. 34 shows (a) Cu side (after charging, Li metal was deposited on Cu) of the Cu|NMC811 pouch cell after 100 cycles. (b-e) Optical images of the Cu|NMC811 pouch cell after 100 cycles.

Figure 35:
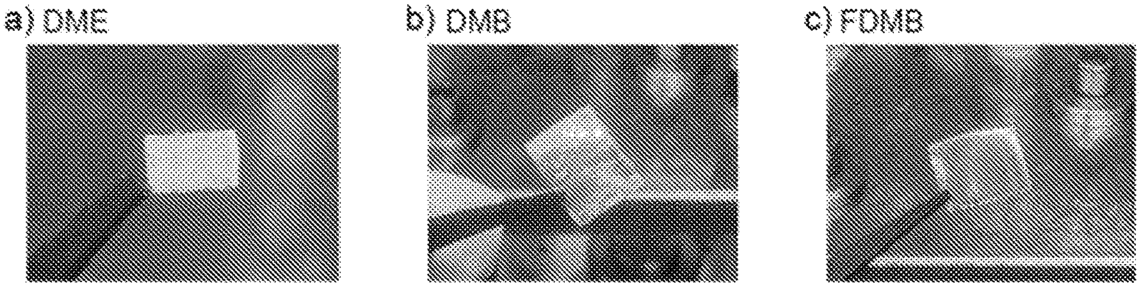

FIG. 35 shows optical images of Li metal soaked in three pure liquids for over one month. FIG. 35*a* is soaked in DME. FIG. 35*b* is soaked in DMB. FIG. 35*c* is soaked in FDMB.

Figure 36:
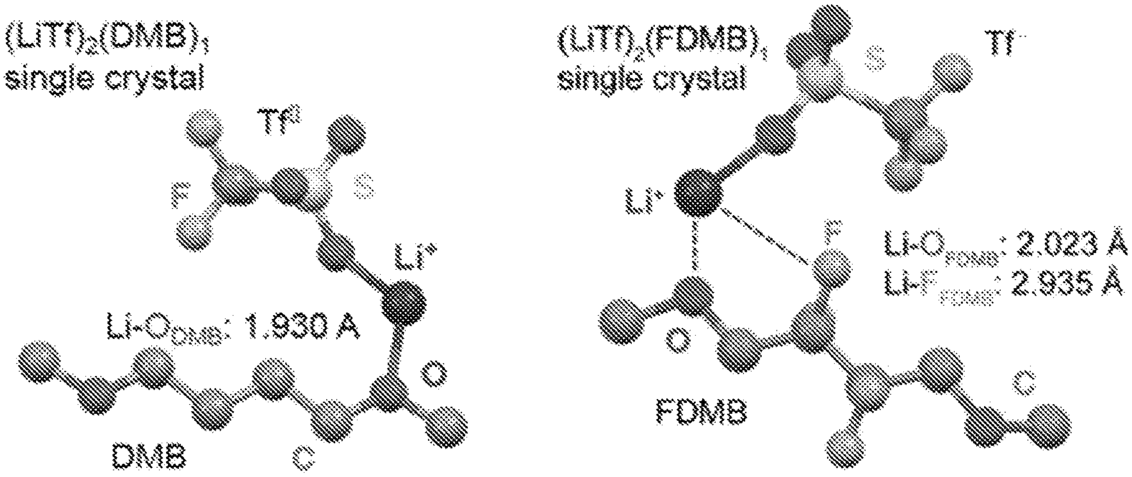

FIG. 36 shows a comparison of LiTf/FDMB and LiTf/DMB crystals.

Figure 37:
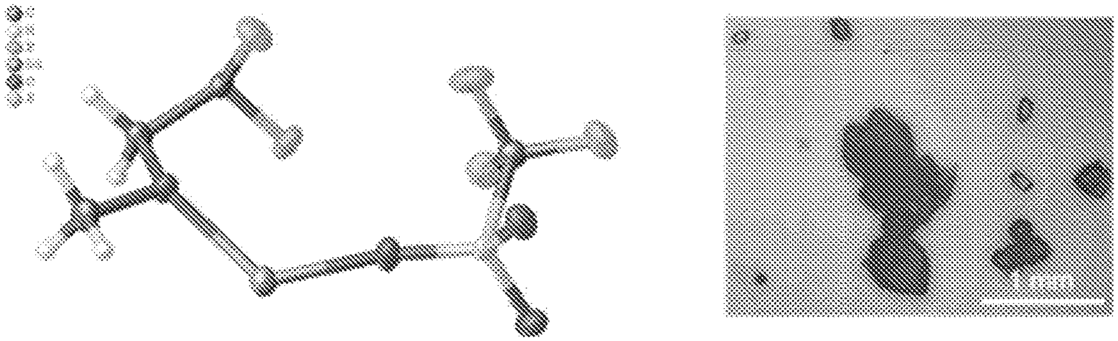

FIG. 37 shows an ellipsoid drawing and optical image of the LiTf/FDMB crystal.

Figure 38:
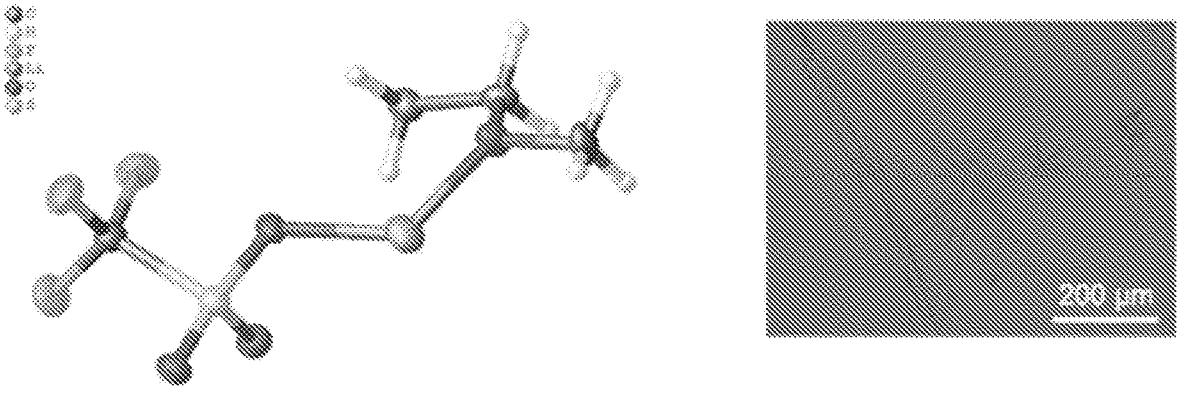

FIG. 38 shows an ellipsoid drawing and optical image of the LiTf/DMB crystal.

Figure 39:
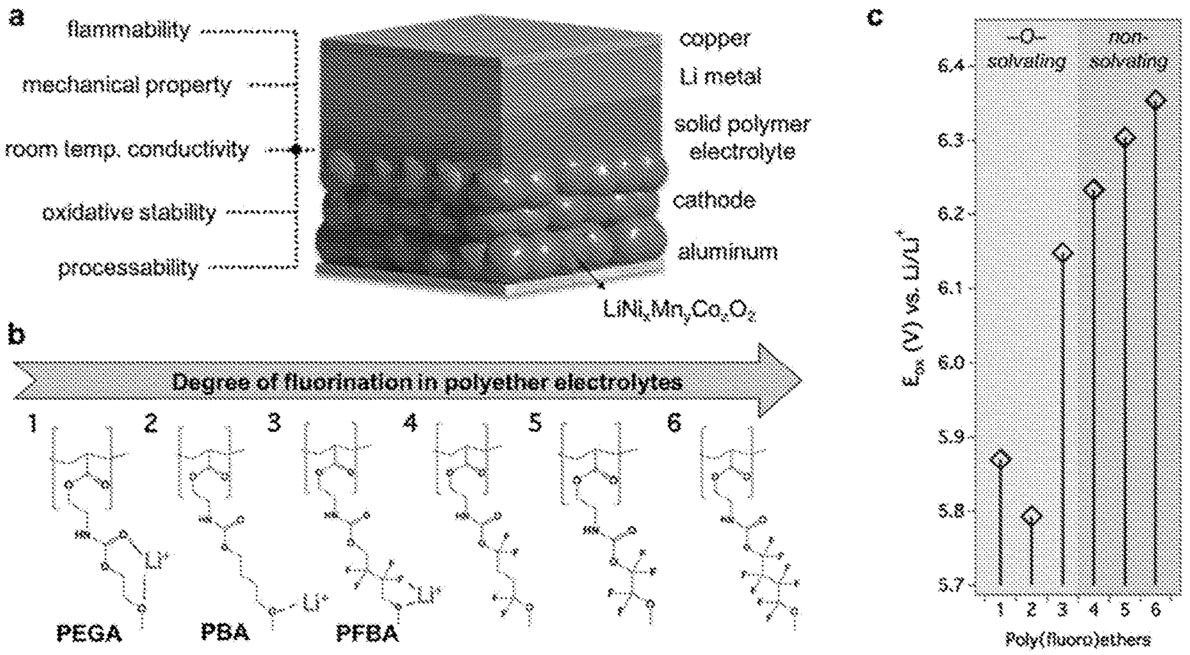

FIG. 39 shows a solid polymer electrolyte design principles. (a) Schematic showing the required features of solid polymer electrolyte for a full cell design having lithium metal anode and high voltage NMC cathode, (b) Molecular structure of (fluoro)ether monomers and their coordination with Li ions from an equimolar LiFSI unit, obtained using ab-initio calculations. Here, structure 1, 2 and 3 are named as poly(ethylene glycol)acrylate: PEGA, poly(butyl ether) acrylate: PBA and poly(fluoro butyl ether)acrylate: PFBA, respectively. The (fluoro)ether chains in structure 1, 2 and 3 coordinates with Li ion (shown in the figure), while in structures 4, 5 and 6 Li ion prefer acrylate backbone (not shown here) (c) Theoretical oxidative potentials of six (fluoro)ether electrolytes, the numbers correspond to the monomers shown in part b. The green and red shades represent polymer having side-chains with and without lithium ion solvating capability.

Figure 40:
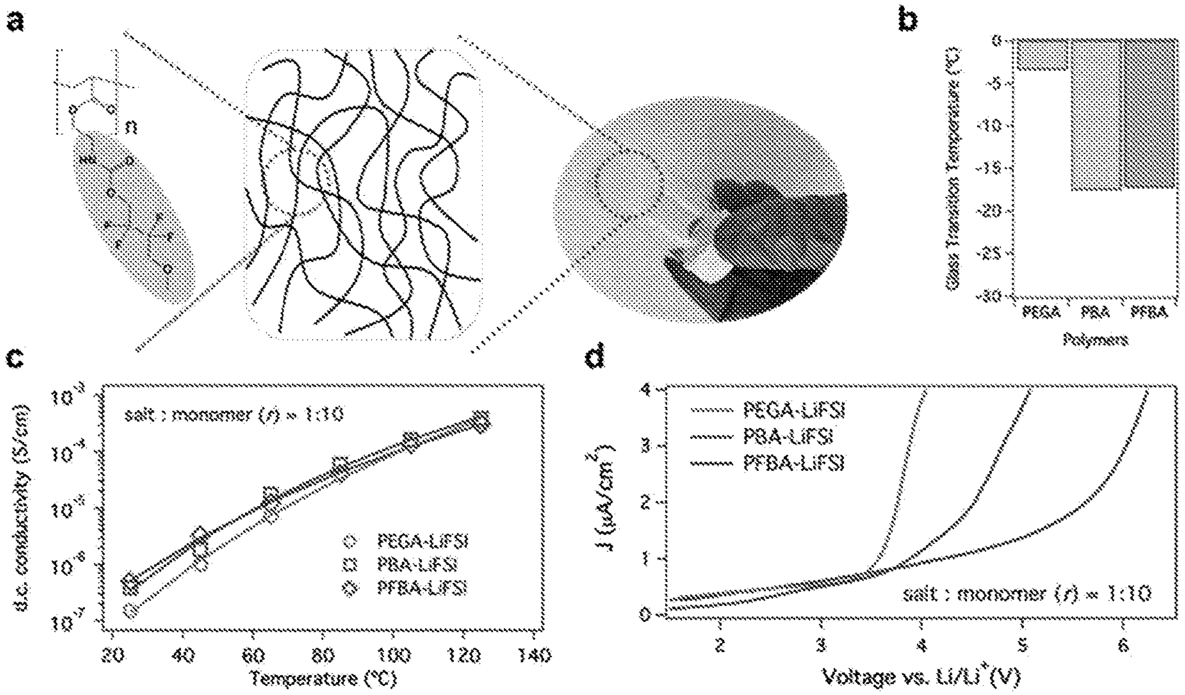

FIG. 40 compares properties of poly(fluoro)ethers. (a) Schematic showing the chemistry, structure and image of poly(fluorobutyl)acrylate polymer. (b) Glass transition temperature (Tg) of three different polymers obtained using DSC measurements, (c) Temperature dependent ion conductivity of polymer electrolytes, here the solid lines represent VFT fitting (d) Linear scan voltammetry of polymer electrolytes performed in a Li||stainless steel configuration with scan rate of 10 mV/s at 60° C. In part c and d, LiFSI was utilized as salt with the salt to monomer ratio (r) being 0.1

Figure 41:
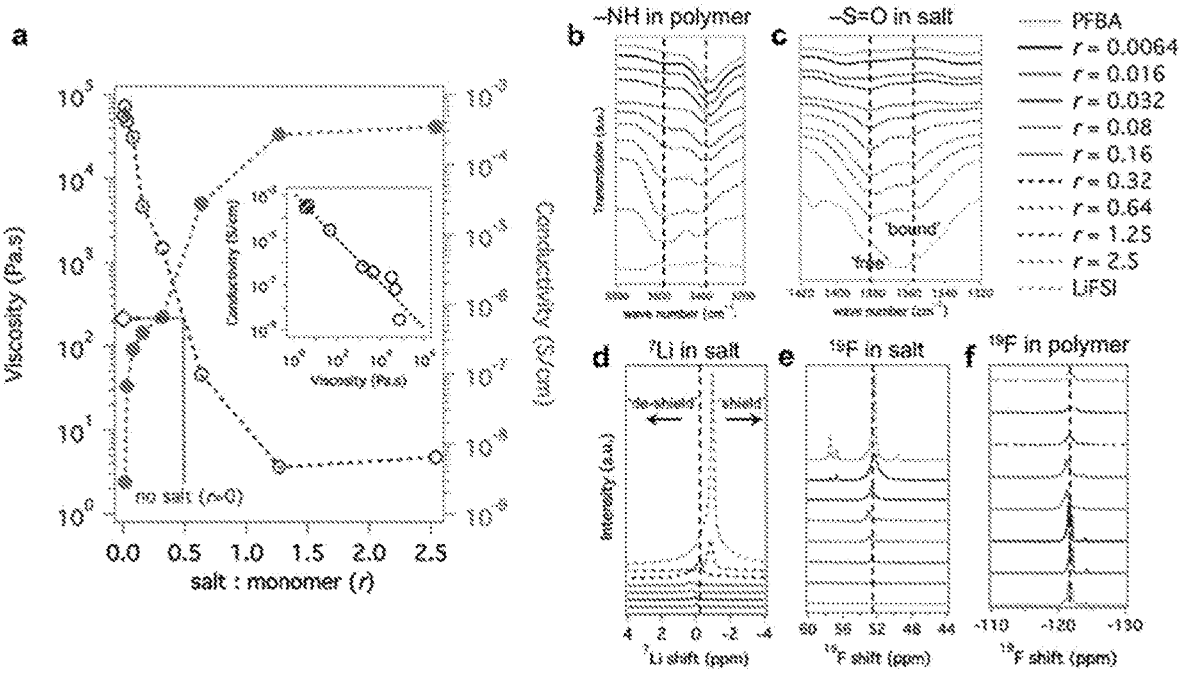

FIG. 41 shows structure-property relationship of salt-polymer complexes. (a) Variation of complex viscosity and ion conductivity as a function of the salt concentration in the polymer electrolytes. The measurement was performed at room temperature (25° C.). The arrow on the left axis represents the viscosity of polymer without addition of any salt. The inset shows the relationship between the viscosity and ion conductivity. (b, c) FTIR results of different polymer electrolytes showing (b) —NH peak shift in the PFBA polymer and (c) —$SO_2$ peak shift in LiFSI salt. (d, e, f) NMR peak shifts for (d) $^7$Li in lithium cation, (e) $^{19}$F in FSI anion and (f) $^{19}$F in PFBA polymer (f) for the corresponding electrolytes. The NMR measurements were done at 90° C. In figures b through f, the dotted straight lines are guide to eye coinciding with the peak positions of r=0.32.

Figure 42:
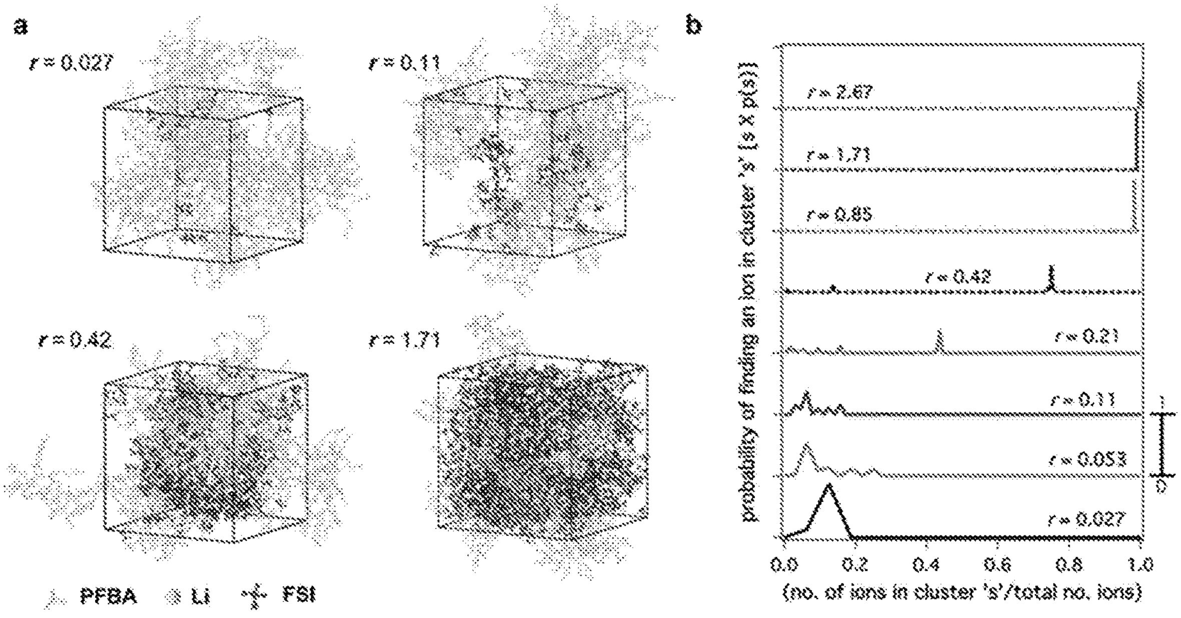

FIG. 42 shows molecular dynamic simulations for coordination structures. (a) Snapshots from simulation boxes showing the optimized arrangements of PFBA chains (red sticks), $Li^+$ (cyan balls) and $FSI^-$ (blue ball/sticks) ions for four representative PFBA+LiFSI electrolytes. (b) Local coordination environments of the ions (Li+FSI) in the simulation boxes comprising of salt and PFBA polymer. Here, the x-axis represents the number of ions occurring in different cluster sizes, which is normalized by the total no. of ions in each of the concentrations. The y-axis represents the probability of finding an ion in different clusters. Also, for all concentrations, the y-axis span from 0 to 1. It is seen that at r≥0.42, the cluster size increases comprising of large percolating structures. In both sub-parts, r represents the salt to monomer ratio.

Figure 43:
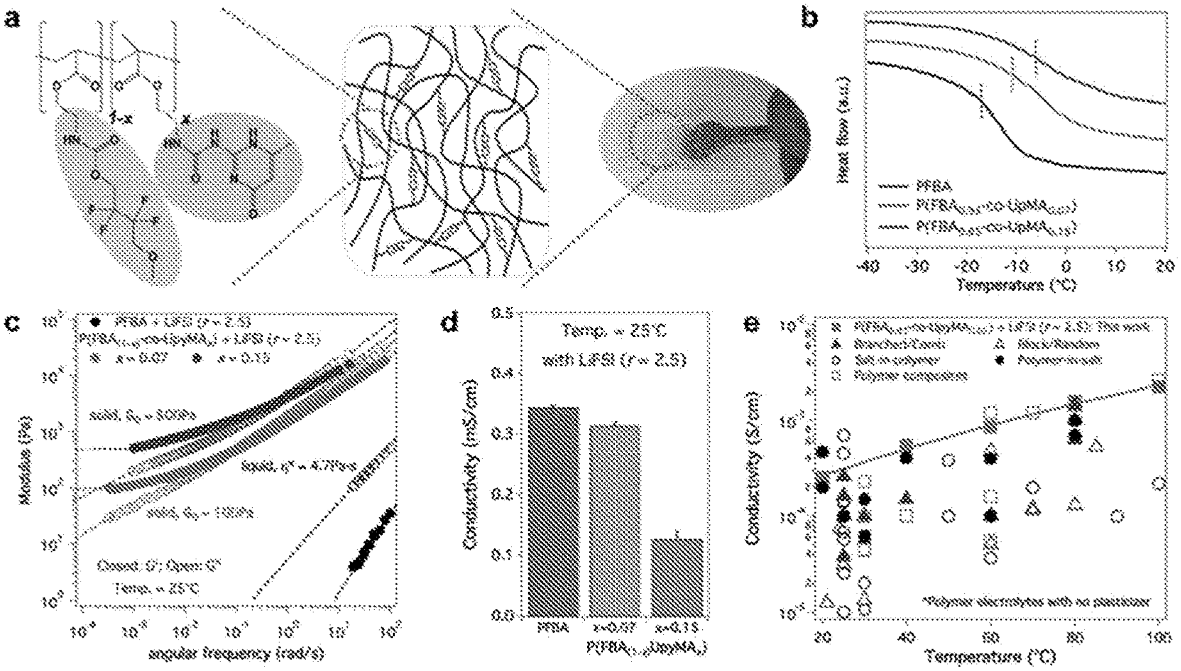

FIG. 43 shows properties of supramolecular electrolytes. (a) Schematic showing the chemistry, molecular structure and image of the copolymer: poly(fluoro butyl acrylate)-co-poly(ureidopyrimidinone methacrylate): PFBA-co-UpyMA. The molecular structure shows the formation of quadrupolar Hydrogen-bond between polymer chains. (b) DSC measurements showing the heat flow at a function of temperature to determine the glass transition temperatures of the PFBA and P(FBA-co-UpyMA) polymers, (c) Frequency dependent storage and loss modulus of polymer electrolytes obtained using oscillatory shear measurements at 90° C. The LiFSI salt content (r) is 2.5. (d) Ion conductivity comparison of polymer electrolytes using salt content (r) 2.5, measured at 25° C. (e) Comparison of ion conductivity as a function of temperature for the solid polymer electrolyte (P($FBA_{0.93}$-co-$UpyMA_{0.07}$)+LiFSI (r=2.5) with that of polymer electrolytes reported in the literature. The literature values are taken for polymers having higher than $10^{-5}$ S/cm conductivity, without any addition of plasticizers.

Figure 44:
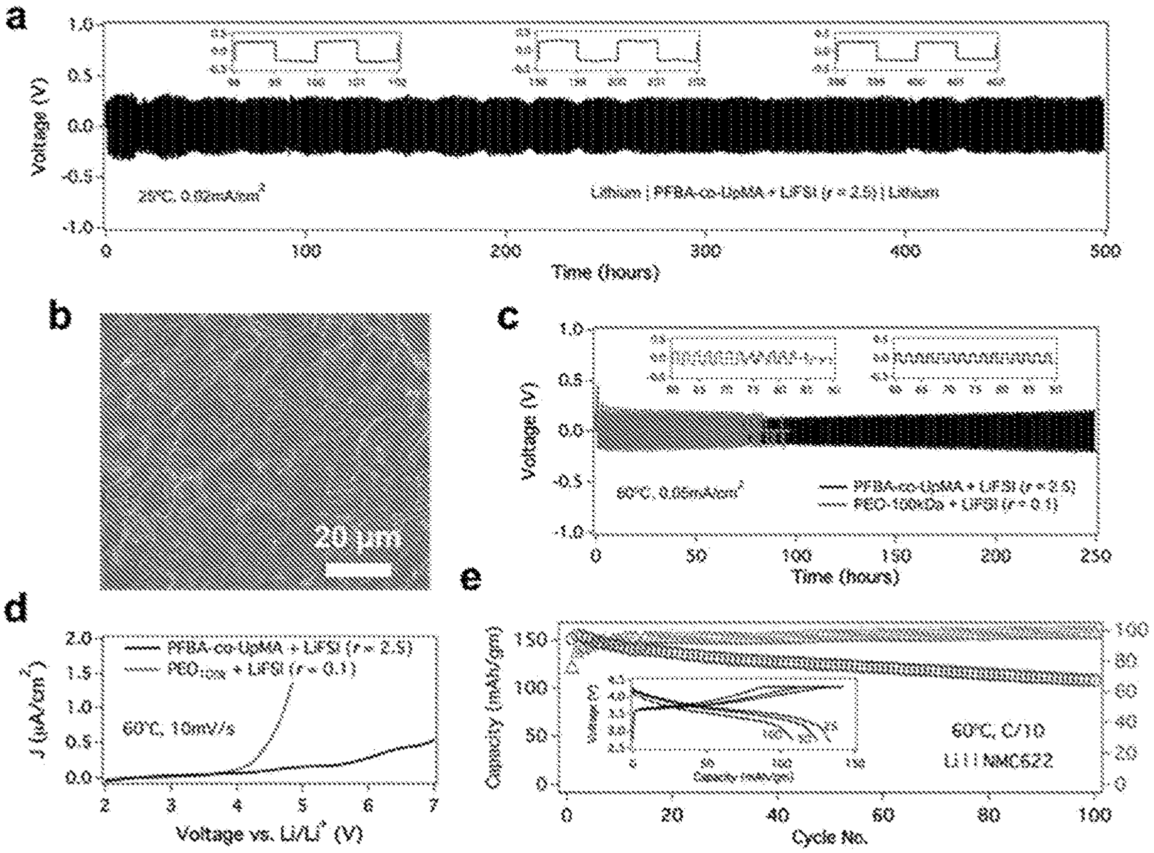

FIG. 44 shows electrochemical and Battery Performance. (a) Galvanostatic plate and strip measurements done in symmetric lithium cell at a temperature of 25° C. The current density utilized was 0.02 mA/$cm^2$ and each half cycle was 1 hour. The electrolyte was P($FBA_{0.93}$-co-$UpyMA_{0.07}$)+LiFSI (r=2.5). The inset shows the zoomed in voltage profiles at 100, 200 and 400 hours. (b) SEM image of electrodeposited lithium on copper substrate in a Li||Cu battery where the electrolyte utilized was P($FBA_{0.93}$-co-$UpyMA_{0.07}$)+LiFSI (r=2.5). The deposition was done at a current density of 0.02 mA/$cm^2$ for 10 hours at 25° C. (c) Galvanostatic plate and strip measurements in symmetric lithium cells performed at 60° C. for the P($FBA_{0.93}$-co-$UpyMA_{0.07}$)+LiFSI (r=2.5) and PEO-100 kDa+LiFSI (r=0.1) polymer electrolytes. The insets show the zoomed in voltage profiles for the measurements between 60 to 90 hours. (d) Linear scan voltammetry performed at 60° C. in a Li||stainless steel cell using the polymer electrolytes. The scan rate was 10 mV/sec. (e) Full cell cycling results using lithium metal anode and NMC622 cathode with the polymer electrolyte: P($FBA_{0.93}$-co-$UpyMA_{0.07}$)+LiFSI (r=2.5). The measurement was done at 60° C. at C/10 rate. The active material loading in cathode was 0.7 mAh/$cm^2$. The inset shows the voltage profile of the battery at cycle no. 25, 50, 100.

Figure 45:
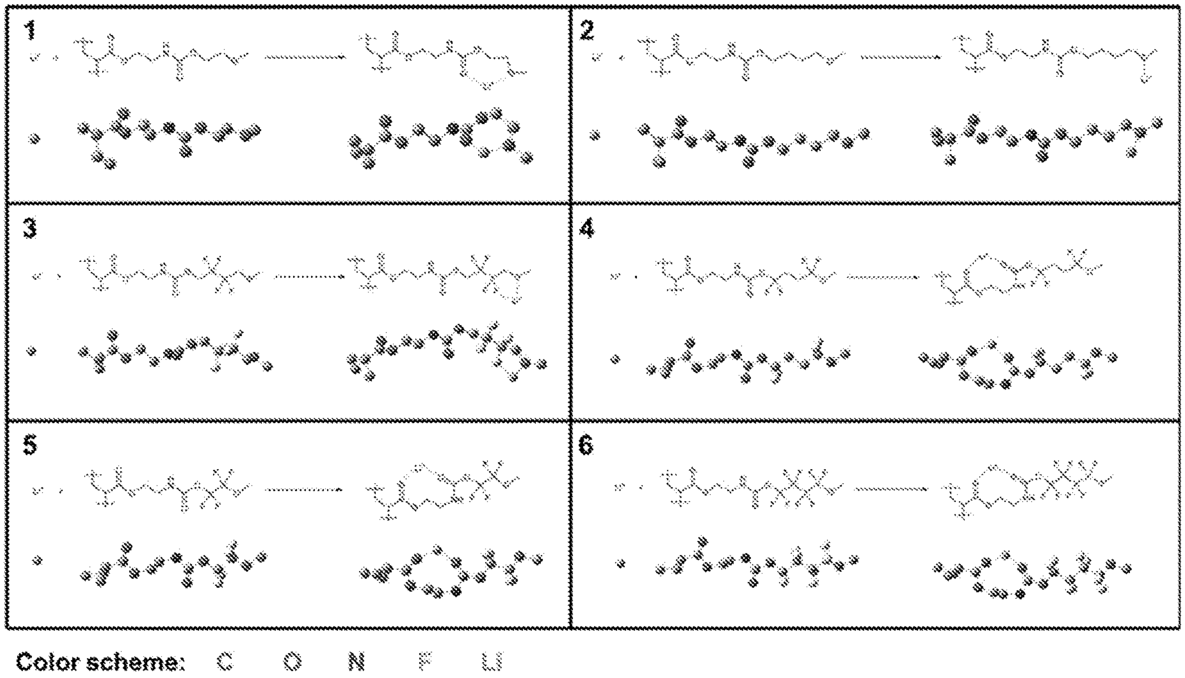

FIG. 45 shows Atomic structures of the lithium-bonded (fluoro)ether-acrylate monomers obtained from DFT calculations.

Figure 46:
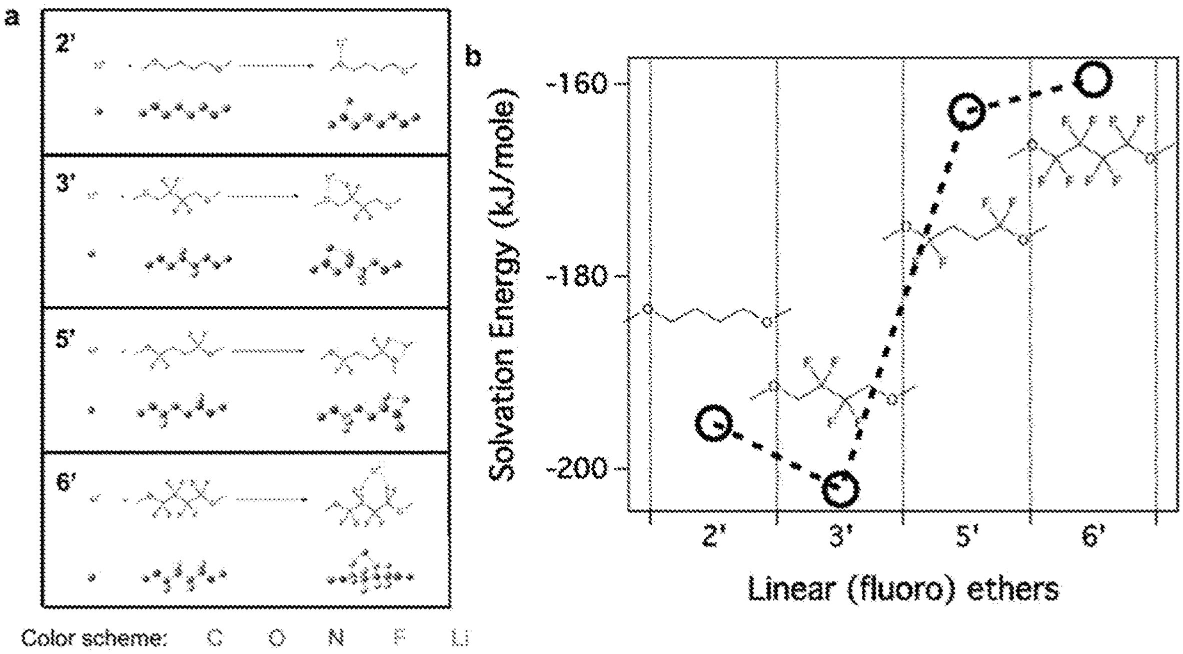

FIG. 46 shows (a) Lithium coordination with linear (fluoro)ether moieties from DFT calculations. (b) Comparing solation energies of the linear (fluoro)ethers with lithium ions, which shows a significant reduction when the —F groups are present next to the electron rich —O-atom.

Figure 47:
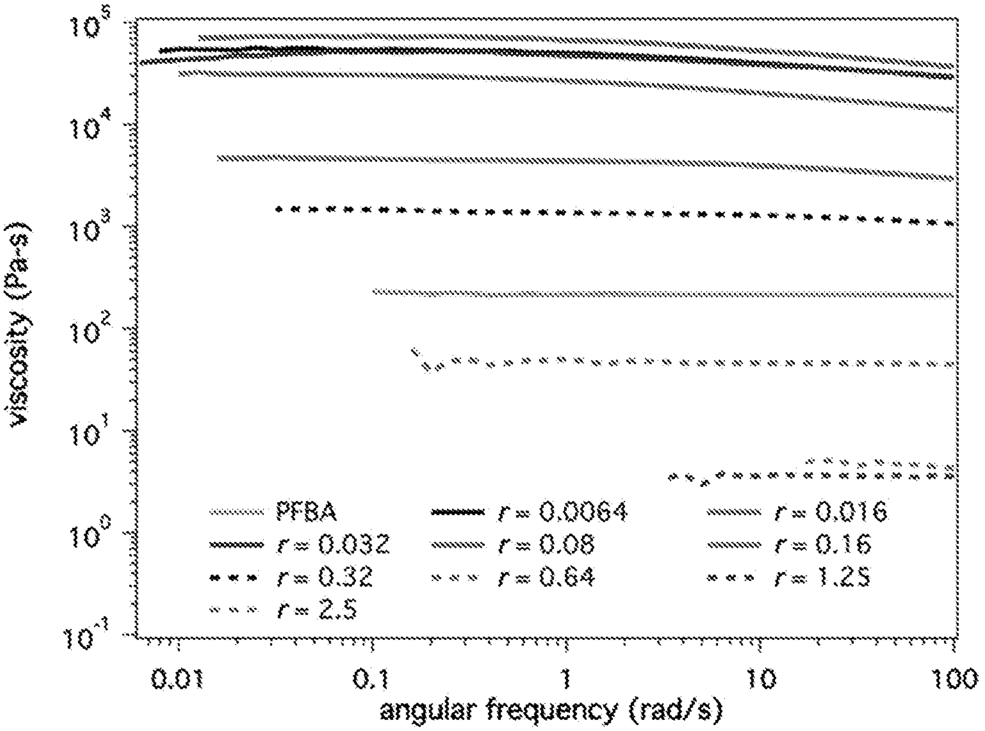

FIG. 47 shows complex viscosity of PFBA electrolytes with varying contents of LiFSI salt. Here, r represents the salt to monomer ratio. The measurement was done using oscillatory shear measurements in the linear viscoelastic region at room temperature (25° C.).

Figure 48:
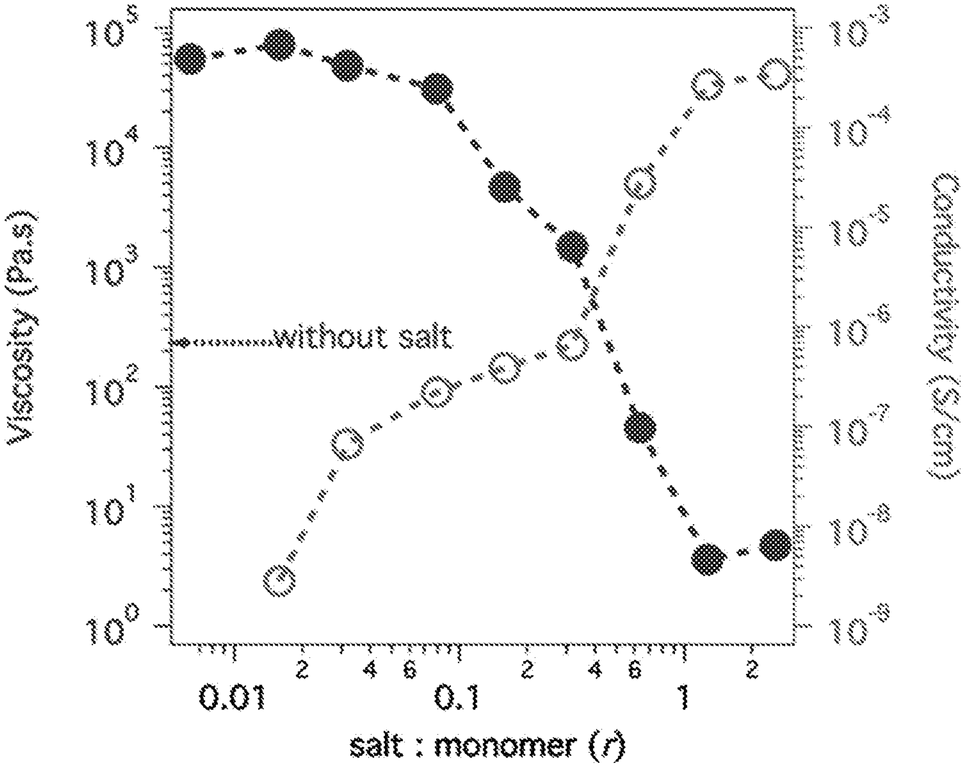

FIG. 48 shows Varying complex viscosity ion conductivity with the salt concentration in the PFBA polymers. The measurement was performed at room temperature (25° C.).

The arrow on the left axis represents the viscosity of polymer without addition of any salt.

Figure 49:
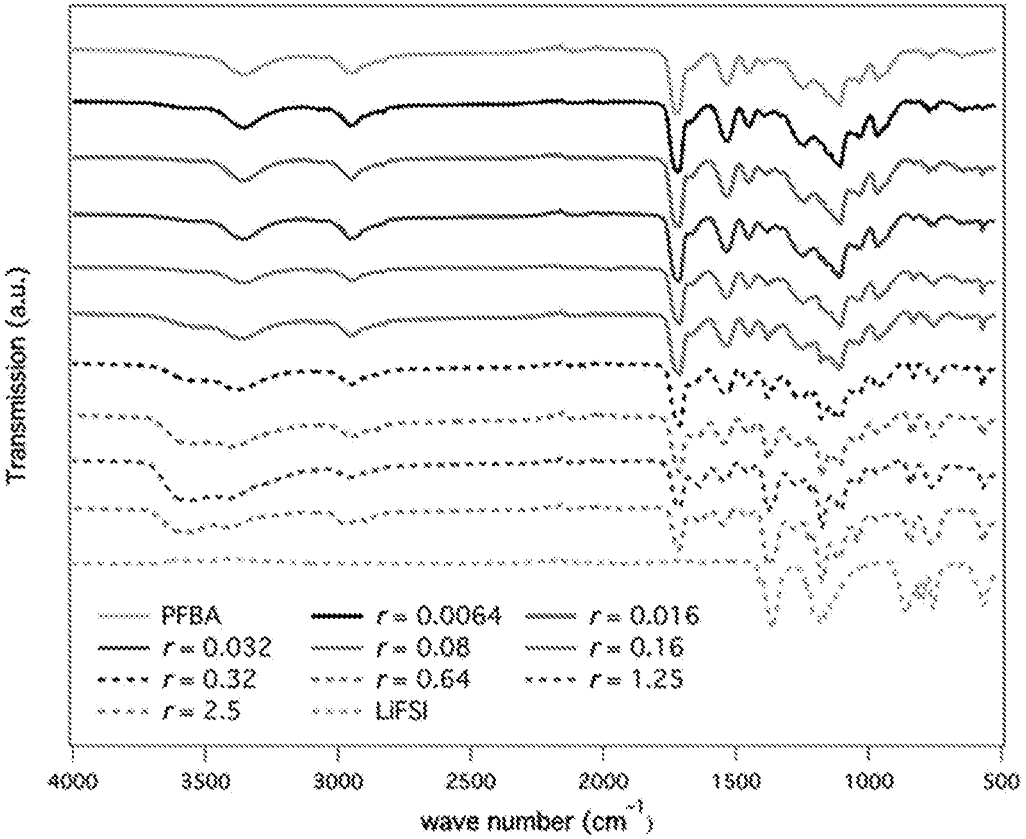

FIG. 49 shows Full spectrum of the FTIR curves for the PFBA-LiFSI electrolytes. Here r represents the salt to monomer ratio.

Figure 50:
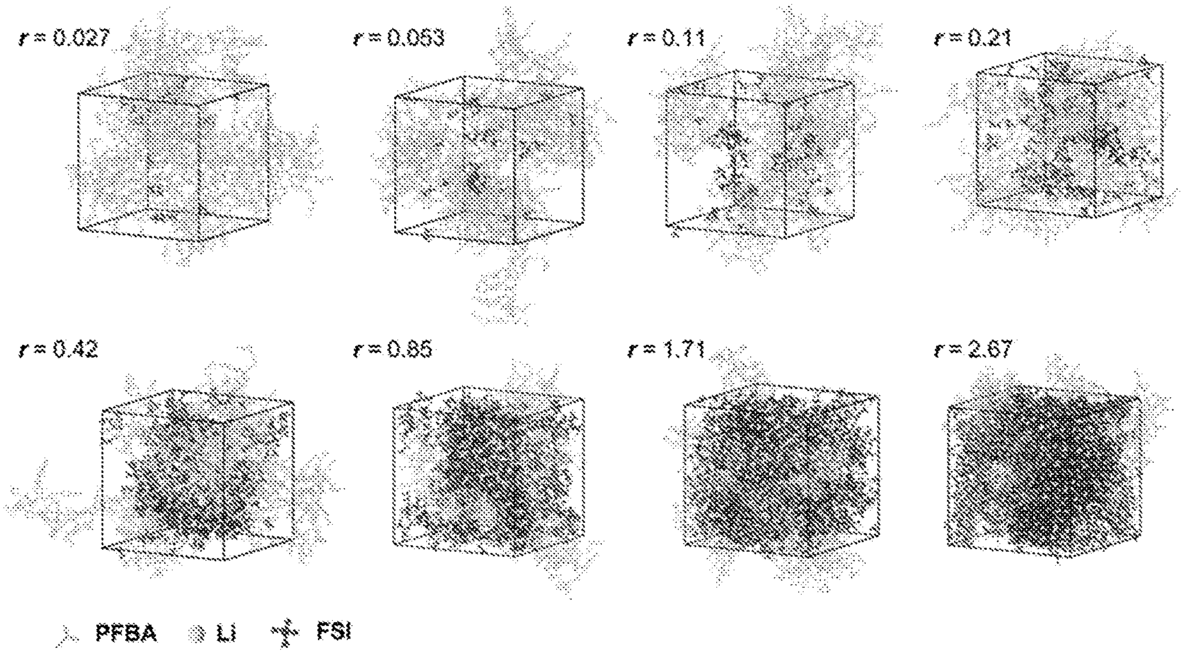

FIG. 50 shows Snapshots from simulation boxes showing the optimized arrangements of PFBA chains (red sticks), $Li^+$ (cyan balls) and $FSI^-$ (blue ball/sticks) ions for different PFBA+LiFSI electrolytes. Here, r represents the salt to monomer ratio.

Figure 51:
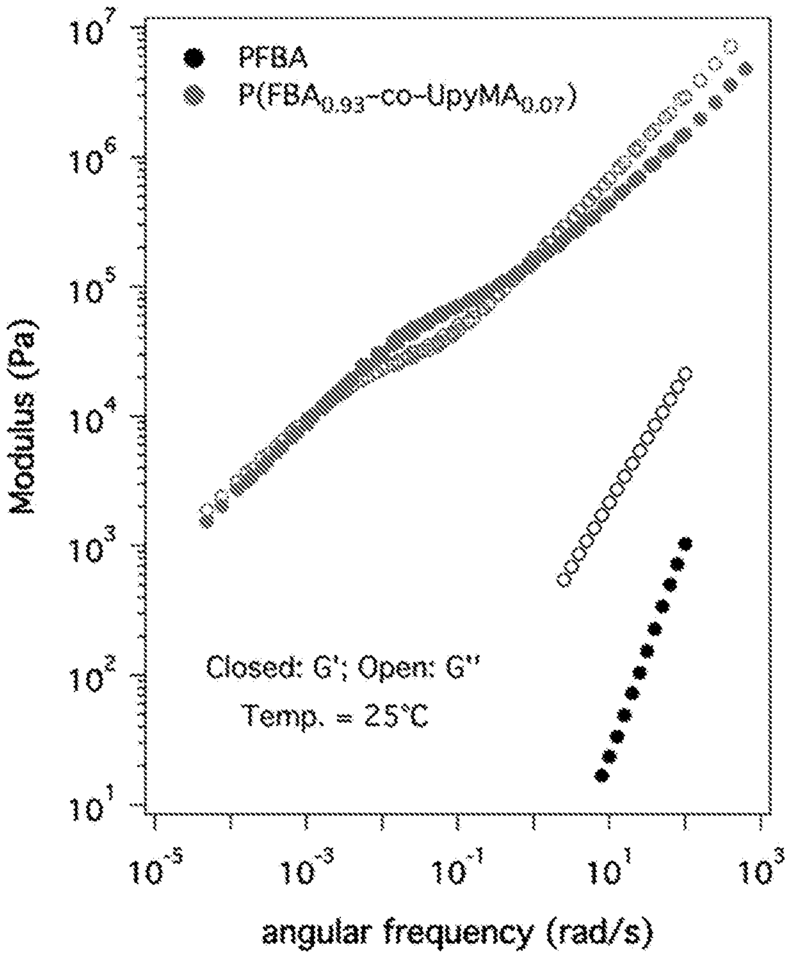

FIG. 51 shows Frequency dependent storage and loss modulus for salt-free PFBA and H-bonded PFBA at 25° C. obtained using oscillatory shear measurements by time-temperature superposition method.

Figure 52:
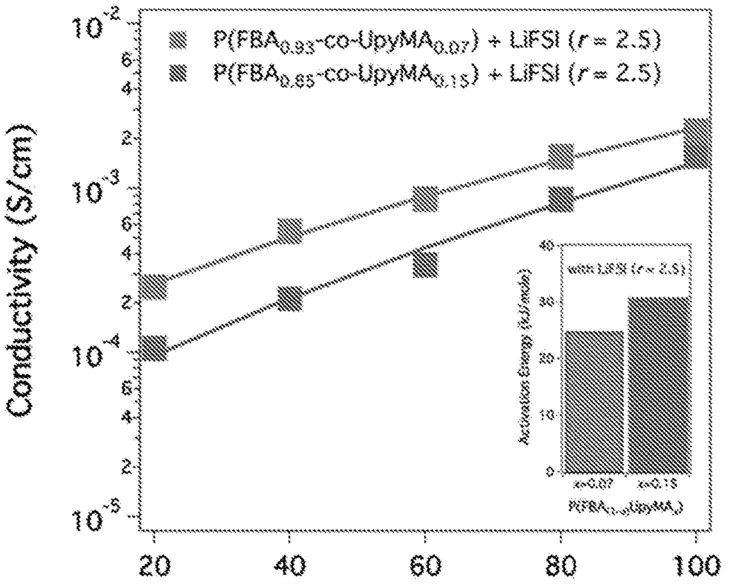

FIG. 52 shows Ion conductivity measurements at different temperatures for the P(FBA-co-UpyMA) polymer electrolytes containing LiFSI salt. Here, r represents the salt content in form of salt-to-monomer ratio. The line represents the fit from Arrhenius equation. The inset shows the activation energy obtained from the fitting.

Figure 53:
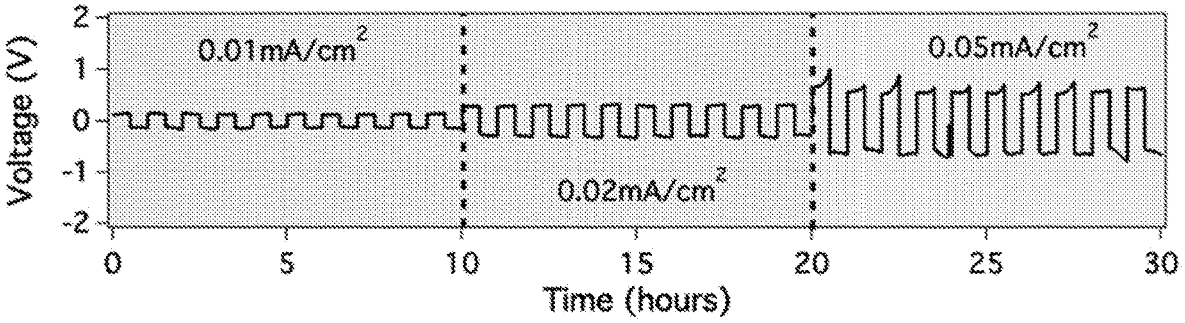

FIG. 53 shows Voltage profiles obtained using galvanostatic plate and strip measurements in a symmetric lithium cell. The electrolyte utilized was $P(FBA_{0.93}$-co-$UpyMA_{0.07})$+LiFSI (r=2.5). The measurement was done at 25° C.

Figure 54:
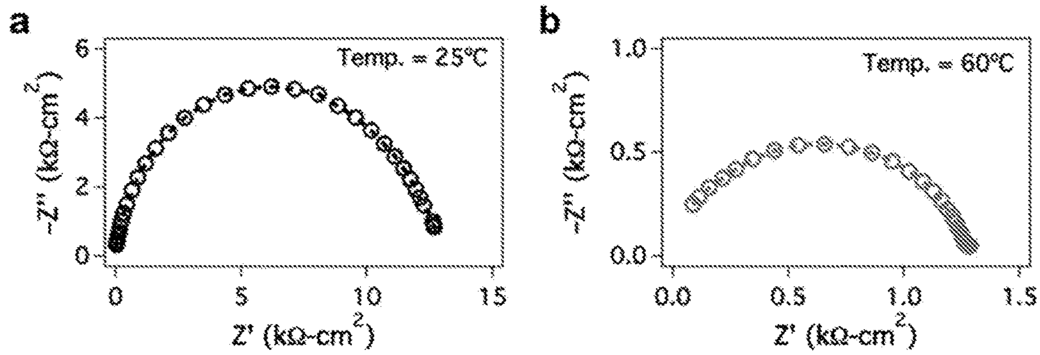

FIG. 54 shows Nyquist plots obtained using impedance spectroscopy for symmetric lithium cell. The electrolyte utilized was $P(FBA_{0.93}$-co-$UpyMA_{0.07})$+LiFSI (r=2.5). The measurements were done at (a) 25° C. and (b) 60° C.

Figure 55:
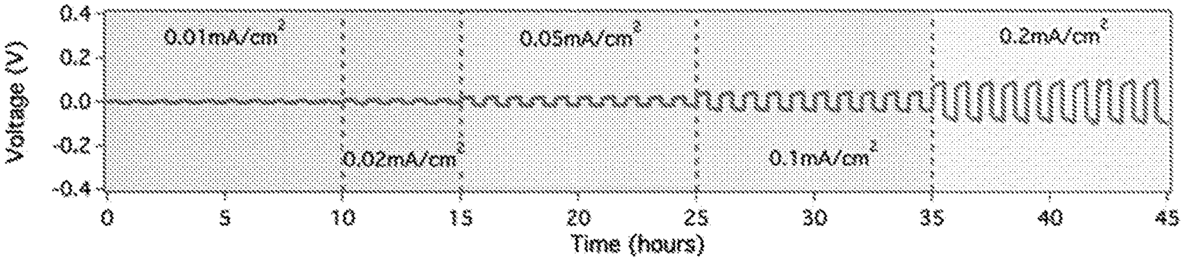

FIG. 55 shows voltage profiles obtained using galvanostatic plate and strip measurements in a symmetric lithium cell. The electrolyte utilized was $P(FBA_{0.93}$-co-$UpyMA_{0.07})$+LiFSI (r=2.5). The measurement was done at 60° C.

Figure 56:
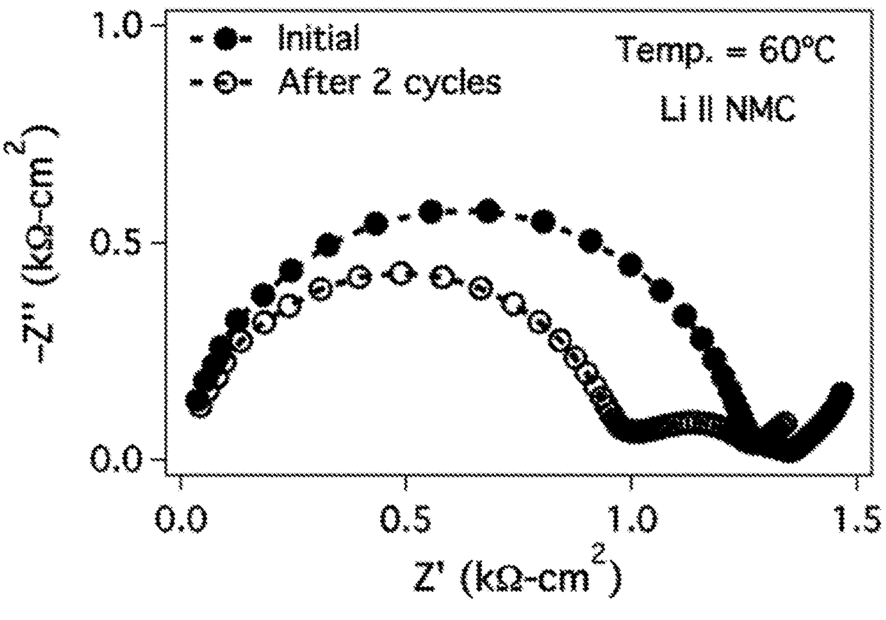

FIG. 56 shows Nyquist plots obtained using impedance spectroscopy for a lithium||NMC622 full cell. The electrolyte utilized was $P(FBA_{0.93}$-co-UpyMAo.m)+LiFSI (r=2.5). The measurement was done at 60° C. The impedance measurements were done before cycling and after 2 cycles at C/10 rate.

It should be noted that the representative illustrations provided in the figures set forth herein is intended to illustrate the general features and/or characteristics of exemplary embodiments to aid in describing the present technology in full. The figures may not precisely reflect the characteristics of any given embodiment, and are not necessarily intended to define or limit the scope of the claimed subject matter. Further, the present technology may or may not include or incorporate therewith any one or more features of characteristics set provided in any one or more figures.

DETAILED DESCRIPTION

In some embodiments, a solvent for an electrolyte of a battery comprises a compound represented by the chemical formula:

(I)

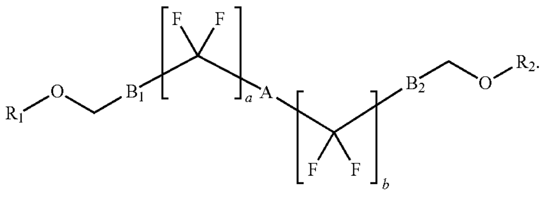

In formula (I), $R_1$ and $R_2$ can be the same or different, and can be independently selected from (i) $C_1$-$C_5$ alkyl groups, which may be unsubstituted or substituted with one or more substituent groups (e.g., one or more fluoro groups for fluorinated $C_1$-$C_5$ alkyl groups), such as $C_1$-$C_4$ alkyl groups, $C_1$-$C_3$ alkyl groups, or $C_1$-$C_2$ alkyl groups, (ii) silicon-containing groups, such as —$Si(OR_3)(OR_4)(OR_5)$ where $R_3$, $R_4$, and $R_5$ can be the same or different, and can be independently selected from hydride group and alkyl groups, which may be unsubstituted or substituted with one or more substituent groups (e.g., one or more fluoro groups for fluorinated alkyl groups), (iii) other groups including one or more carbon atoms, (iv) other groups including one or more silicon atoms, and (v) other groups including one or more carbon atoms and one or more silicon atoms. In some In formula (I), A is a bond or is selected from (i) $C_1$-$C_{12}$ alkylene groups, which may be unsubstituted or substituted with one or more substituent groups (e.g., one or more fluoro groups for fluorinated $C_1$-$C_{12}$ alkylene groups), such as $C_1$-$C_{10}$ alkylene groups, $C_1$-$C_8$ alkylene groups, $C_1$-$C_5$ alkylene groups, $C_1$-$C_4$ alkylene groups, $C_1$-$C_3$ alkylene groups, or $C_1$-$C_2$ alkylene groups, (ii) silicon-containing groups, such as —$Si(OR_6)(OR_7)$ where $R_6$ and $R_7$ can be the same or different, and can be independently selected from hydride group and alkyl groups, which may be unsubstituted or substituted with one or more substituent groups (e.g., one or more fluoro groups for fluorinated alkyl groups), (iii) other groups including one or more carbon atoms, (iv) other groups including one or more silicon atoms, (v) other groups including one or more carbon atoms and one or more silicon atoms, and (vi) ether groups including one or more moieties of the form —O—, such as —$R_8$—O—, —$R_8$—O—$R_9$—, —$R_8$—O—$R_9$—O—, and —$R_8$—O—$R_9$—O—$R_{10}$— where $R_8$, $R_9$, and $R_{10}$ can be the same or different, and can be independently selected from alkylene groups, which may be unsubstituted or substituted with one or more substituent groups (e.g., one or more fluoro groups for fluorinated alkylene groups) and silicon-containing groups. In some embodiments, A is a bond.

In formula (I), $B_1$ and $B_2$ can be the same or different, and can be independently selected from (i) bonds and (ii) $C_1$-$C_3$ alkylene groups, which may be unsubstituted or substituted with one or more substituent groups (e.g., one or more fluoro groups for fluorinated $C_1$-$C_3$ alkylene groups), such as $C_1$-$C_2$ alkylene groups.

In formula (I), a and b are independently 0 or 1. In some embodiments, when a and b are 0, then $R_1$ and $R_2$ are selected from $CH_3$, $CF_3$, $CH_2CH_3$, and $CH_2CF_3$, and at least one of $R_1$ and $R_2$ is $CF_3$ or $CH_2CF_3$. In some embodiments, a and b are 1.

In some embodiments, $B_1$ and $B_2$ are bonds, and the compound is represented by the chemical formula:

(II)

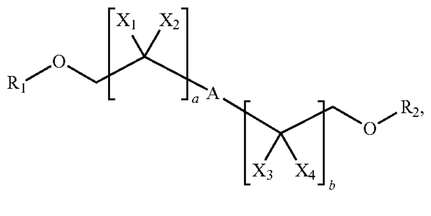

where $R_1$, $R_2$, A, a and b are given as explained above with regard to formula (I).

In some embodiments, a and b are independently 0 or 1. In some embodiments, when a and b are 0, then $R_1$ and $R_2$ are selected from $CH_3$, $CF_3$, $CH_2CH_3$, and $CH_2CF_3$, and at least one of $R_1$ and $R_2$ is $CF_3$ or $CH_2CF_3$. In some embodiments, a and b are 1.

In some embodiments, A is a bond, and the compound is represented by the chemical formula:

(III)

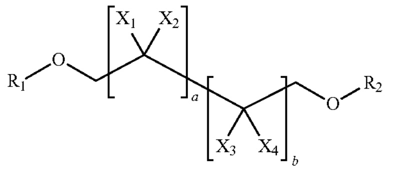

where $R_1$, $R_2$, a and b are given as explained above with regard to formula (I).

In some embodiments, a and b are independently 0 or 1. In some embodiments, when a and b are 0, then $R_1$ and $R_2$ are selected from $CH_3$, $CF_3$, $CH_2CH_3$, and $CH_2CF_3$, and at least one of $R_1$ and $R_2$ is $CF_3$ or $CH_2CF_3$. In some embodiments, a and b are 1.

In some embodiments, $R_1$=$R_2$=methyl, and the compound is represented by the chemical formula:

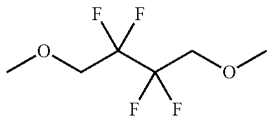

In some embodiments, a and b are 0, and the compound is represented by one of the following chemical formula:

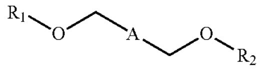

where A, $R_1$ and $R_2$ are the same as Formula (I), with the caveat that at least one of A, $R_1$ and $R_2$ includes one or more fluoro moiety. In some embodiments, one or both of $R_1$ and $R_2$ are a fluorinated $C_1$-$C_5$ alkyl group, such as fluorinated $C_1$-$C_4$ alkyl groups, fluorinated $C_1$-$C_3$ alkyl groups, or fluorinated $C_1$-$C_2$ alkyl groups. In some embodiments, one of $R_1$ and $R_2$ is a fluorinated $C_1$-$C_5$ alkyl group and the other is a non-fluorinated $C_1$-$C_5$ alkyl group. In some embodiments, $R_1$ and $R_2$ are selected from $CH_3$, $CF_3$, $CH_2CH_3$, and $CH_2CF_3$, and at least one of $R_1$ and $R_2$ is $CF_3$ or $CH_2CF_3$. Specific compounds include:

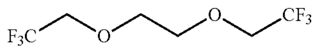

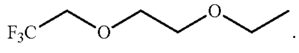

.

In additional embodiments, a solvent for an electrolyte of a battery is a compound represented by the chemical formula:

(V)

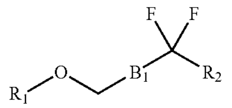

where $R_1$, $R_2$, and $B_1$ are given as explained above with regard to formula (I).

In additional embodiments a solvent for an electrolyte of a battery is a mixture of one or more of the above-embodied fluoro-compounds and at least one of ethylene carbonate (EC), propylene carbonate (PC), dimethyl carbonate (DMC), diethyl carbonate (DEC), ethyl methyl carbonate (EMC), vinyl carbonate (VC), fluoroethylene carbonate (FEC), difluoroethylene carbonate (DFEC), 3,3,3-trifluoropropylene carbonate (TFPC), trifluoroethyl methyl carbonate (FEMC), bis(2,2,2-trifluoroethyl) carbonate (TFEC), 1,2-dimethyoxylethane (DME), 1,3-dioxolane (DOL), 1,4-dioxane (DOX), tetrahydrofuran (THF), 1,3,2-dioxathiolane-2,2-dioxide (DTD), 1,3-propanesultone (PS), acetonitrile (AN), ethyl acetate (EA), methyl acetate (MA), methyl propanoate (MP), succinonitrile (SN), trimethyl phosphate (TMP), triethyl phosphate (TEP); tris(trimethylsilyl)phosphate (TTSP), tris(2,2,2-trifluoroethyl) phosphate (TFEPa), tris(2,2,2-trifluoroethyl) phosphite (TFEPi), prop-1-ene-1,3-sultone (PES), ethylene sulfite (ES), 1,4-butane sultone (BS), dimethyl sulfoxide (DMSO), methylene methanedisulfonate (MMDS), N,N-Dimethylformamide (DMF), and gamma-butyrolactone (BL). In some embodiments, the mixture comprises two, three or four compounds from those listed above.

In some embodiments, the one or more of the above-embodied fluoro-compounds comprise at least 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, 98 wt. %, 99 wt. %, 99 wt. %, 99.5 wt. %, or 100 wt. % of the solvent.

In additional embodiments, an electrolyte of a battery includes the solvent of any of the foregoing embodiments, and a salt. In some embodiments, the salt is a lithium salt, potassium salt, sodium salt, or a mixture thereof. For example, in some embodiments, the salt includes one or more of lithium bis(fluorosulfonyl)imide (LiFSI); lithium bis(trifluoromethanesulfonyl)imide (LiTFSI); lithium hexafluorophosphate (LiPF6); lithium hexafluoroarsenate (LiAsF6); lithium tetrafluoroborate (LiBF4); lithium bis(oxalato)borate (LiBOB); lithium difluoro(oxalato)borate (LiDFOB); lithium difluorophosphate (LiDFP); lithium nitrate (LiNO3); lithium perchlorate (LiClO4); lithium triflate (LiTf); lithium trifluoroacetate (LiTFA); lithium 4,5-dicyano-2-(trifluoromethyl)imidazole (LiTDI); sodium bis(fluorosulfonyl)imide (NaFSI); sodium bis(trifluoromethanesulfonyl)imide (NaTFSI); potassium bis(fluorosulfonyl)imide (KFSI); and potassium bis(trifluoromethanesulfonyl)imide (KTFSI).

In additional embodiments, an electrolyte of a battery includes the solvent of any of the foregoing embodiments, and a salt of any of the foregoing embodiments (e.g., a lithium salt). In some embodiments, the electrolyte includes a mixture of two or more solvents of the foregoing embodiments, and the salt (e.g., lithium salt). In some embodiments, an amount of the solvent (or the mixture of solvents) in the electrolyte is at least about 60% by weight of a total weight of the electrolyte, such as at least about 65% by weight, at least about 70% by weight, at least about 75% by weight, or at least about 80% by weight. In some embodiments, the electrolyte consists essentially of the solvent (or the mixture of solvents) and the salt (e.g., lithium salt). In some embodiments, the electrolyte includes (i) a mixture of one or more solvents of the foregoing embodiments and one or more additional solvents, such as selected from ethers and carbonates, and (ii) the salt (e.g., lithium salt). Examples of the lithium salt include lithium bis(fluorosulfonyl)imide, lithium bis(trifluoromethanesulfonyl)imide, lithium hexafluorophosphate, lithium hexafluoroarsenate, lithium tetrafluoroborate, lithium perchlorate, and lithium triflate.

In additional embodiments, a battery includes (1) an anode structure including an anode current collector, (2) a cathode structure including a cathode current collector and a cathode material disposed on the cathode current collector, and (3) the electrolyte of any of the foregoing embodiments disposed between the anode structure and the cathode structure. In some embodiments, the anode structure further includes an anode material disposed on the anode current collector. In some embodiments, the anode material comprises lithium metal, graphite, silicon, or a graphite/silicon composite anode. In some embodiments, the graphite/silicon composite anode includes a weight ratio of graphite/silicon of about 5:95 10:90, 20:80, 30:70, 40:60, 50:50, 60:40, 70:30, 20:80, 90:10, or 95:5. In some embodiments, the cathode material comprises a sulfur cathode or an air cathode (e.g., a Li—S or a Li-air battery). In some embodiments, the cathode material comprises a lithium nickel manganese cobalt oxide cathode (e.g., NMC532, NMC622, NMC811) or a lithium iron phosphate cathode (e.g., LFP).

In some aspects of this disclosure, the small molecules of this disclosure, or an oligomer or polymer or 2D polymer or inorganic organic framework that incorporates a small molecule of this disclosure, is in a layer in a battery. The layer in a battery is not particularly limited, and incudes, for example, an interface layer between an inorganic or organic solid state electrolyte and electrodes, a binder in an electrode, and/or a matrix for an inorganic organic composite electrolyte.

In some embodiments, the small molecules of this disclosure are incorporated into polymers conventionally used in the art (e.g. PEO, PVDF, P(VDF-TriFE), PTHF, PDMS, etc.) and/or reduced graphene oxide (rGO) and/or $MoS_2$ and/or metal-organic frameworks (MOFs) and/or covalent-organic frameworks (COFs) to form composite materials.

In additional embodiments, the composite materials described herein and/or the solid polymer electrolytes of this disclosure are used solely or together as the binders of battery electrodes (e.g. the binders of graphite and/or silicon anodes, and/or sulfur and/or air and/or lithium nickel manganese cobalt oxide (NMC532, NMC622, NMC811) and/or lithium cobalt oxide (LCO) and/or lithium manganese oxide (LMO) and/or lithium iron phosphate (LFP) cathodes.

In additional embodiments, the composite materials described herein and/or the solid polymer electrolytes of this disclosure are used solely or together as ex-situ independent coating layers on the surface of battery electrodes (e.g., coatings on lithium metal and/or graphite and/or silicon anodes, and/or sulfur and/or air and/or lithium nickel manganese cobalt oxide (NMC532, NMC622, NMC811) and/or lithium cobalt oxide (LCO) and/or lithium manganese oxide (LMO) and/or lithium iron phosphate (LFP) cathodes.

In additional embodiments, the composite materials described herein and/or the solid polymer electrolytes of this disclosure are used solely or together as a chemically linked/modified layer(s) on the surface of a battery electrode (e.g., chemical modification on lithium metal and/or graphite and/or silicon anodes, and/or sulfur and/or air and/or lithium nickel manganese cobalt oxide (NMC532, NMC622, NMC811) and/or lithium cobalt oxide (LCO) and/or lithium manganese oxide (LMO) and/or lithium iron phosphate (LFP) cathodes.

Additional embodiments of small molecules of this disclosure incorporated into polymers are described in the following paragraphs.

In additional embodiments, a layer of a battery includes a polymer which includes a backbone and side chains bonded to the backbone, and at least one of the side chains includes a moiety represented by the chemical formula:

(VI)

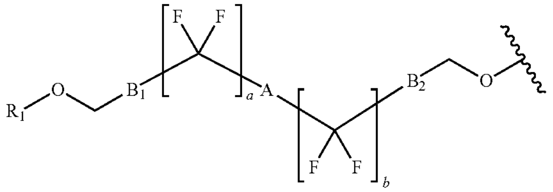

In formula (VI), $R_1$ is selected from (i) $C_1$-$C_5$ alkyl groups, which may be unsubstituted or substituted with one or more substituent groups (e.g., one or more fluoro groups for fluorinated $C_1$-$C_5$ alkyl groups), such as $C_1$-$C_4$ alkyl groups, $C_1$-$C_3$ alkyl groups, or $C_1$-$C_2$ alkyl groups, (ii) silicon-containing groups, such as —Si($OR_3$)($OR_4$)($OR_5$) where $R_3$, $R_4$, and $R_5$ can be the same or different, and can be independently selected from hydride group and alkyl groups, which may be unsubstituted or substituted with one or more substituent groups (e.g., one or more fluoro groups for fluorinated alkyl groups), (iii) other groups including one or more carbon atoms, (iv) other groups including one or more silicon atoms, and (v) other groups including one or more carbon atoms and one or more silicon atoms.

In formula (VI), A is a bond or is selected from (i) $C_1$-$C_{12}$ alkylene groups, which may be unsubstituted or substituted with one or more substituent groups (e.g., one or more fluoro groups for fluorinated $C_1$-$C_{12}$ alkylene groups), such as $C_1$-$C_{10}$ alkylene groups, $C_1$-$C_8$ alkylene groups, $C_1$-$C_5$ alkylene groups, $C_1$-$C_4$ alkylene groups, $C_1$-$C_3$ alkylene groups, or $C_1$-$C_2$ alkylene groups, (ii) silicon-containing groups, such as —Si($OR_6$)($OR_7$) where $R_6$ and $R_7$ can be the same or different, and can be independently selected from hydride group and alkyl groups, which may be unsubstituted or substituted with one or more substituent groups (e.g., one or more fluoro groups for fluorinated alkyl groups), (iii) other groups including one or more carbon atoms, (iv) other groups including one or more silicon atoms, (v) other groups including one or more carbon atoms and one or more silicon atoms, and (vi) ether groups including one or more moieties of the form —O—, such as —$R_8$—O—, —$R_8$—O—$R_9$—, —$R_8$—O—$R_9$—O—, and —$R_8$—O—$R_9$—O—$R_{10}$— where $R_8$, $R_9$, and $R_{10}$ can be the same or different, and can be independently selected from alkylene groups, which may be unsubstituted or substituted with one or more substituent groups (e.g., one or more fluoro groups for fluorinated alkylene groups) and silicon-containing groups.

In formula (VI), $B_1$ and $B_2$ can be the same or different, and can be independently selected from (i) bonds and (ii) $C_1$-$C_3$ alkylene groups, which may be unsubstituted or substituted with one or more substituent groups (e.g., one or more fluoro groups for fluorinated $C_1$-$C_3$ alkylene groups), such as $C_2$-$C_2$ alkylene groups.

In formula (VI), a and b are independently 0 or 1. In some embodiments, when a and b are 0, then $R_1$ is selected from $CF_3$ and $CH_2CF_3$. In some embodiments, a and b are 1.

In some embodiments, $B_1$ and $B_2$ are bonds, and the moiety is represented by the chemical formula:

(VII)

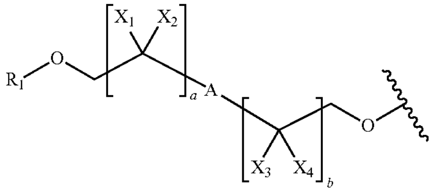

where $R_1$, A, a and b are given as explained above with regard to formula (VI).

In some embodiments, A is a bond, and the moiety is represented by the chemical formula:

(VIII)

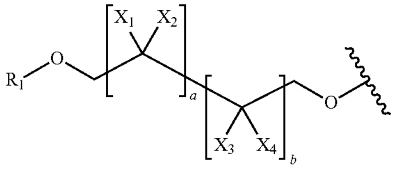

where $R_1$, a and b are given as explained above with regard to formula (VI).

In some embodiments, $R_1$=methyl, and the moiety is represented by the chemical formula:

(IX)

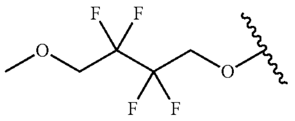

In some embodiments, the polymer is a copolymer represented by one of the chemical formulas:

$$-(CH_2-CHR)_m-(CH_2-CHR')_n- \quad (X)$$

$$-(CHR-CH_2)_m-(CH_2-CHR')_n- \quad (XI)$$

$$-(CH_2-CHR)_m-(CHR'-CH_2)_n- \quad (XII)$$

where R and R' are different side groups, R includes the moiety of formula (IV), n is an integer that is 1 or greater than 1, and m is an integer that is 1 or greater than 1. More generally, the copolymer can be a statistical copolymer, a random copolymer, an alternating copolymer, a periodic copolymer, or a block copolymer.

In some embodiments, the polymer is represented by the chemical formula:

(XIII)

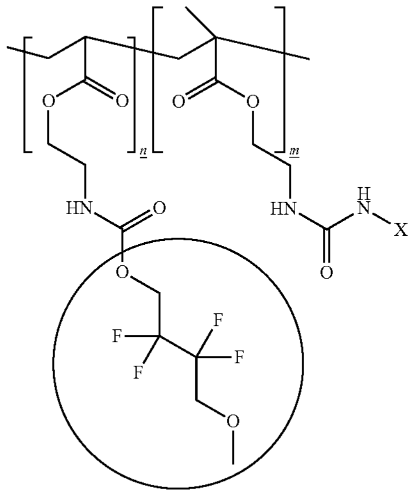

In formula (XIII), X is heterocyclic group, which may be unsubstituted or substituted with one or more substituent groups, such as a 6-membered heterocyclic group including 1 to 3 heteroatoms selected from N, O, and S.

In some embodiments, the polymer is represented by the chemical formula:

(XIV)

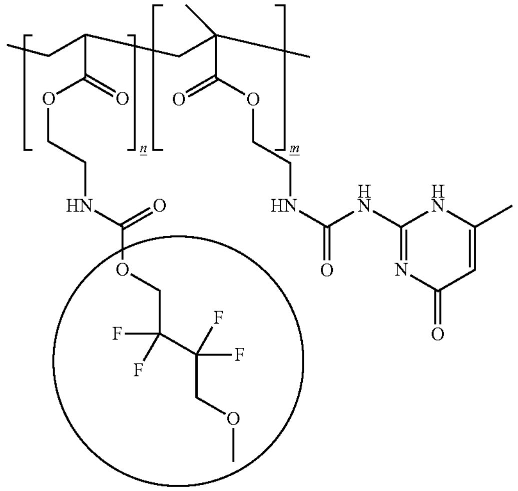

In additional embodiments, a layer of a battery includes a polymer which is represented by the chemical formula:

(XV)

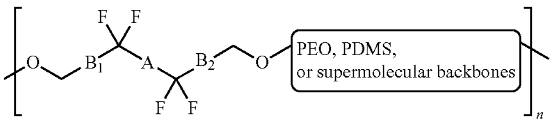

where $B_1$, $B_2$, and A are given as explained above with regard to formula (VI), and n is an integer that is 1 or greater than 1.

In additional embodiments, a layer of a battery includes a polymer which is represented by the chemical formula:

(XVI)

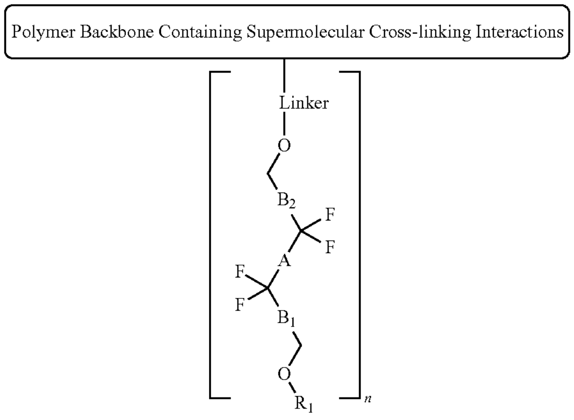

where $B_1$, $B_2$, and A are given as explained above with regard to formula (VI), and n is an integer that is 1 or greater than 1.

In additional embodiments, a layer of a battery includes a polymer which is represented by the chemical formula:

(XVII)

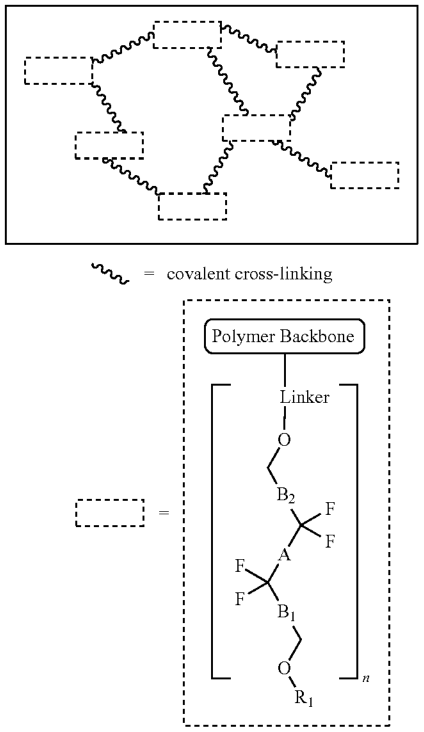

where $B_1$, $B_2$, and A are given as explained above with regard to formula (VI), and n is an integer that is 1 or greater than 1.

In additional embodiments, a battery includes (1) an anode structure including an anode current collector, (2) a cathode structure including a cathode current collector and a cathode material disposed on the cathode current collector, and (3) the layer of any of the foregoing embodiments disposed as a solid electrolyte between the anode structure and the cathode structure. In some embodiments, the anode structure further includes an anode material disposed on the anode current collector, and the anode material includes lithium metal, graphite, silicon, or a graphite/silicon composite anode material. In some embodiments, the graphite/silicon composite anode material includes a weight ratio of graphite/silicon of about 5:95 10:90, 20:80, 30:70, 40:60, 50:50, 60:40, 70:30, 20:80, 90:10, or 95:5. In some embodiments, the cathode material comprises a sulfur cathode or an air cathode (e.g., a Li—S or a Li-air battery). In some embodiments, the cathode material comprises a lithium nickel manganese cobalt oxide cathode (e.g., NMC532, NMC622, NMC811) or a lithium iron phosphate cathode (e.g., LFP).

In further embodiments, an electrode structure includes a current collector and the layer of any of the foregoing embodiments disposed as an interfacial coating on the current collector. In some embodiments, the electrode structure further includes an electrode material disposed between the current collector and the interfacial coating.

EXAMPLES

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

A Single-Salt-Single-Solvent Low-Concentration Electrolyte with Special Li—F Solvation Allows Practical Lithium-Metal Batteries

A. Overview

Electrolyte is an important yet constraining factor to allow practical lithium-metal batteries. Herein, design is made of an electrolyte using fluorinated 1,4-dimethoxylbutane (FDMB), a first-time synthesized molecule, as a single solvent and about 1 M lithium bis(fluorosulfonyl)imide (LiFSI) as a single salt. This low-concentration additive-free electrolyte provides a special Li—F solvation structure which not only endows it with brownish color but also significantly improves its compatibility with both Li-metal anodes and high-voltage cathodes. One of the thinnest solid-electrolyte interphases (about 6 nm) is observed under cryogenic electron microscope. Using about 1 M LiFSI/FDMB, a high Coulombic efficiency (CE of about 99.52%) and unprecedentedly fast activation (CE>about 99% within 5 cycles) are achieved for Li-metal anodes, while the Li| nickel manganese cobalt oxide (NMC) full cell (N/P of about 6) retains >about 90% h capacity after 400 cycles with an average CE of about 99.98%. Furthermore, the anode-free Cu|NMC811 pouch cell achieves about 320 Wh $kg^{-1}$ specific energy while the Cu|NMC532 one maintains about 80% capacity for 100 cycles. Detailed structure-property relationships are revealed between electrolyte design and performance.

B. Introduction

Several pioneering works on electrolyte engineering were accomplished in the battery community, including utilizing high concentration electrolytes (HCEs) or localized high concentration electrolytes (LHCEs), creating liquefied gas electrolytes, introducing salt additives, and modifying electrolyte solvents. These electrolyte designs improved the cycling capability of Li-metal batteries. Nevertheless, careful scrutiny of these electrolyte engineering strategies brings several points that can be further improved: (1) some of the electrolytes include salt concentration higher than about 1 molar (M), which imposes costs that impede large-scale commercialization; (2) low boiling point of solvents such as 1,2-dimethoxylethane (DME), or fluoro-diluents such as 1,1,2,2-tetrafluoroethyl-2,2,3,3-tetrafluoropropyl ether (TTE) or bis(2,2,2-trifluoroethyl) ether (BTFE) can make those electrolytes inevitably difficult to handle during practical battery fabrication; (3) almost all electrolytes suffer from low CE during the initial tens or even hundreds of cycles when evaluated in Li|copper (Cu) cells. This poor activation process can devastate Li-metal batteries since a considerable amount of Li metal will be consumed at the early stage of cycling; (4) the complex combination of electrolyte components hinders the detailed and clear understanding on structure-property relationships.

In addition to these intrinsic issues, electrolyte engineering strategies still fall short when confronted with realistic conditions, such as lean electrolyte condition and limited Li excess. Most of the Li-metal batteries, therefore, were actually tested under half-cell configuration, where Li metal was a huge reservoir and electrolyte was flooded. Those cells cannot be practically implemented albeit with fair performance, because the specific energy is even lower than commercial Li-ion batteries. The excess active Li and electrolyte can cause safety concerns as well. Instead, practical Li-metal batteries are driving increasing attention using thin Li layer (about 20-50 μm thin Li foils or finite electrodeposited Li) and even anode-free condition with lean electrolyte. An anode-free battery includes a negative electrode which solely contains Cu current collector with zero-excess Li.

Figure 1:
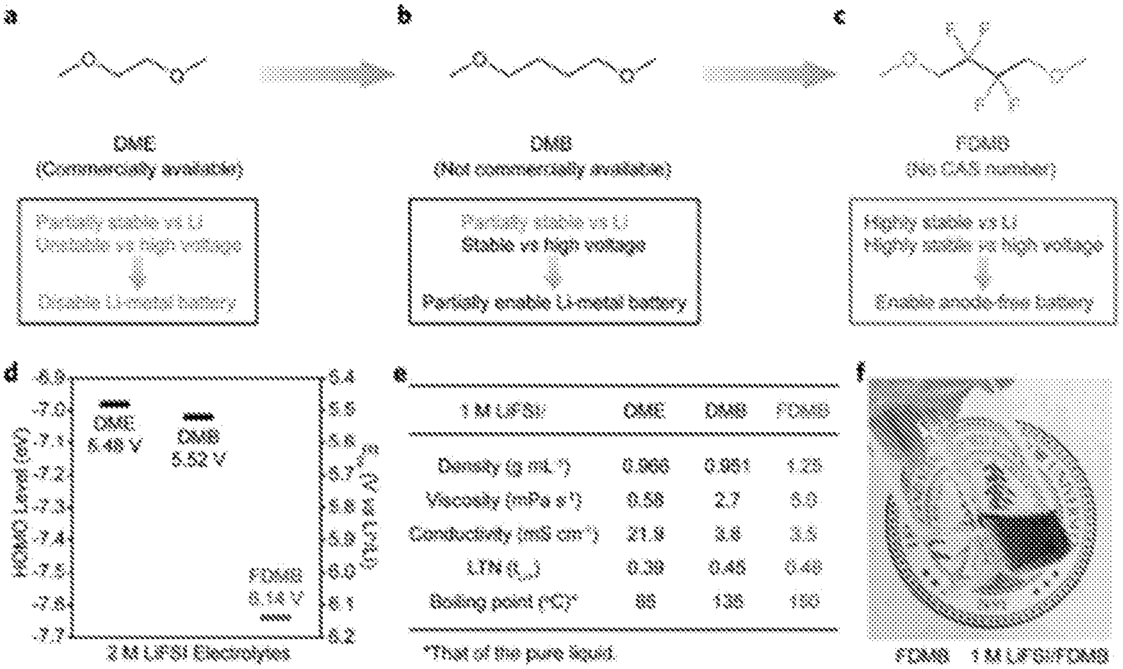
FIG. 1 shows design principles and physicochemical properties of electrolytes.

To solve the above-mentioned issues regarding electrolyte and practical conditions, herein design is made of a liquid molecule that has not been reported or synthesized, fluorinated 1,4-dimethoxylbutane (FDMB, FIG. 1), as a single electrolyte solvent. With about 1 M lithium bis(fluorosulfonyl)imide (LiFSI) as a salt, development is made of a single-salt-single-solvent low-concentration electrolyte. The about 1 M LiFSI/FDMB electrolyte shows an intriguing brownish color, which has hardly been observed in pure Li salt solution. Detailed study confirmed that this electrolyte contains a special Li—F interaction and solvation structure, which not only results in the color but also is directly responsible for its excellent anodic and cathodic stability. For the Li metal side, this electrolyte achieves a high CE (>about 99.52%) with improved Aurbach method, and a high first-cycle CE (about 97.6%) with unprecedentedly short activation period (CE>about 99% within 5 cycles) during Li|Cu half-cell cycling. Cryogenic electron microscope (Cryo-EM) confirms the Li-metal stability by showing an ultra-thin and uniform SEI (about 6 nm). For the cathode side, excellent oxidation tolerance over about 6 V is found. With the excellent Li-metal compatibility and high-voltage stability, the about 1 M LiFSI/FDMB electrolyte realizes >about 90% capacity retention and an average CE of about 99.98% over 400 cycles in limited-excess Li|lithium nickel manganese cobalt oxide (NMC) coin cells. Furthermore, Cu|NMC532 pouch cells under lean electrolyte condition maintains >about 80% capacity retention for 100 cycles, achieving the longest cycle life among the state-of-the-art anode-free batteries (Table 1); Cu|NMC811 pouch cells exhibit an unprecedentedly high specific energy of about 320 Wh $kg^{-1}$, which can be further increased if Ah-level cells are conducted. This streamlined electrolyte improves the Li-metal battery cyclability to a realistic level, marking a significant advancement for Li-metal battery development. With theoretical and experimental evidence, this example elucidates the structure-performance correlation, and can guide further electrolyte optimizations.

TABLE 1

Comparison of anode-free Li metal battery performance.

| Electrolyte Engineering | Electrolyte Amount | Cell Condition | Capacity Retention |
|---|---|---|---|
| 4M LiFSI in DME | ~44 g $(Ah)^{-1}$ | Cu\|LFP coin cell, 1.71 mAh $cm^{-2}$ | ~C/8 charge/discharge, 60% after 50 cycles |
| 1M LiTFSI + 2M LiFSI + 3 wt % $LiNO_3$ in DME/DOL | Not mentioned | Cu\|LFP coin cell, 0.85 mAh $cm^{-2}$ | 39% after 100 cycles |
| 7M LiFSI in FEC | Not mentioned | Cu\|LNMO coin cell, 1.43 mAh $cm^{-2}$ | 54% after 50 cycles |
| 2M $LiPF_6$ in EC/DEC + 50% FEC | Not mentioned | Cu\|NMC111 coin cell, ~1.6 mAh $cm^{-2}$ | ~C/8 charge/discharge, 40% after 50 cycles |
| 1M $LiPF_6$ in FEC/FEMC/HFE | ~47 g $(Ah)^{-1}$ | Cu\|NMC811 coin cell, ~2.0 mAh $cm^{-2}$ | ~C/4 charge/discharge, 50% after 30 cycles |
| 1LiFSI-1.2DME-3TTE | 3 g $(Ah)^{-1}$ | Cu\|NMC811 coin cell, ~4.2 mAh $cm^{-2}$ | C/10 charge, C/3 discharge, 77% after 70 cycles |
| 1M LiDFOB + 0.2M $LiBF_4$ in FEC/DEC | ~2 g $(Ah)^{-1}$ | Cu\|NMC532 pouch cell, ~250 mAh | C/5 charge, C/2 discharge, 80% after 80 or 90 cycles |
| This example, 1M LiFSI/FDMB | about 2 g $(Ah)^{-1}$ | Cu\|NMC532, Cu\|NMC622, and Cu\|NMC811 pouch cells, 200-250 mAh | C/5 charge, C/3 discharge, 80% after 100 cycles |

C. Molecular Design Strategy

Comparative ether-based electrolytes can sustain fair performance for Li metal anodes; however, they generally suffer from low oxidation stability, which devastates their performance when high-voltage cathodes are applied. For example, a series of ether electrolytes based on LiFSI and DME (FIG. 1*a*) are found to be oxidized on aluminum (Al) electrode at about 4 V versus $Li^+$/Li. In addition, the Li metal compatibility of ether-based electrolytes are still severely restricted within high Li salt concentration.

Figure 6:
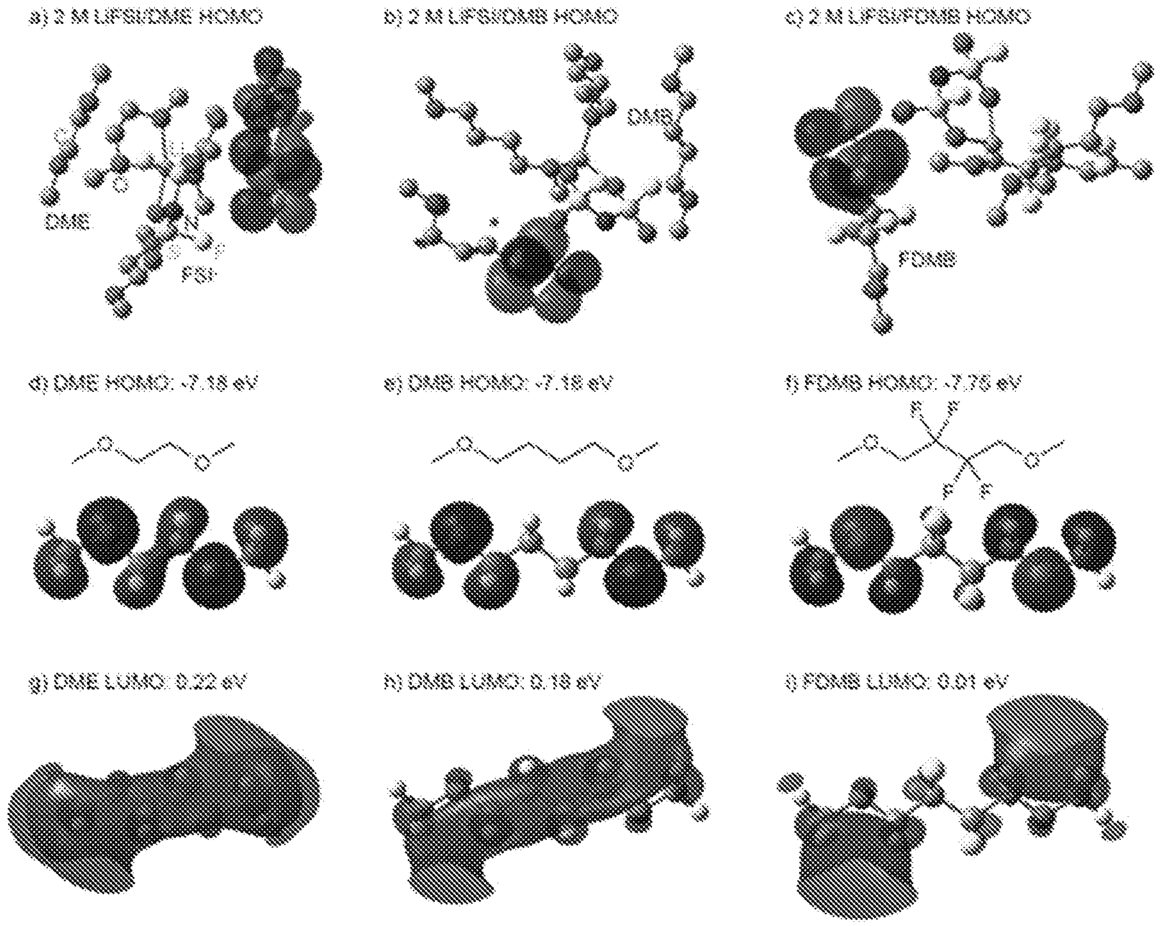
FIG. 6 shows HOMO level of three about 2 M LiFSI electrolytes: about 2 M LiFSI/DME (FIG. 6*a*); about 2 M LiFSI/DMB (FIG. 6*b*); about 2 M LiFSI/FDMB (FIG. 6*c*). The HOMO and LUMO level of three pure liquids: DME (FIGS. 6*d,g*); DMB (FIGS. 6*e,h*); FDMB (FIGS. 6*f,i*).

To achieve a low-concentration additive-free ether electrolyte, first lengthening is made of the alkyl chain in the middle of DME structure to obtain the 1,4-dimethoxylbutane (DMB, FIG. 1*b*). Such modification can take the advantage of long and stable alkyl chain, while still maintaining the ability to solvate Li salt and conduct $Li^+$ ions. The robustness of DMB backbone is assumed to vastly increase the high-voltage tolerance of ether and further improve the Li metal stability, thereby allowing Li-metal battery. For a further increase in the oxidation voltage and Li metal stability, the electron-withdrawing groups can be introduced properly in the backbone. However, most of the electron-withdrawing groups are volatile on Li metal side due to the ease to accept electrons from highly-reductive Li. Therefore, —F is chosen as the functional group to increase the high-voltage tolerance while preventing ceaseless parasitic reactions with Li metal. In the meantime, the $Li^+$ ion solvation ability of —O— groups on ethers can be devoted if those introduced —F groups are distant (the —F groups that are too close to —O— may hinder its solvation ability). Regarding this point, functionalization is made of the central part to $—CF_2—$ (highlighted part in FIG. 1*c*) while leaving both $CH_3—O—CH_2—$ groups (end parts in FIG. 1*c*) intact, to yield the FDMB molecule which can be both highly anode- and cathode-friendly (FIG. 1*c*). It is worth noting that the FDMB is a new organic molecule without CAS number. Density functional theory (DFT) calculations show lower highest occupied molecular orbital (HOMO) levels for LiFSI/DMB and LiFSI/FDMB electrolytes, corresponding to higher theoretical oxidation voltages (about 5.52 V for LiFSI/DMB and about 6.14 V for LiFSI/FDMB, FIG. 1*d* and FIG. 6). This simulated result supports the design that they are more anti-oxidant.

Figure 7:
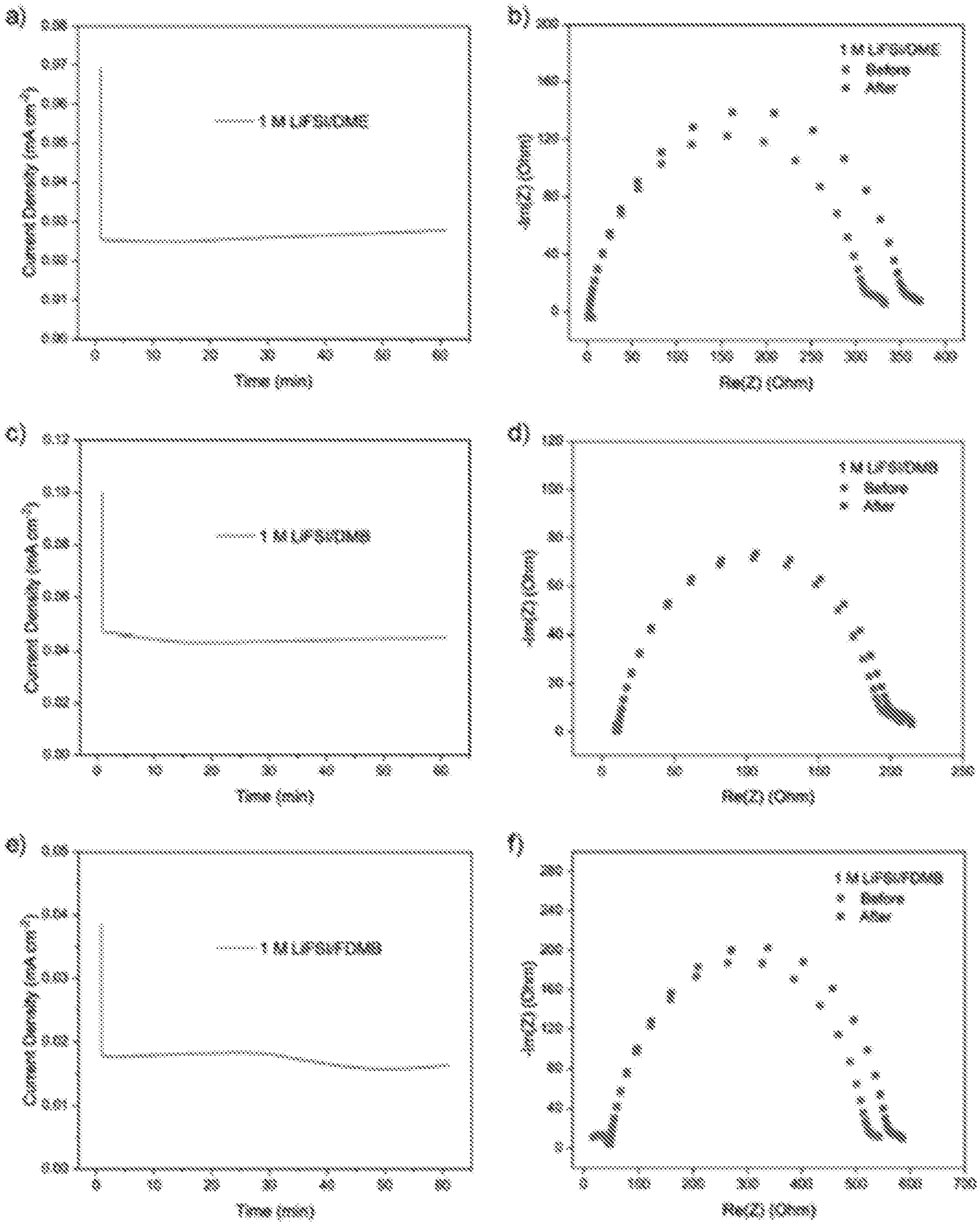
FIG. 7 shows lithium transference number (LTN) measurements of three about 1 M LiFSI electrolytes.
Figure 8:
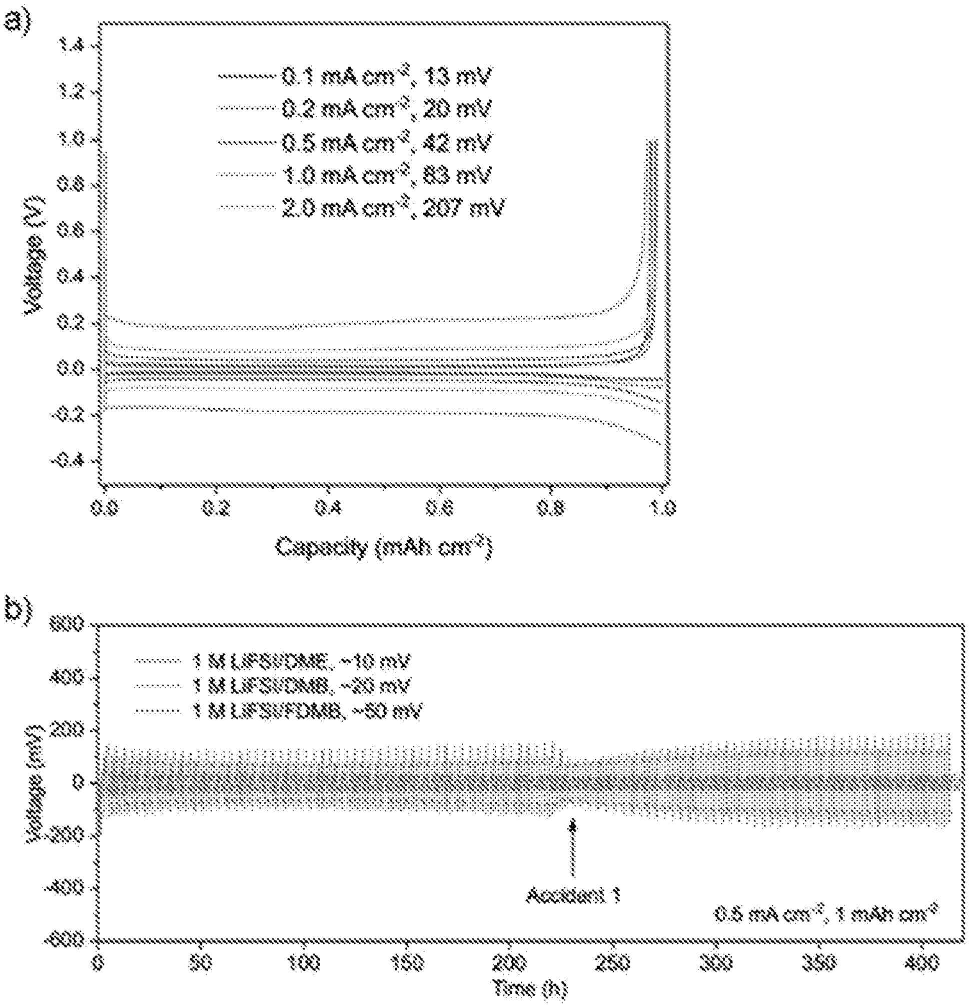
FIG. 8*a* shows overpotentials of Li|Cu half cells and FIG. 8*b* shows overpotentials of Li|Li symmetric cells.
Figure 9:
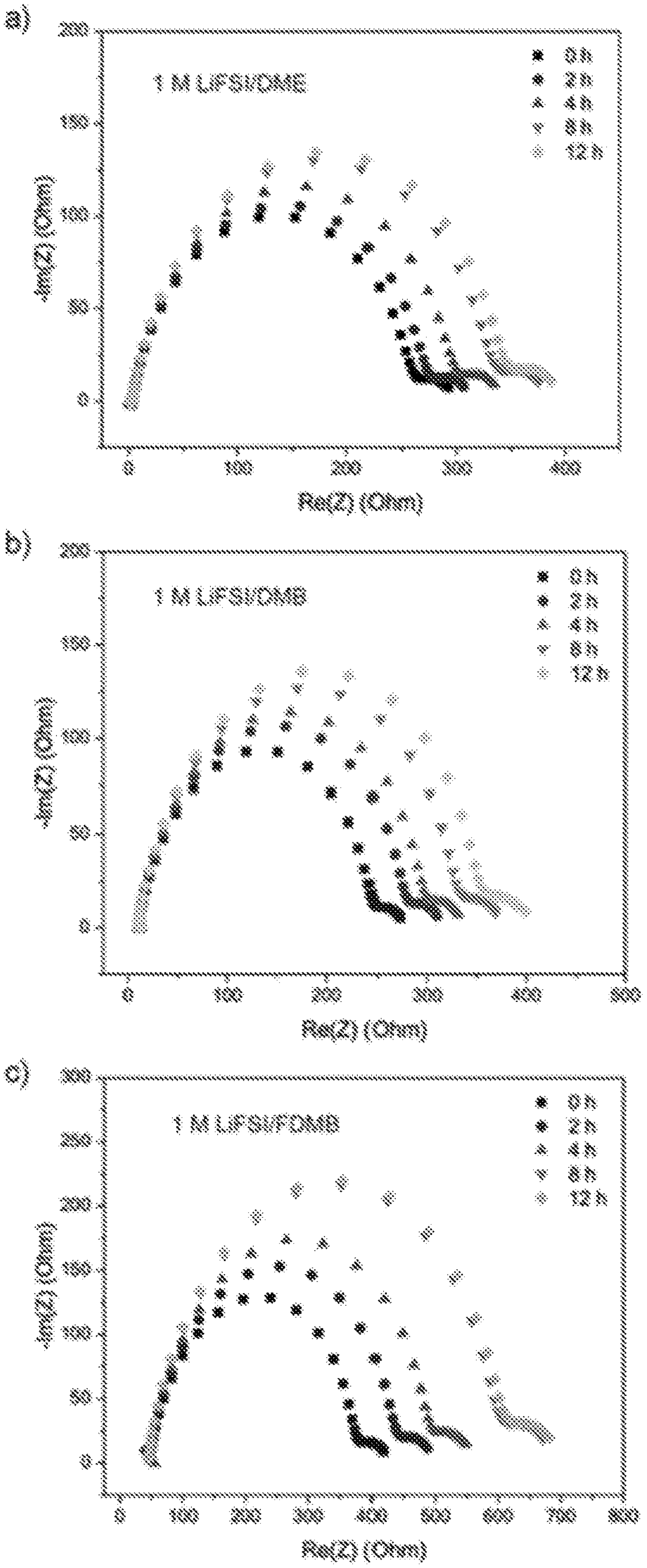
FIG. 9 shows electrochemical impedance of Li|Li symmetric cells over time with three about 1 M LiFSI electrolytes.
Figure 10:
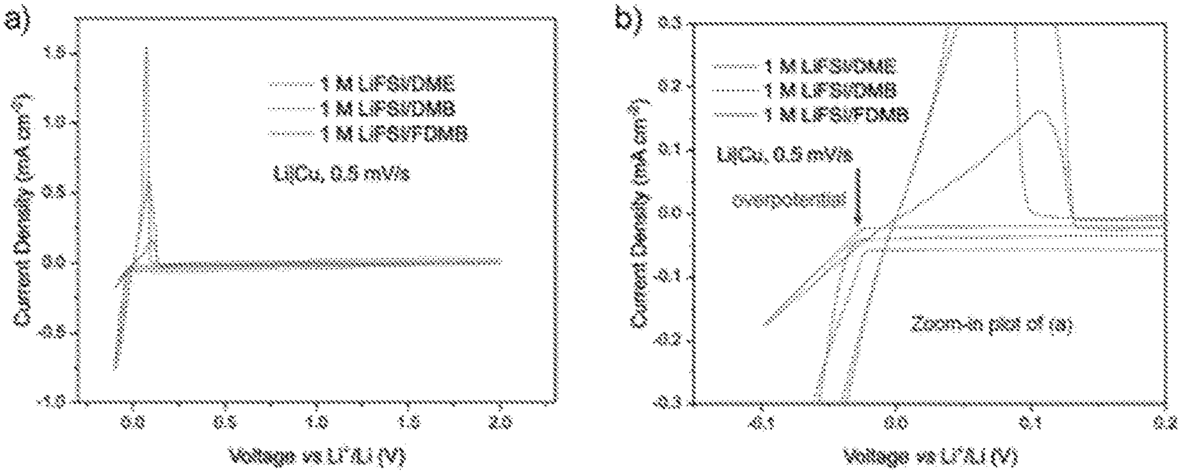
FIG. 10*a* shows anodic cyclic voltammetry (CV) of three about 1 M LiFSI electrolytes in Li|Cu half cells.
FIG. 10*b* shows an enlarged portion of FIG. 10*a*.

After one-step synthesis of the DMB and FDMB (Methods and Supplementary Information Synthesis), their basic physicochemical properties are determined (FIG. 1*e*). The DMB and FDMB show much higher boiling point (b.p.) than DME does, which is highly desired for practical battery application. These solvents are further made into about 1 M LiFSI or about 1 M lithium bis(trifluoromethanesulfonyl) imide (LiTFSI) electrolytes with water content lower than about 30 ppm (FIG. 7). They all show reasonable ion conductivities, $Li^+$ transference numbers (LTNs), viscosities, densities, Li metal overpotentials, and Li stripping/deposition capabilities (FIG. 1*e* and Table 2 and FIGS. 7-10). Interestingly, the about 1 M LiFSI/FDMB shows brownish color which is not observed in comparative Li salt solutions (FIG. 1*f*). The structure-property relationship between the color, $Li^+$-solvent interaction, and performance enhancement will be discussed in later sections.

TABLE 2

Physicochemical properties of three pure liquids and their about 1M LiFSI and about 1M LiTFSI electrolytes.

| | DME | DMB | FDMB |
|---|---|---|---|
| Density (g $mL^{-1}$) | 0.868 | 0.856 | 1.21 |
| Viscosity (cp at 25° C.) | 0.31 | 0.68 | 1.4 |
| Boiling point (° C.) | 85 | 135* | 150* |
| | 1M LiFSI/DME | 1M LiFSI/DMB | 1M LiFSI/FDMB |
| Density (g $mL^{-1}$) | 0.966 | 0.951 | 1.25 |
| Viscosity (cp at 25° C.) | 0.58 | 2.7 | 5.0 |
| Conductivity (mS $cm^{-1}$) | 21.9 | 3.8 | 3.5 |
| LTN | 0.39 | 0.45 | 0.48 |
| Water content (ppm) | 20.66 | 18.21 | 16.84 |
| | 1M LiTFSI/DME | 1M LiTFSI/DMB | 1M LiTFSI/FDMB |
| Density (g $mL^{-1}$) | 0.967 | 0.982 | 1.29 |
| Viscosity (cp at 25° C.) | 0.69 | 3.6 | 4.5 |
| Conductivity (mS $cm^{-1}$) | 16.4 | 4.6 | 3.0 |
| Water content (ppm) | 23.69 | 28.28 | 35.63 |

Note:
The boiling points (*labelled) of DMB and FDMB were measured based on distillation at about 1 atm. The DMB and FDMB showed high boiling points for pratical battery application. All about 1 M electrolytes showed reasonable densities, viscosities, ion conductivities,
Li transference numbers (LTNs), and water contents. It is worth nothing that the LTN of about 1 M LiFSI/FDMB is as high as about 0.5, which is a sign that LiFSI is not fully dissociated in FDMB. This is consistent with the solvation structure of about 1 M LiFSI/FDMB.

D. Special Li—F Interaction and Solvation Structure

Figure 2:
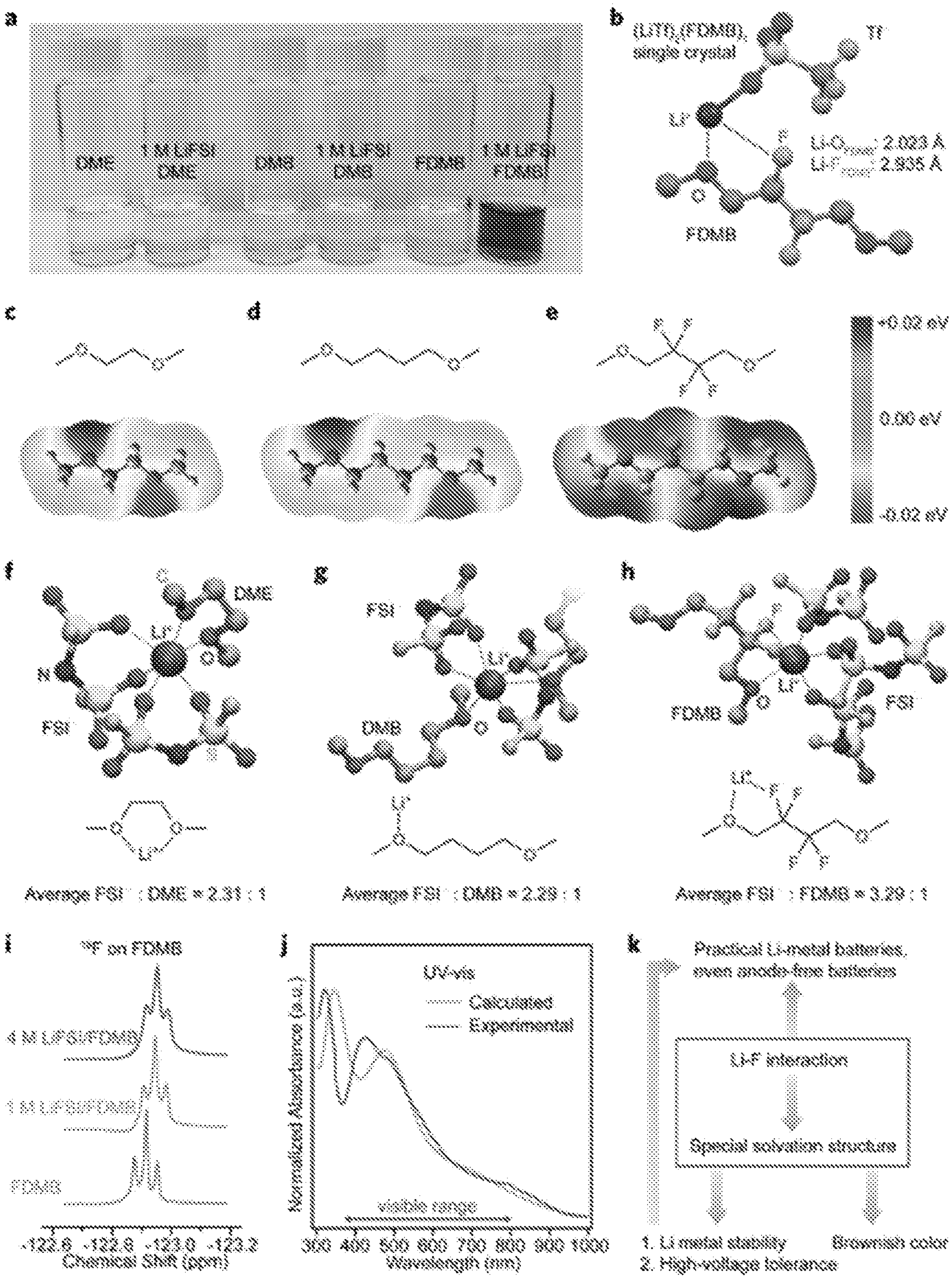
FIG. 2 shows special solvation structure in about 1 M LiFSI/FDMB electrolyte.
Figure 11:
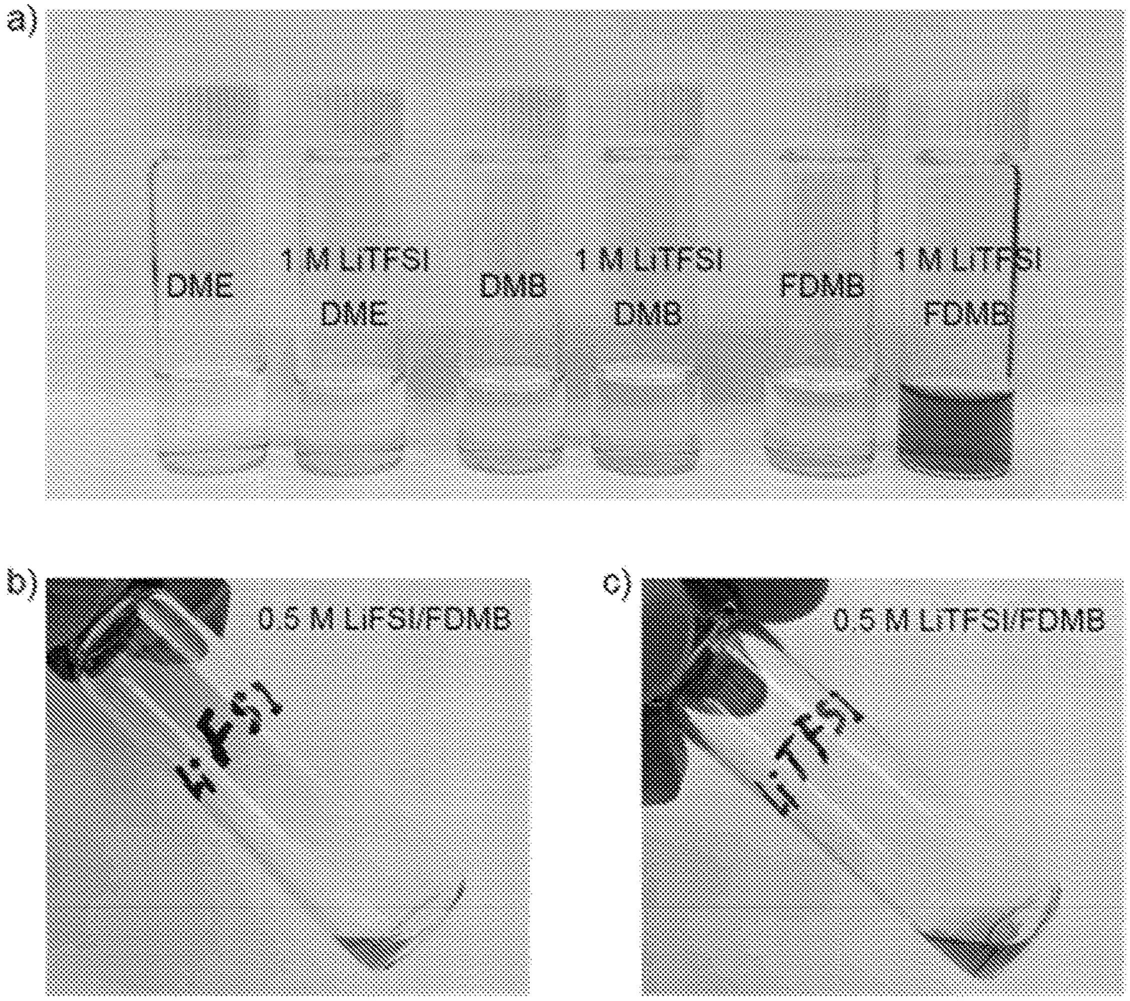
FIG. 11*a* shows color of three pure liquids and their about 1 M LiTFSI electrolytes.
FIG. 11*b* shows color of about 0.5 M LiFSI/FDMB.
FIG. 11*c* shows color of about 0.5 M LiTFSI/FDMB.
Figure 12:
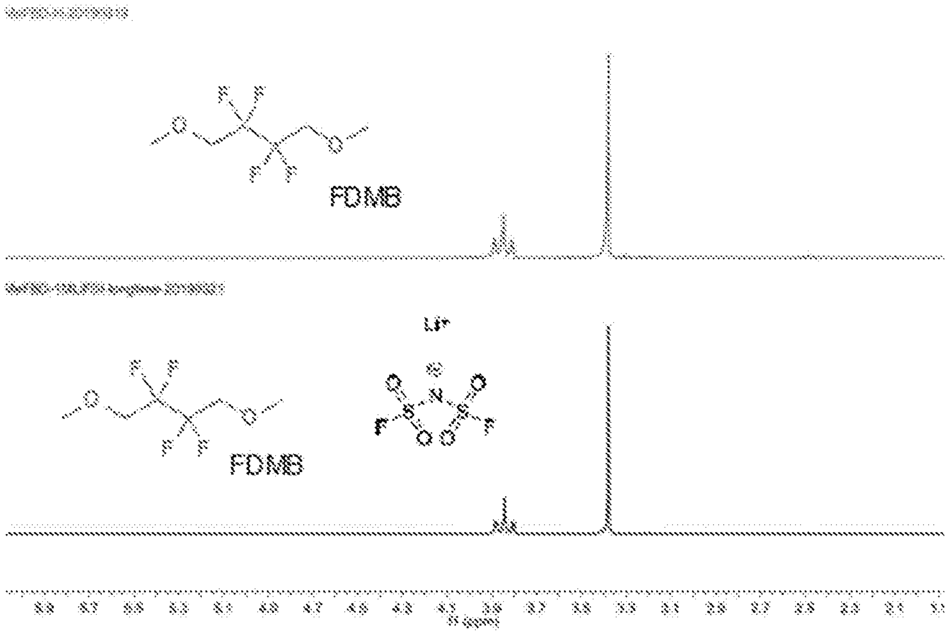
FIG. 12*a* shows $^{1}H$- and FIG. 12*b* shows $^{19}F$- (b) NMR of FDMB and about 1 M LiFSI/FDMB after storing in the glovebox for over one month.
Figure 12:
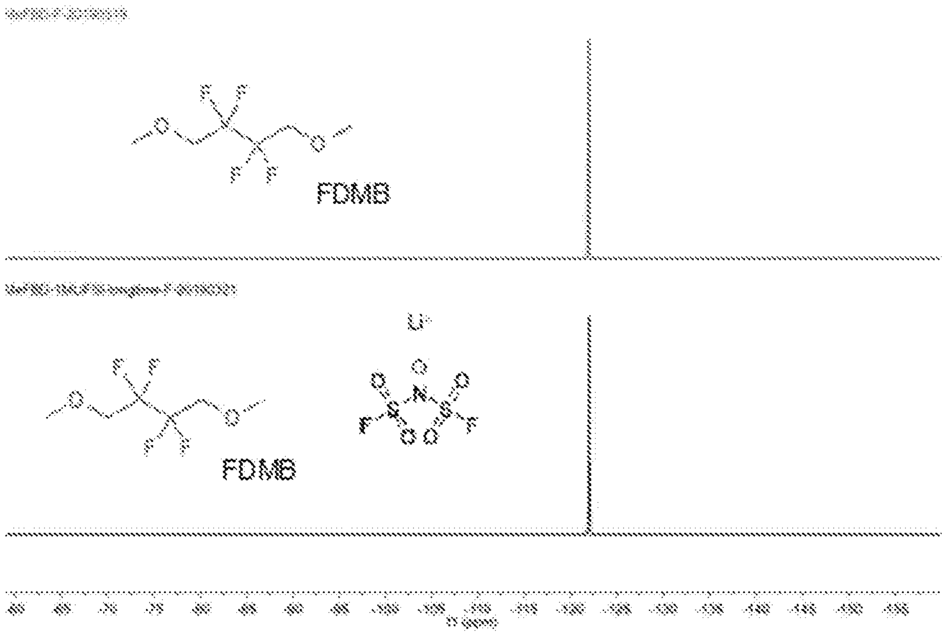
Figure 13:
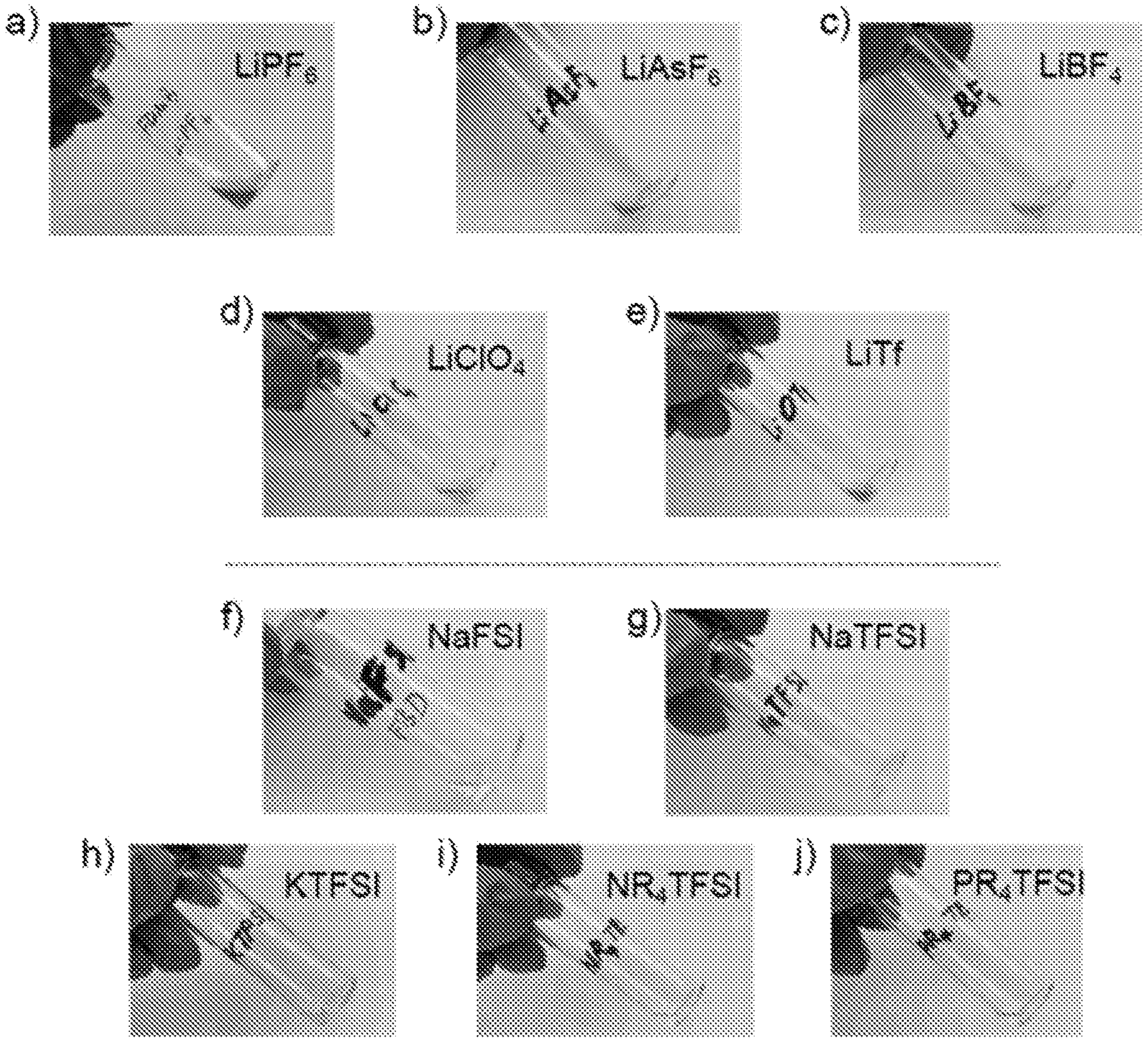
FIG. 13 shows the color of different salts or ionic liquids dissolved in FDMB: lithium hexafluorophosphate ($LiPF_6$, FIG. 13*a*); lithium hexafluoroarsenate ($LiAsF_6$, FIG. 13*b*); lithium tetrafluoroborate ($LiBF_4$, FIG. 13*c*); lithium perchlorate ($LiClO_4$, FIG. 13*d*); lithium triflate (LiTf, FIG. 13*e*); sodium bis(fluorosulfonyl)imide (NaFSI, FIG. 13*f*); sodium bis(trifluoromethanesulfonyl)imide (NaTFSI, FIG. 13*g*); potassium bis(trifluoromethanesulfonyl)imide (KTFSI, FIG. 13*h*); tetrabutylammonium bis(trifluoromethanesulfonyl) imide ($NR_4TFSI$, FIG. 13*i*); trihexyltetradecylphosphonium bis(trifluoromethylsulfonyl)amide ($PR_4TFSI$, FIG. 13*j*).

Among this series of electrolytes studied in this example, just LiFSI and LiTFSI in FDMB show brownish color, regardless of the salt concentration (FIG. 2*a* and FIG. 11). The nuclear magnetic resonance (NMR) study rules out the possibility of impurity or electrolyte decomposition (FIG. 12). Furthermore, when Li salts with different anions are dissolved in FDMB, they all yield similar brownish color; however, when sodium (Na) or potassium (K) salts or several ionic liquids with either $FSI^-$ or $TFSI^-$ anions are dissolved, colorless transparent solutions are obtained (FIG. 13). These experiments indicate that there may be some special $Li^+$-solvent interaction that is responsible for the unique color in FDMB electrolytes.

To check the coordination structure, the single crystal of lithium triflate (LiTf) co-crystalized with FDMB is obtained (FIG. 2*b* and Supplementary Information Single Crystals). LiTf is chosen because it is structurally similar to LiFSI yet much easier to be crystalized. The crystal structure clearly demonstrates that the $Li—O_{FDMB}$ distance (about 2.023 Å) is similar to that of $Li—F_{FDMB}$ (about 2.935 Å), thereby indicating strong interaction between $Li^+$ ions and F atoms on FDMB. This strong Li—F interaction can be rationalized by the electrostatic potential (ESP) calculations, which highly correlate with noncovalent or electrostatic interactions (FIG. 2*c*-*e*). The isopotential surfaces of DME (FIG. 2*c*) and DMB (FIG. 2*d*) show similar trend, and the negative parts concentrate on the O atoms. Therefore, the —O— groups can strongly coordinate with $Li^+$ ions. Nevertheless, the isopotential surface of FDMB (FIG. 2*e*) is significantly different from the former two under the same scale, where the negative charge is almost equally located at both $O_{FDMB}$ and $F_{FDMB}$ atoms. This explains the strong Li—F interaction observed in single crystal.

Figure 14:
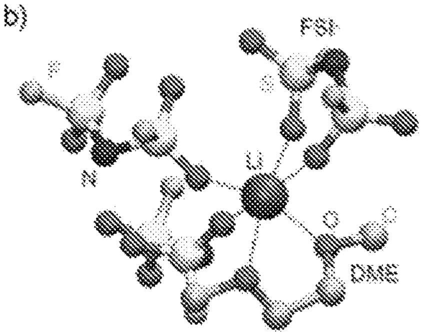
FIG. 14 shows MD simulation results of about 1 M LiFSI/DME electrolyte.
Figure 14:
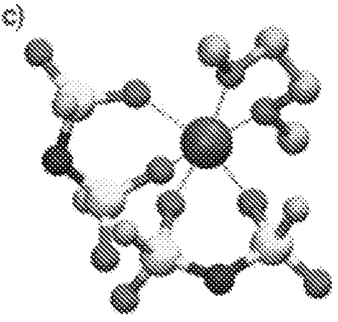
Figure 15:
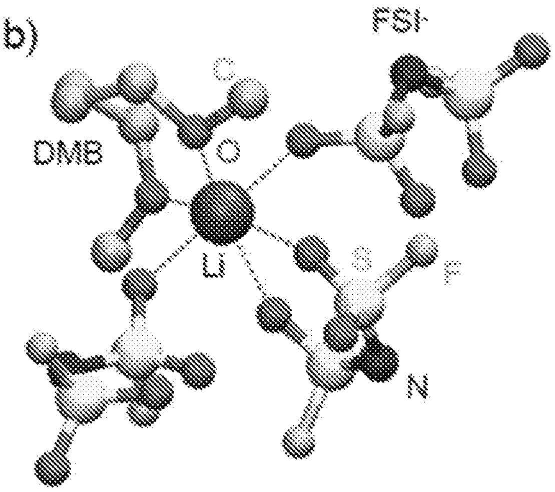
FIG. 15 shows MD simulation results of about 1 M LiFSI/DMB electrolyte.
Figure 15:
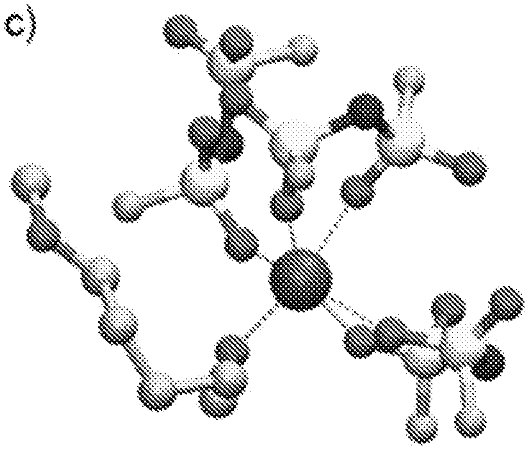
Figure 15:
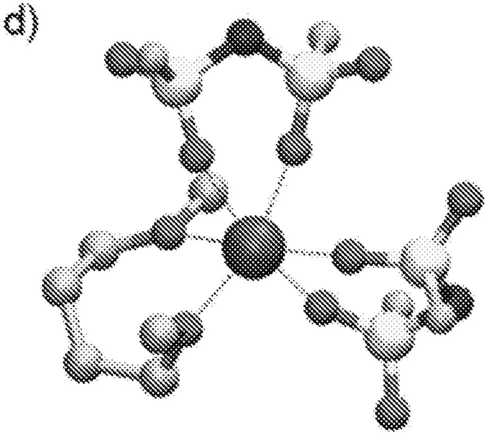
Figure 16:
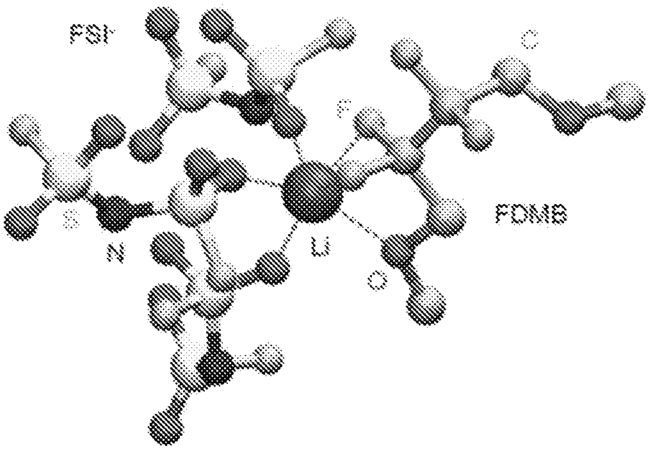
FIG. 16 shows MD simulation results of about 1 M LiFSI/FDMB electrolyte. (a) All cases of $FSI^-$ and FDMB numbers in the solvation sheath and corresponding probability. (b) A snapshot of the solvation sheath.
Figure 17:
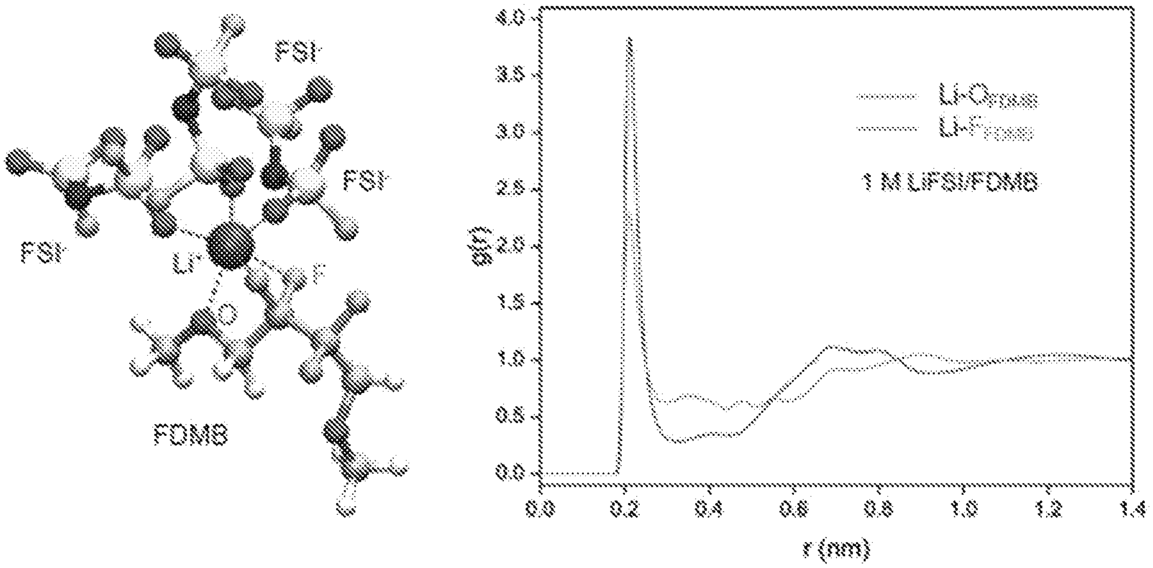
FIG. 17 shows radial distribution functions (RDF) of the about 1 M LiFSI/FDMB electrolyte by MD simulations. The Li—$O_{FDMB}$ curve (brown) showed the radial distribution of $Li^+$ ions and O atoms on FDMB; the Li—$F_{FDMB}$ curve (purple) showed the radial distribution of $Li^+$ ions and F atoms on FDMB.
Figure 18:
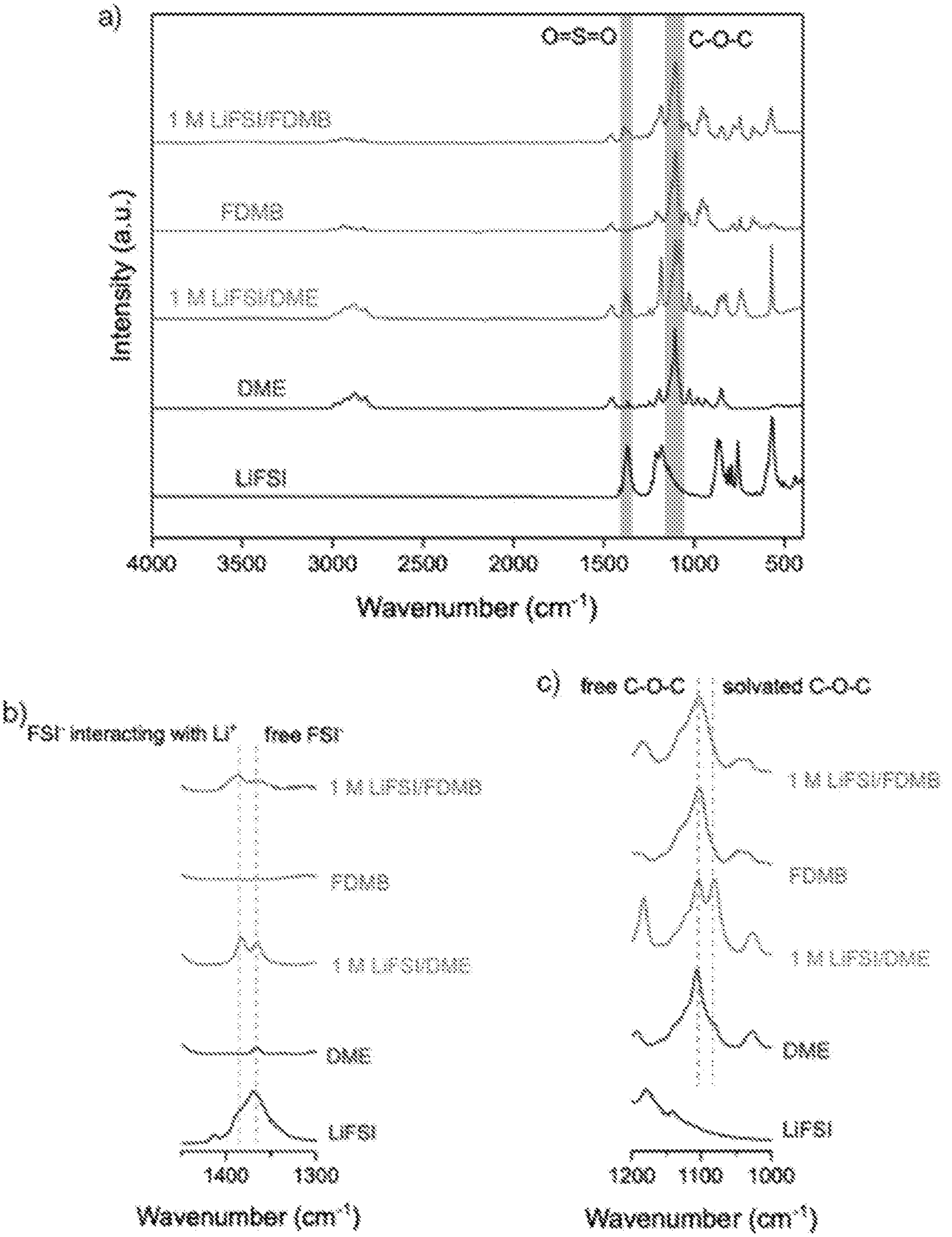
FIG. 18 shows FTIR spectra of about 1 M LiFSI/DME and about 1 M LiFSI/FDMB electrolytes. (a) The whole spectrum; (b) zoom-in plot showing the S═O (on $FSI^-$) vibration; (c) zoom-in plot showing the C—O—C (on DME or FDMB) vibration.
Figure 19:
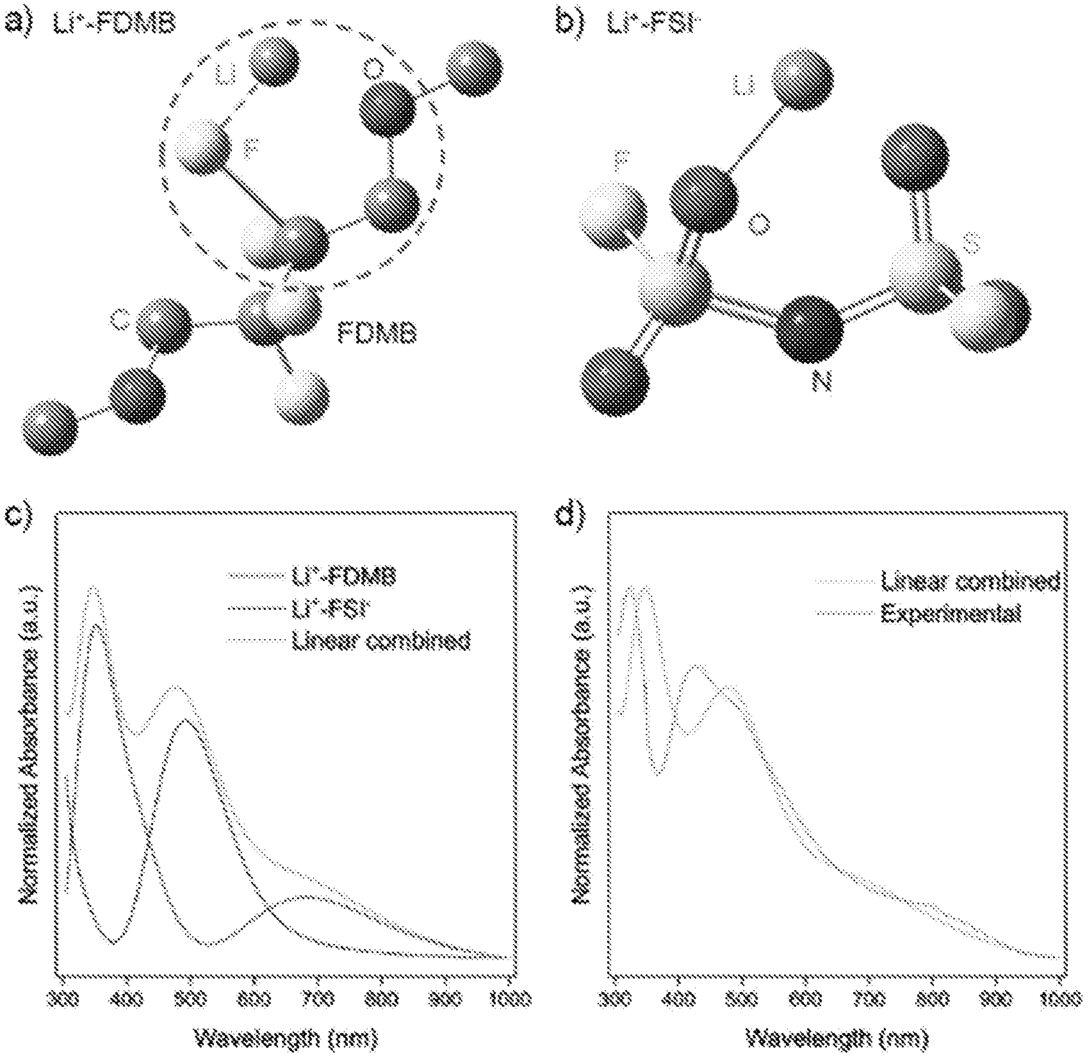
FIG. 19 shows calculated UV-vis spectra. (a) Optimized $Li^+$-FDMB species, in which the red circle showed the $Li^+$—F—C—C—O five-member ring. (b) Optimized $Li^+$—$FSI^-$ species. (c) Linear combination of two calculated UV-vis spectra. (d) Comparison of combined and experimental UV-vis spectra.

Besides, molecular dynamics (MD) simulations are conducted on three about 1 M LiFSI electrolytes to confirm the coordination structures (FIG. 2*f-h*). The DME molecule serves as a "clamp" to coordinate with $Li^+$ ion with its both —O— groups, forming a five-member ring (FIG. 2*f* and FIG. 14). For DMB molecule, consistent with single crystal result (Supplementary Information Single Crystals), the majority of $Li^+$-solvent coordination structures are "linear", where just one —O— group on DMB is bound with one $Li^+$ ion (FIG. 2*g*); however, the "clamp" coordination can still be found in a minority (FIG. 15). Different from either DME or DMB, the FDMB contributes to an unprecedentedly five-member ring structure where $Li^+$ ion is bound simultaneously with $O_{FDMB}$ and $F_{FDMB}$ atoms (FIG. 2*h* and FIG. 16). This coordination matches well with the above-mentioned single crystal result, and can be further cross-validated by simulated radial distribution functions (RDF, FIG. 17), Fourier-transform infrared spectra (FTIR, FIG. 18), and $^{19}F$-NMR (FIG. 2*i*). With the LiFSI concentration increasing, the $^{19}F$ peak on FDMB shows an upfield shift, which is regarded as an indication of Li—F interaction, while the FTIR spectra assist with this argument by showing Li—F interaction peaks. The measure ultraviolet-visible (UV-vis) spectrum of about 1 M LiFSI/FDMB matches well with the calculated one, where the large absorption in visible range (brownish color) may be attributed to charge transfer induced by this special solvation (FIG. 2*j* and FIG. 19).

Figure 20:
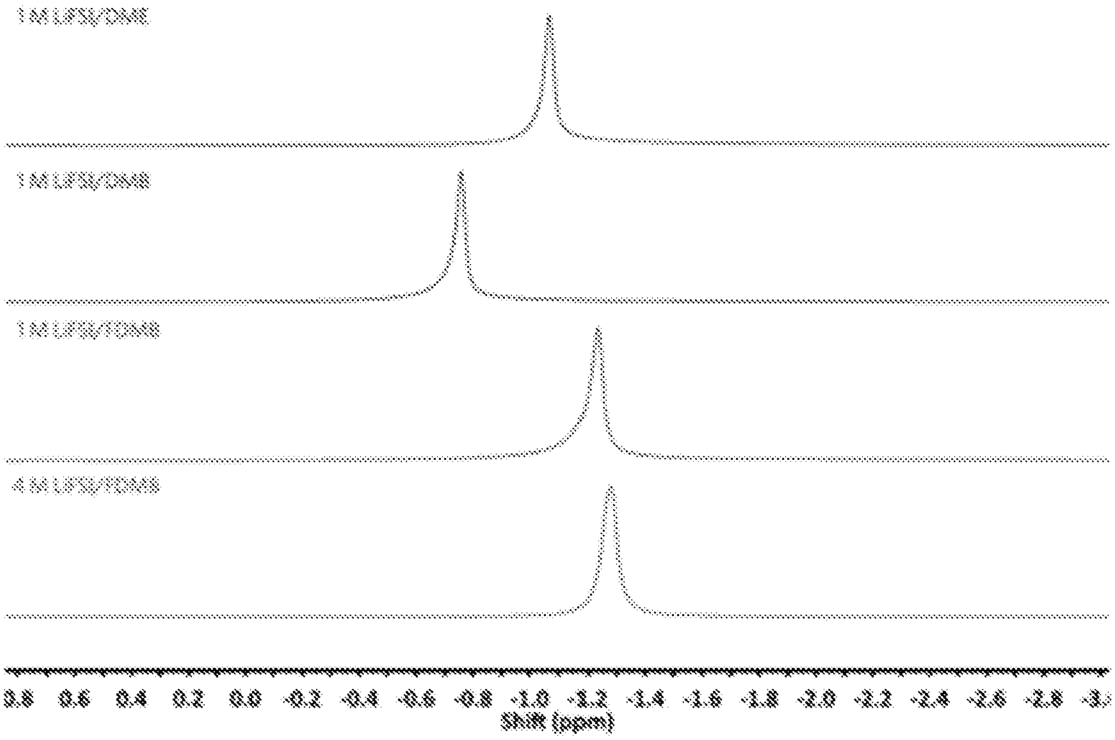
FIG. 20 shows $^{7}Li$-NMR spectra of different LiFSI electrolytes.
Figure 21:
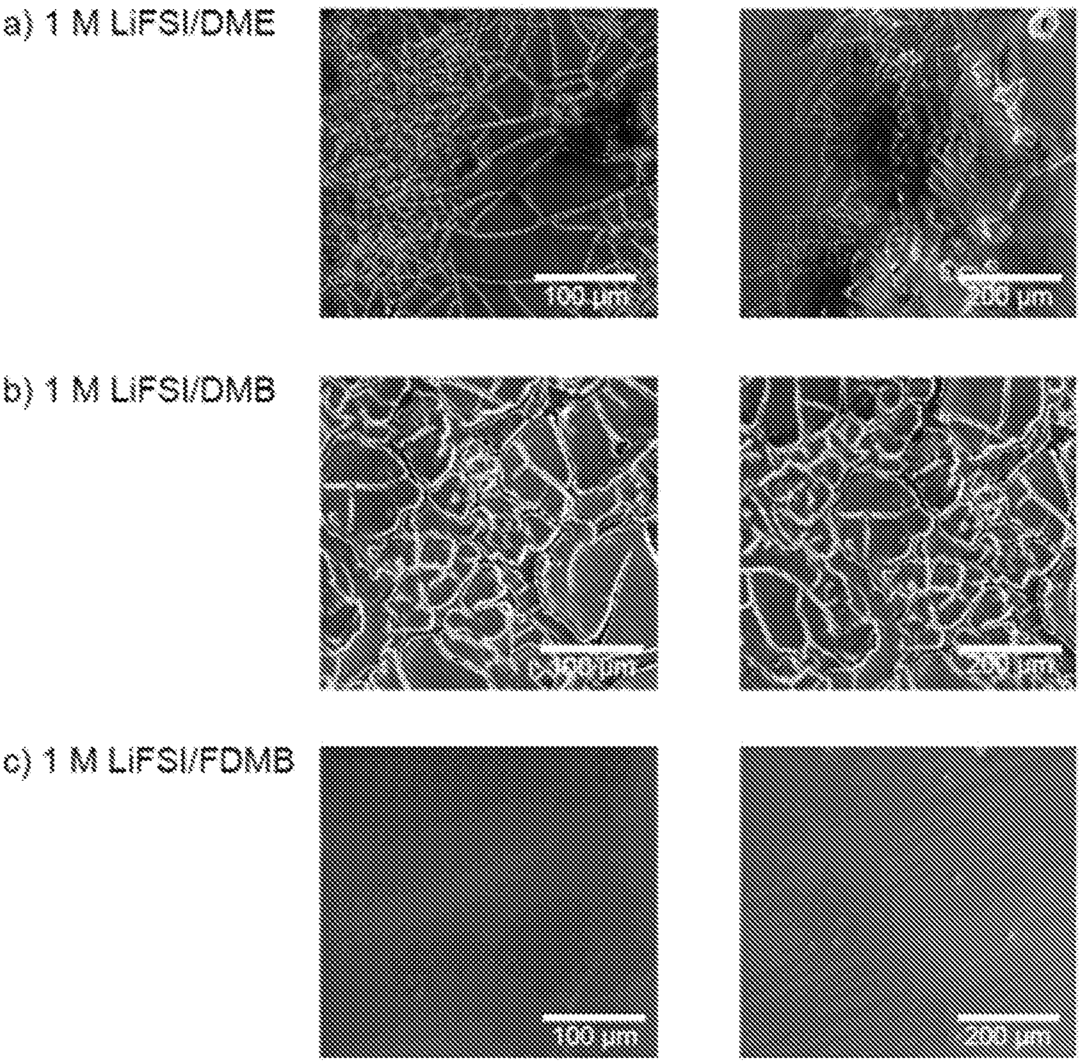
FIG. 21 shows Al corrosion test in about 1 M LiFSI/DME (a), about 1 M LiFSI/DMB (b), and about 1 M LiFSI/FDMB (c).

These different coordination structures finally lead to non-negligible difference in the about 1 M LiFSI electrolytes macroscopically. In the $Li^+$ solvation sheath, the average ratio of solvation bindings from $FSI^-$ anions to those from solvents (coordination provided by $FSI^-$ anions and solvents surrounding one $Li^+$ ion) is about 2.31:1 for DME, and about 2.29:1 for DMB, respectively (FIGS. 2*f* and *g*). This result is consistent with the $^7Li$-NMR peak difference of about 1 M LiFSI/DMB and about 1 M LiFSI/DME, where the former one is shifted downfield to show worse anion shielding effect (FIG. 20). Nevertheless, the $FSI^-$/solvent ratio is drastically increased to about 3.29:1 in about 1 M LiFSI/FDMB electrolyte (FIG. 2*h*). Higher $FSI^-$/solvent ratio in the $Li^+$ solvation sheath indicates that the cation-anion dissociation capability of FDMB is relatively weaker than DME or DMB, despite the Li—F interaction contributed by FDMB. This can be rationalized by the short Li—O distance (about 1.9 Å, O on DME or DMB) observed in reported $LiNO_3$/DME or LiTf/DMB crystal; while both Li—$O_{FDMB}$ and Li—$F_{FDMB}$ distances are higher than about 2 Å in LiTf/FDMB crystal (Supplementary Information Single Crystals). This special solvation environment is generally similar to that of LHCE, although herein the FDMB itself serves as both good solvent and fluoroether diluent. Therefore, harmful parasitic reactions are expected to be mitigated between Li metal and the electrolyte; meanwhile, this solvation can prevent endless Al corrosion on cathode side caused by $FSI^-$ anions (FIG. 21). To sum up, the special Li—F interaction in about 1 M LiFSI/FDMB electrolyte not only results in the unusual color but also can greatly benefit both Li metal and cathode side, further leading to excellent stability and performance in Li metal full batteries (FIG. 2*k*).

E. Electrochemical Stability Evaluation

Figure 3:
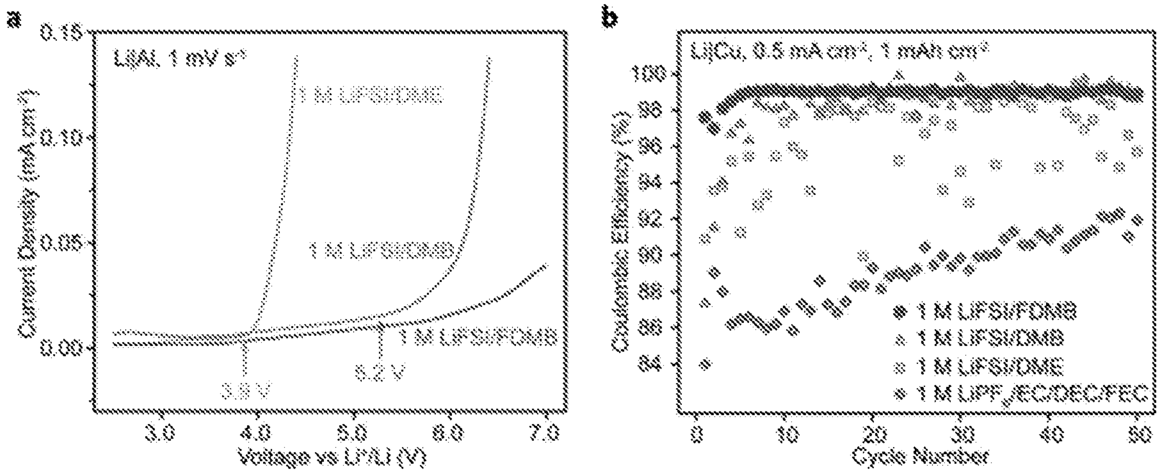
FIG. 3 shows electrochemical stability of electrolytes.
Figure 22:
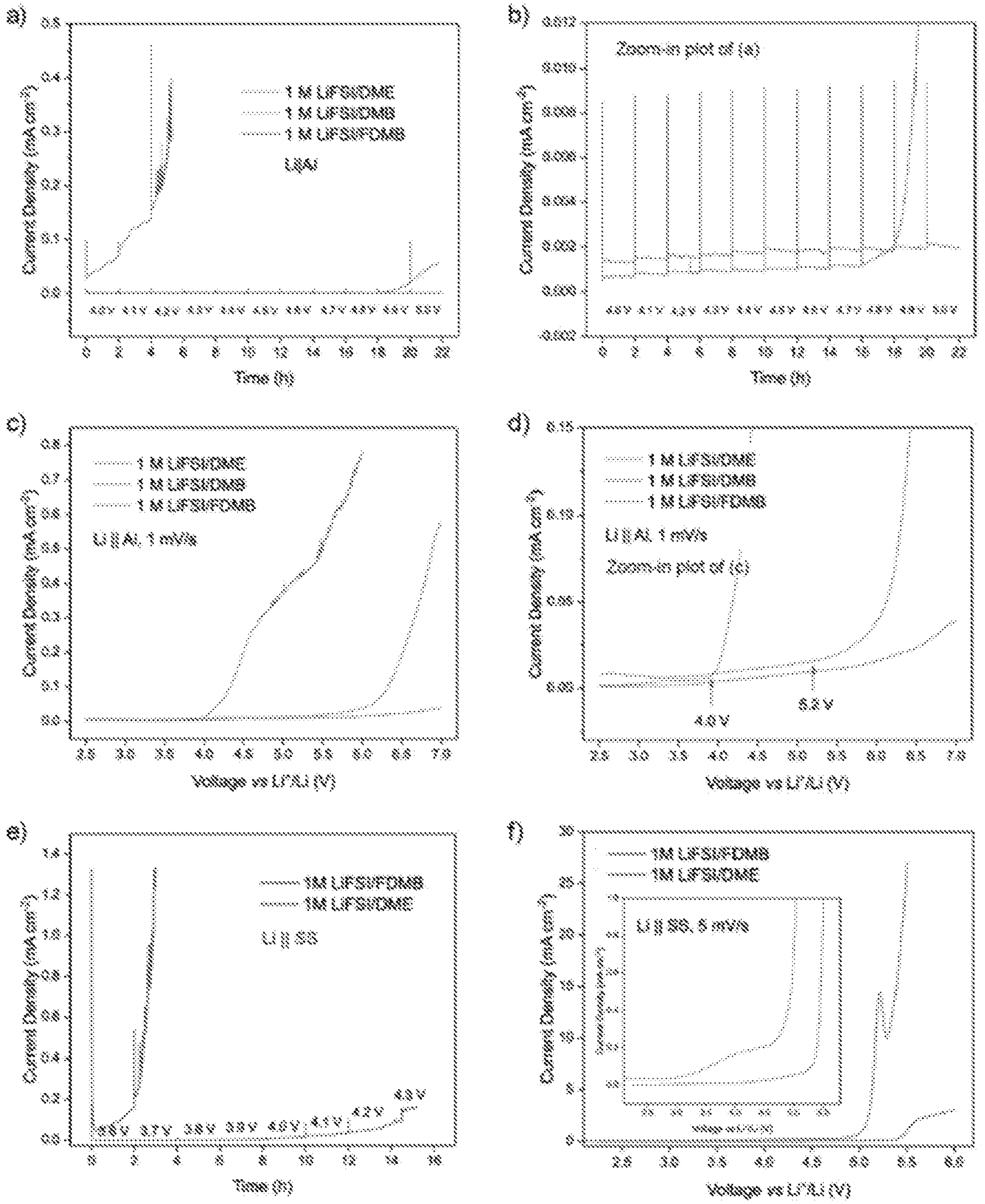
FIG. 22 shows oxidation voltage measurements. (a,b) Potentiostatic polarization of Li|Al cells with different electrolytes. (c,d) Linear sweep voltammetry curves of Li|Al cells with different electrolytes. (e,f) Potentiostatic polarization of Li|stainless steel (SS) cells with different electrolytes.

To demonstrate the above-mentioned design principles and special solvation enhanced stability, both high voltage tolerance and Li metal CE should be evaluated. Linear sweep voltammetry (LSV) measurement on Li|AI cells is conducted to determine the oxidation voltage of three about 1 M LiFSI electrolytes (FIG. 3*a*). The about 1 M LiFSI/DME shows a low oxidation voltage at about 3.9 V. By contrast, the about 1 M LiFSI/DMB and about 1 M LiFSI/FDMB show considerable high-voltage tolerance and cannot be oxidized before about 5 V, giving oxidation voltage at about 5.2 V and >about 6 V, respectively. The potentiostatic polarization tests provide more accurate information on each oxidation voltage, which is <about 4 V for about 1 M LiFSI/DME, about 4.8 V for about 1 M LiFSI/DMB, and >about 5 V for about 1 M LiFSI/FDMB (FIG. 22). Scanning electron microscope (SEM) images demonstrate that Al foil remains intact in about 1 M LiFSI/FDMB whereas Al is corroded and cracked in DME or DMB electrolyte when holding at about 5.5 V for three days (FIG. 21).

Figure 23:
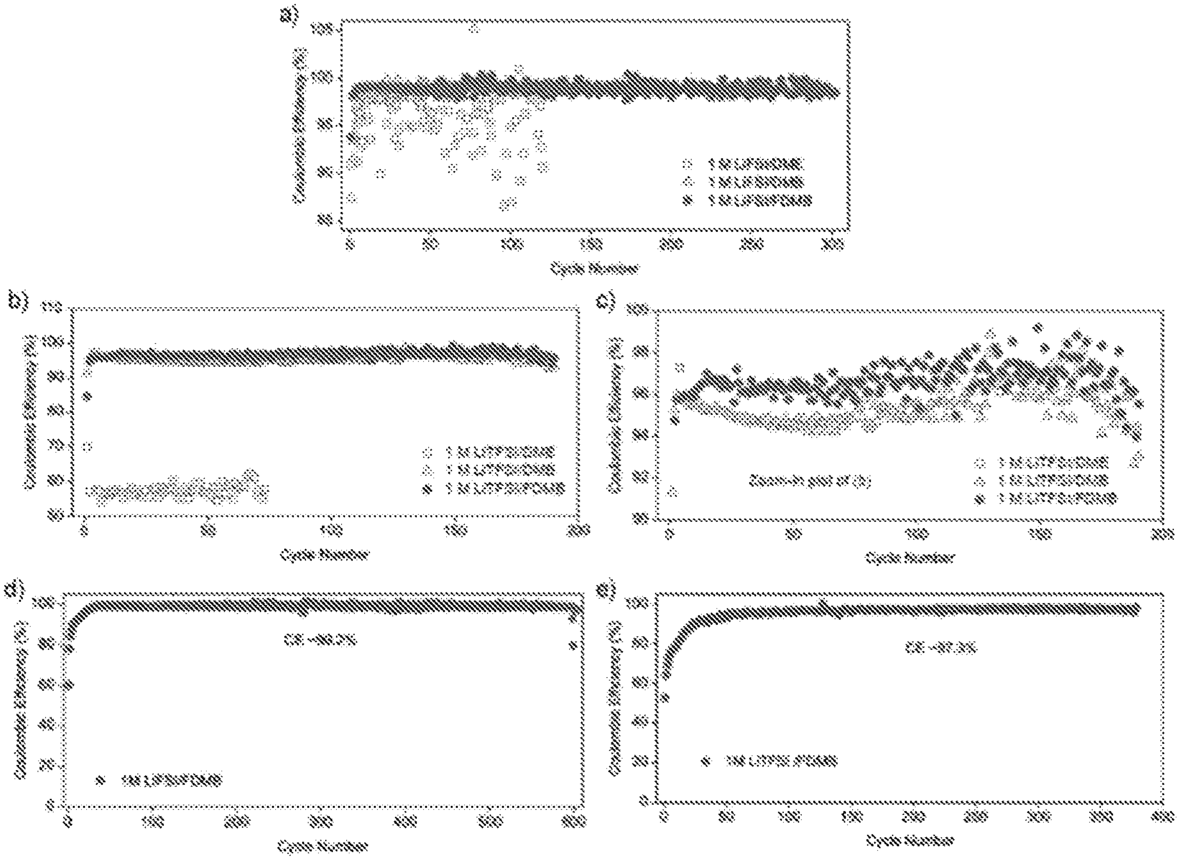
FIG. 23 shows long-term cycling tests of CE using about 1 M LiFSI and about 1 M LiTFSI electrolytes. (a) about 1 M LiFSI electrolytes, about 0.5 mA $cm^{-2}$, about 1.0 mAh $cm^{-2}$; (b,c) about 1 M LiTFSI electrolytes, about 0.5 mA $cm^{-2}$, about 1.0 mAh $cm^{-2}$; (d) about 1 M LiFSI/FDMB, about 0.25 mA $cm^{-2}$, about 0.5 mAh $cm^{-2}$; (e) about 1 M LiTFSI/FDMB, about 0.25 mA $cm^{-2}$, about 0.5 mAh $cm^{-2}$.
Figure 24:
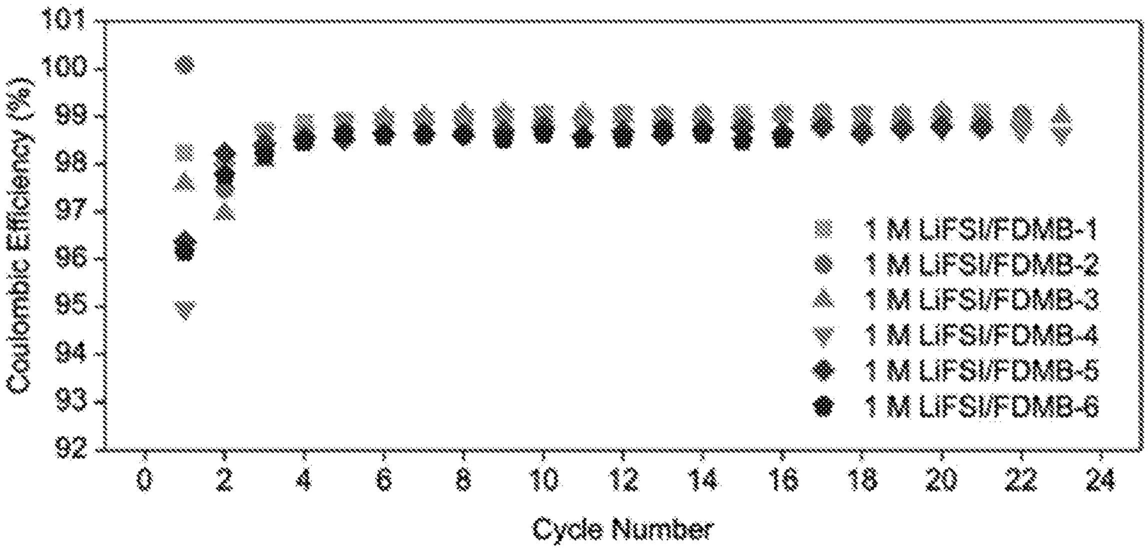
FIG. 24 shows Coulombic efficiency (CE) tests of about 1 M LiFSI/FDMB electrolyte using Li|Cu half cells. Condition: about 0.5 mA $cm^{-2}$, about 1.0 mAh $cm^{-2}$.
Figure 25:
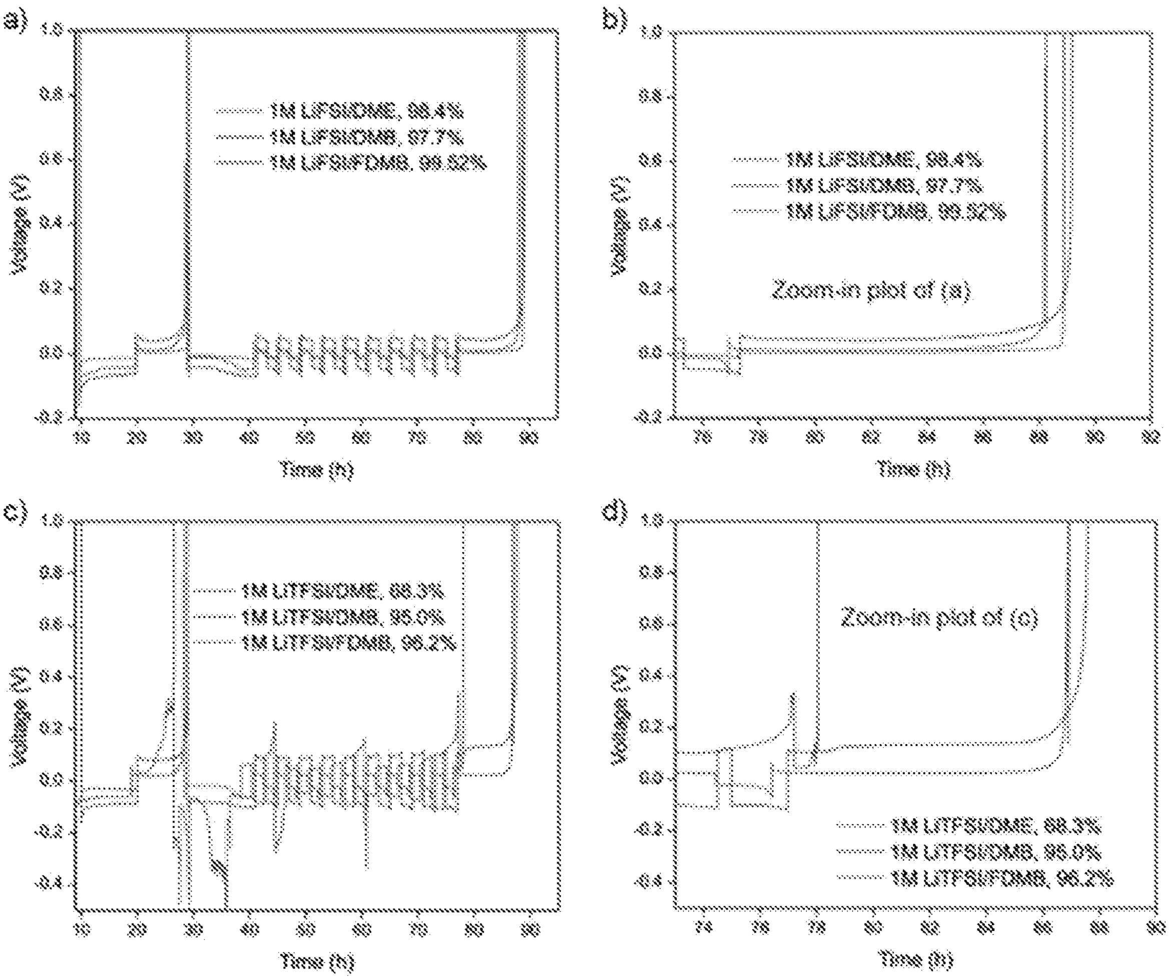
FIG. 25 shows Aurbach protocol measurements of Li metal CE. (a,b) about 1 M LiFSI electrolytes; (c,d) about 1 M LiTFSI electrolytes. Condition: about 0.5 mA $cm^{-2}$.

Another important factor is Li metal CE to estimate the electrolyte performance (FIG. 3*b*). A comparative carbonate electrolyte, about 1 M LiPF6 in ethylene carbonate/diethyl carbonate (EC/DEC=about 1/1) with about 10 w.t. % fluoroethylene carbonate (FEC), gives a Li metal CE at about 84%-90%. Ether-based electrolytes would be better; yet the about 1 M LiFSI/DME is still unstable with long-term cycling in Li|Cu half cells, although it is regarded as one of the best electrolytes in terms of Li metal CE. However, the Li metal CE vastly improves when using about 1 M LiFSI/DMB. Albeit still low for initial tens of cycles, the CE of about 1 M LiFSI/DMB stabilizes at about 98.8% in later cycles (FIG. 23). Surprisingly, the about 1 M LiFSI/FDMB improves the Li metal performance more by showing repeatably high first-cycle CE of about 97.6% and ramping up to an average CE>about 99% within just 5 cycles (FIG. 3*b* and FIG. 24). Such a fast activation process was hardly observed among reported electrolytes for high performance Li-metal anodes, while the practical salt concentration and streamlined composition of about 1 M LiFSI/FDMB even magnify its significance. After the five-cycle activation, the CE can maintain an average of about 99.3% for over 300 cycles (FIG. 23). The Aurbach CE test of Li|Cu cells further demonstrate the benefit of FDMB design by showing its higher CE (about 99.52% for about 1 M LiFSI, about 96.2% for about 1 M LiTFSI) compared to DMB (about 97.7% for about 1 M LiFSI, about 95.0% for about 1 M LiTFSI) or DME (about 98.4% for about 1 M LiFSI, about 68.3% for about 1 M LiTFSI) (FIG. 25). The drastic difference in about 1 M LiTFSI electrolytes is another evidence for supporting FDMB design.

F. Li Metal Morphology and SEI

Figure 4:
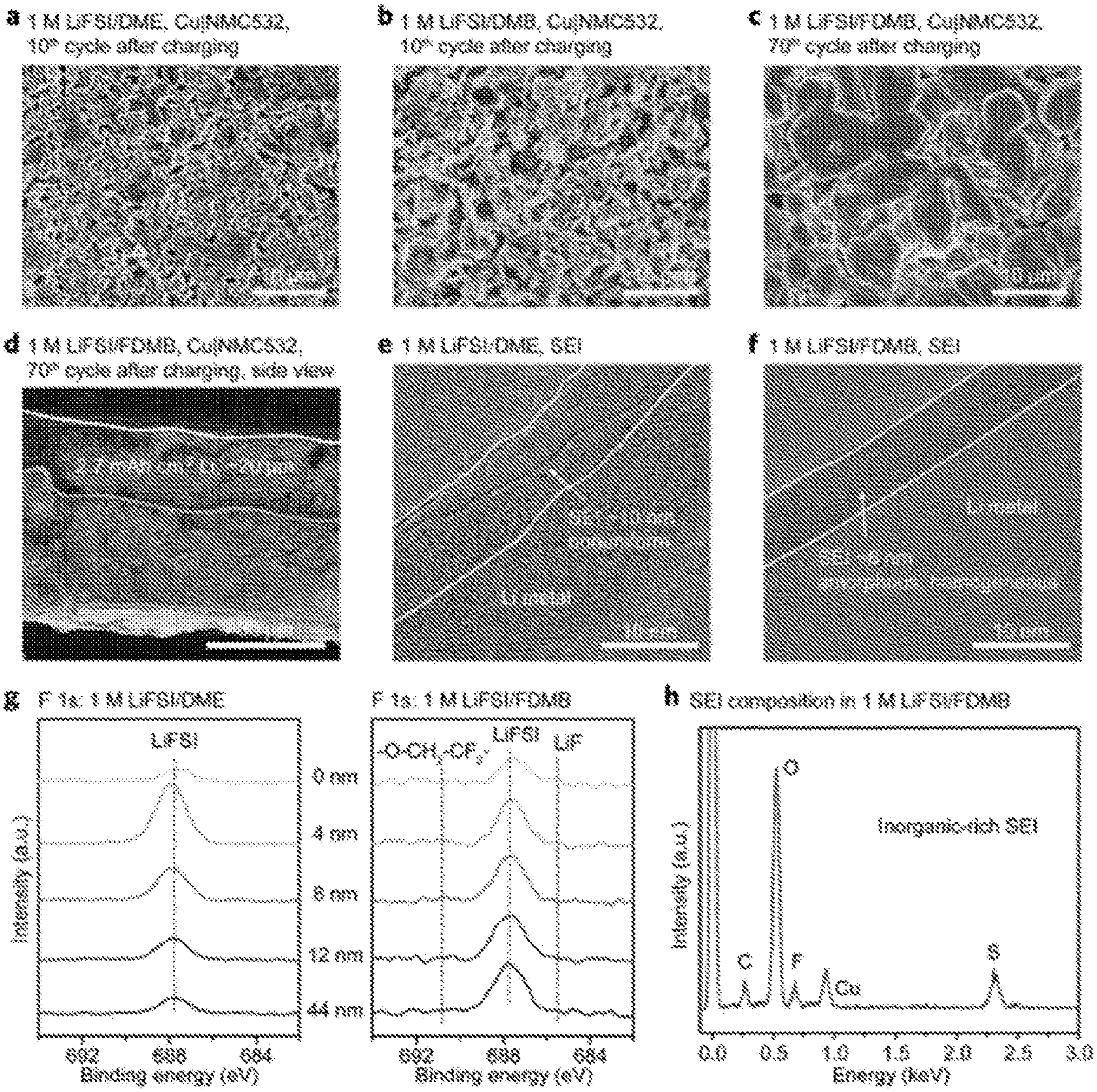
FIG. 4 shows Li metal morphology and SEI.
Figure 26:
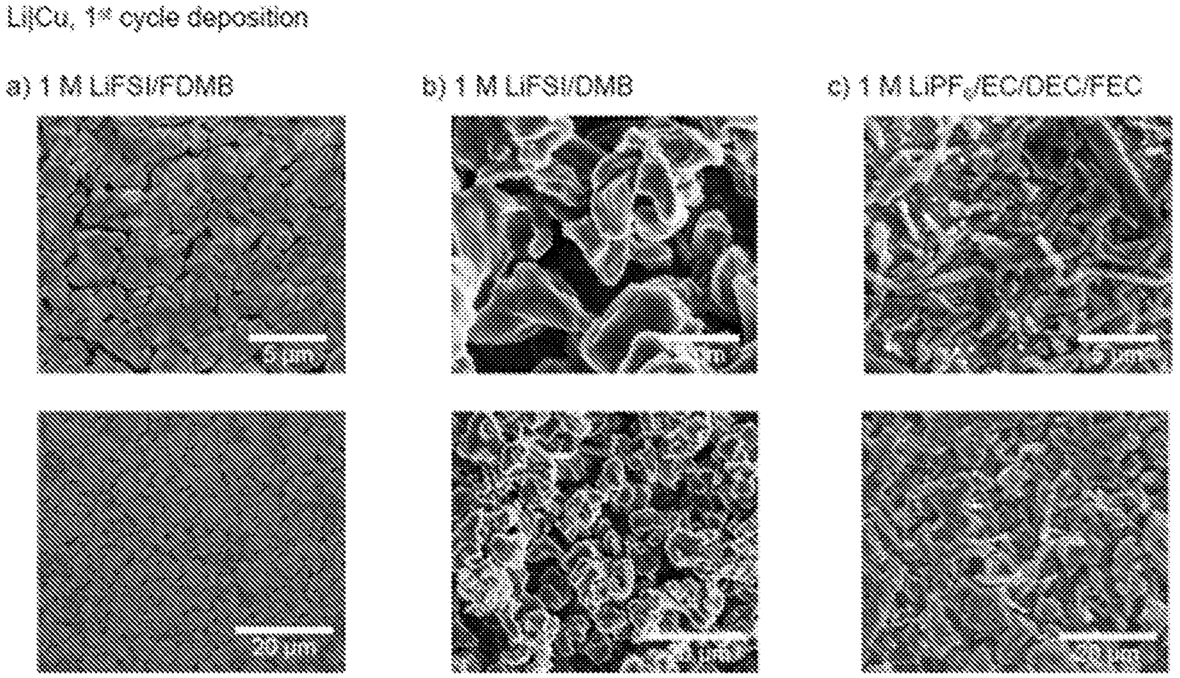
FIG. 26 shows Li deposition morphology in Li|Cu cells by SEM when using different electrolytes. (a) about 1 M LiFSI/FDMB; (b) about 1 M LiFSI/DMB; (c) about 1 M $LiPF_6$ in EC/DEC (about 1/1) with about 10 w.t. % fluoroethylene carbonate (FEC).
Figure 27:
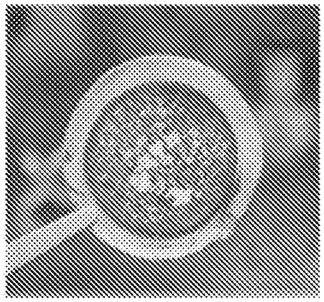
FIGS. 27*a-f* show optical images of Li side in Cu|NMC cells and Li|NMC cells.
Figure 27:
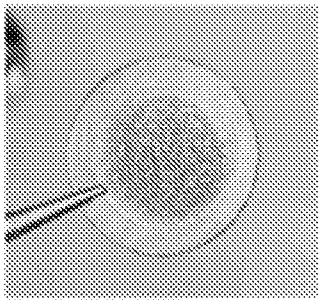
Figure 27:
Figure 27:
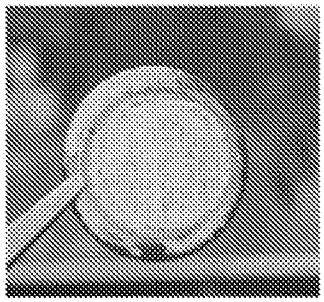
Figure 27:
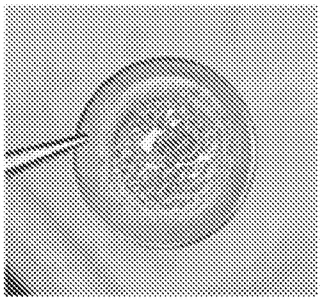
Figure 27:
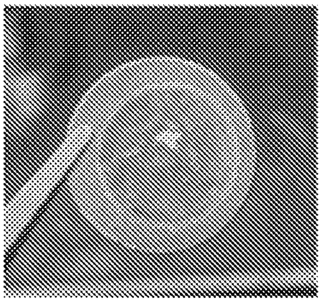
Figure 28:
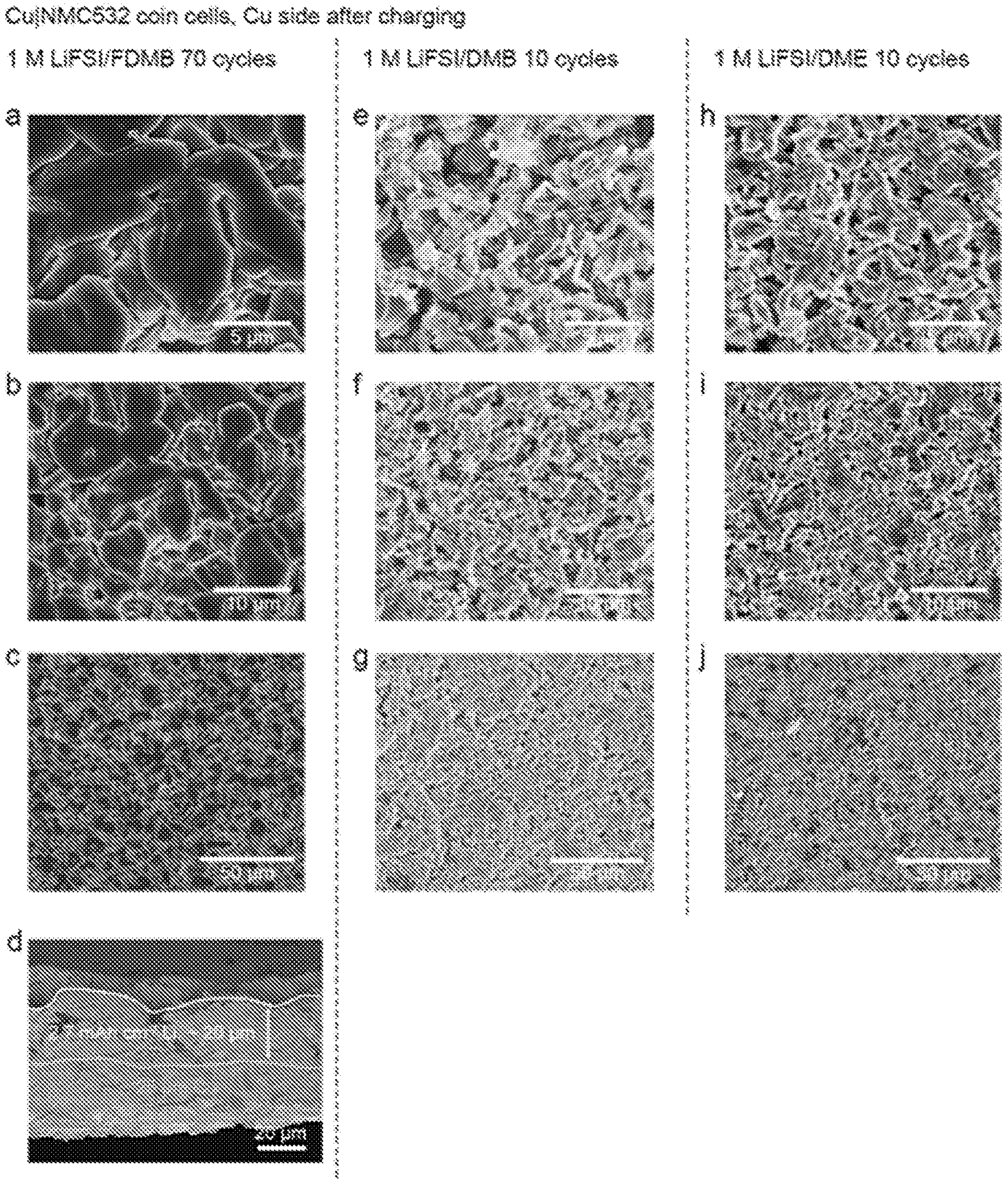
FIG. 28 shows Li deposition morphology in Cu|NMC cells by SEM. (a-d) about 1 M LiFSI/FDMB after 70 cycles; (e-g) about 1 M LiFSI/DMB after 10 cycles; (h-j) about 1 M LiFSI/DME after 10 cycles.
Figure 29:
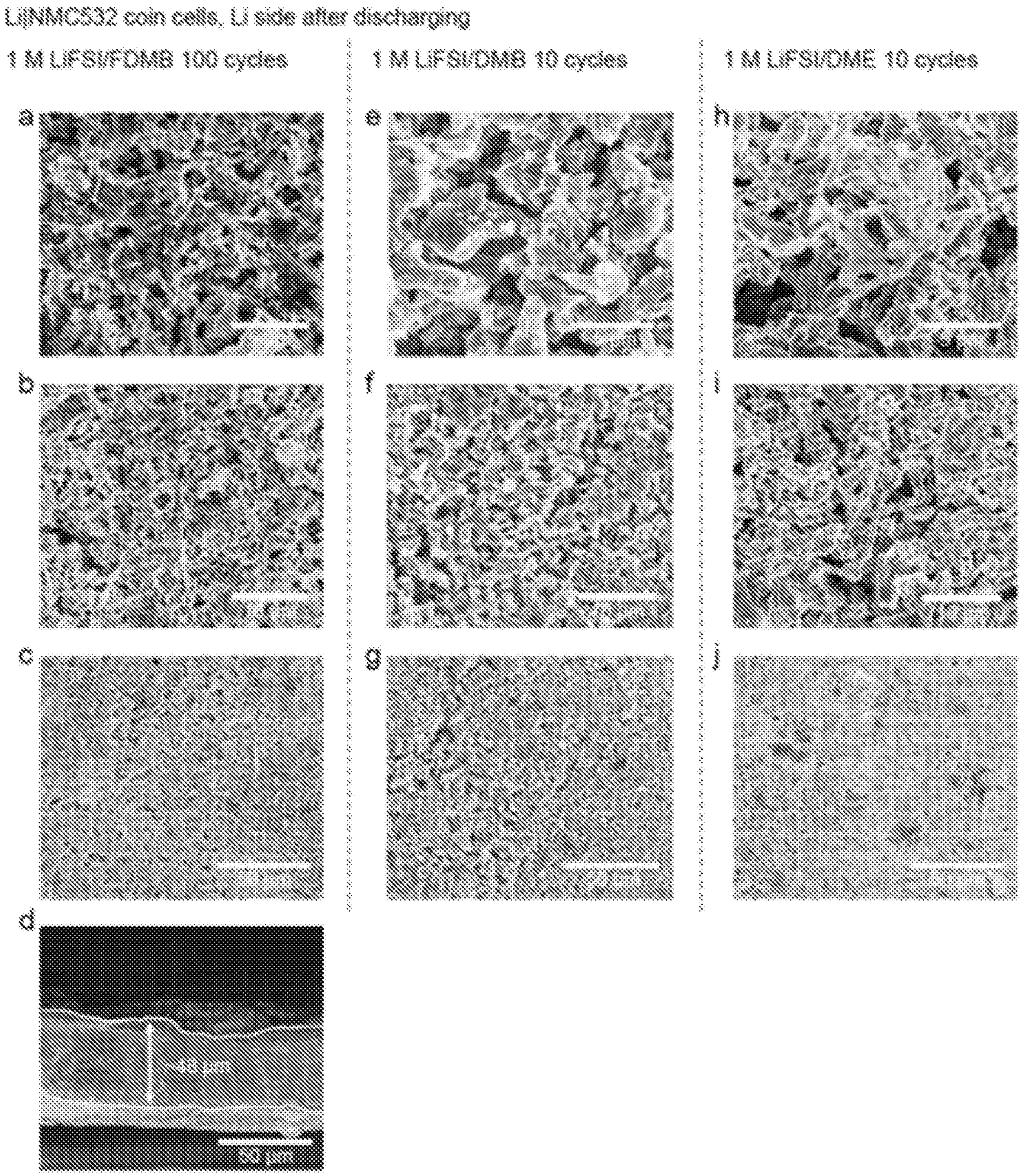
FIG. 29 shows Li morphology (after discharging) in Li|NMC cells by SEM. (a-d) about 1 M LiFSI/FDMB after 100 cycles; (e-g) about 1 M LiFSI/DMB after 10 cycles; (h-j) about 1 M LiFSI/DME after 10 cycles.

The Li metal deposition and SEI are carefully studied to solidify the outstanding Li metal stability of the FDMB electrolyte. The SEM images show large and chunky Li metal deposits in Li|Cu cell when about 1 M LiFSI/FDMB electrolyte is used, which is quite different from needle-like Li when using comparative carbonate electrolyte (FIG. 26). When the about 1 M LiFSI/DME or about 1 M LiFSI/DMB is cycled in Cu|NMC532 ($LiNi_{0.5}Mn_{0.3}Co_{0.2}O_2$) cells for 10 rounds, the remaining Li structure on Cu is dendritic or porous (FIG. 4*a*, *b* and FIGS. 27, 28). Surprisingly, using about 1 M LiFSI/FDMB electrolyte in Cu|NMC532 full battery, the fully charged about 2.7 mAh $cm^{-2}$ Li (deposited on Cu, about 14 μm thick theoretically while about 20 μm observed) still shows densely packed large grains even after 70 cycles (FIG. 4*c*, *d* and FIG. 27, 28), which was identified as an important factor to maintain ideal performance. The Li metal morphology of Li|NMC532 cells after cycling provide similar results as well (FIGS. 27 and 29).

Figure 30:
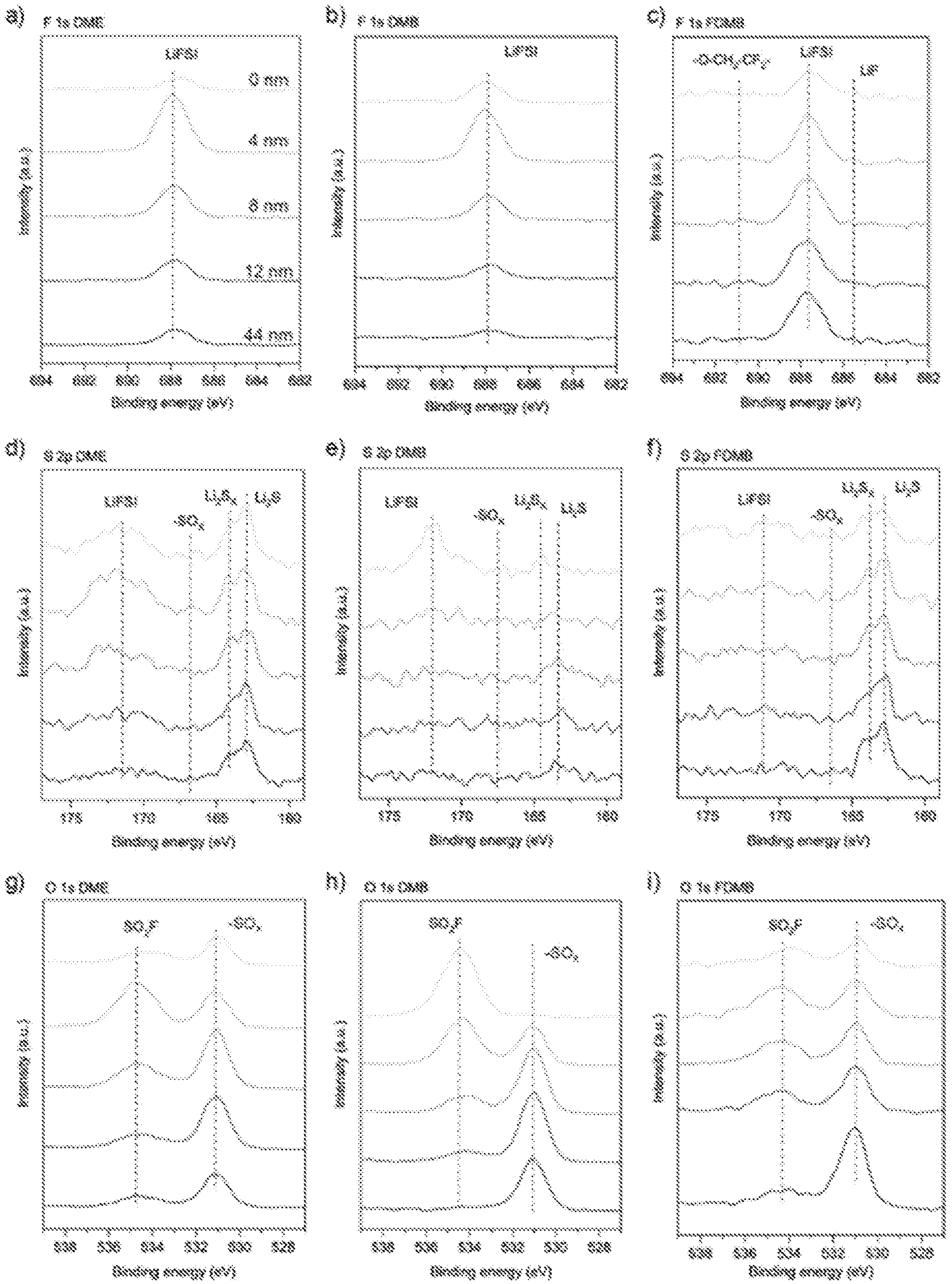
FIG. 30 shows XPS depth profiles of Li metal surface after soaking in three about 1 M LiFSI electrolytes for four days: (a-c) F 1s spectra; (d-f) S 2p spectra; (g-i) O 1s spectra. For each spectrum, the depth was 0, about 4, about 8, about 12, and about 44 nm from the top curve to the bottom, respectively.

Furthermore, Cryo-EM is utilized to confirm the benefit of FDMB design. In about 1 M LiFSI/DME electrolyte, the SEI layer is relatively thick (about 10 nm) and nonuniform; however, ultra-thin (about 6 nm) SEI is observed on Li when about 1 M LiFSI/FDMB is applied (FIGS. 4*e* and *f*). This SEI thickness is the thinnest among observed ones which are usually over about 20 nm. Instead of containing cracks or nonuniform domains as the SEI in about 1 M LiFSI/DME or about 1 M LiFSI/DMB, the Li SEI in about 1 M LiFSI/FDMB exhibits extraordinary uniformity and amorphousness. The F is spectra of X-ray photoelectron spectroscopy (XPS) further support this argument (FIG. 4*g*). The peaks assigned to LiFSI (about 688 eV) in about 1 M LiFSI/FDMB have similar intensities throughout the depth profiling, while those in about 1 M LiFSI/DME show large variation with sputtering. Apart from the uniformity with depths, the Li surface in about 1 M LiFSI/FDMB also contains a trace amount of LiF (about 685.5 eV) and organic $—CF_2—$ signals (about 691 eV), which may come from FDMB and assist with the formation of the thin, amorphous, and uniform SEI. The XPS spectra of other elements also support this conclusion (FIG. 30). The energy dispersive spectrum (EDS) by Cryo-EM shows inorganic-rich (0, F, and S rich) SEI composition in about 1 M LiFSI/FDMB (FIG. 4*h*). Such a situation is identified as a beneficial factor for Li metal.

G. Practical Li-Metal Batteries

Figure 5:
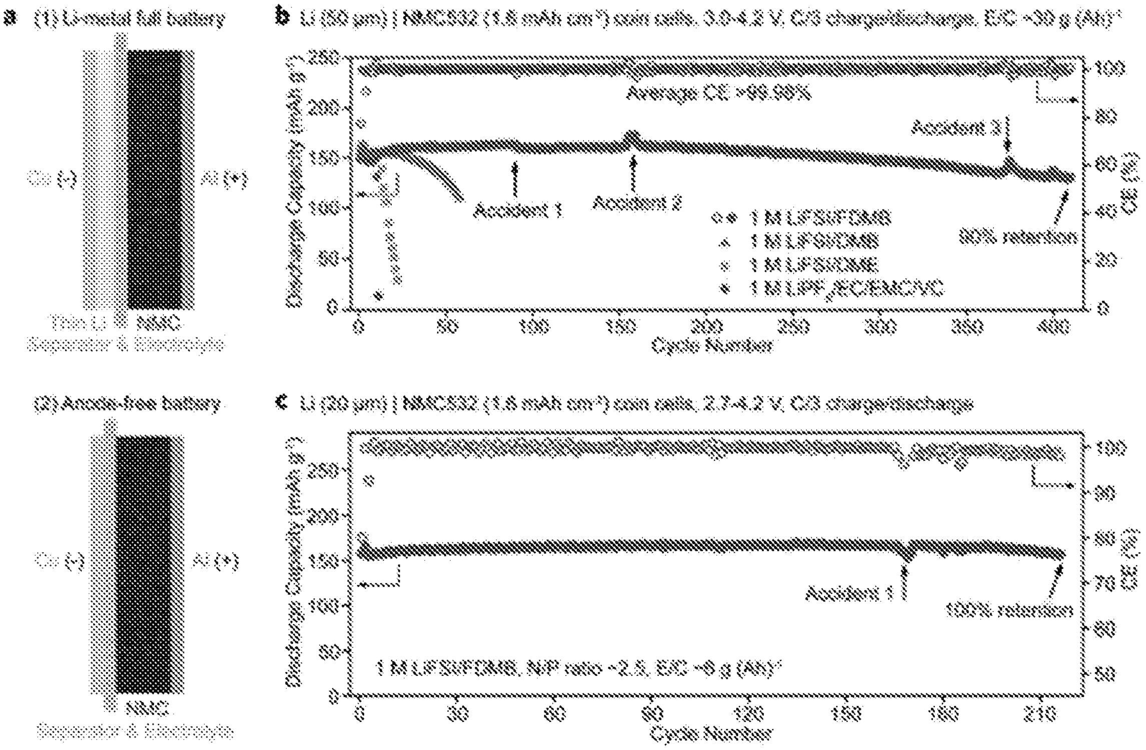
FIG. 5 shows Li-metal full battery performance.

The extraordinary Li metal performance (high average CE and fast activation process) along with high-voltage stability finally endows the about 1 M LiFSI/FDMB electrolyte with the promise of practical Li-metal full batteries. Two types of practical Li-metal batteries are evaluated in this example: Li-metal full batteries with finite excess Li and anode-free pouch cells (Figure Sa). FIGS. 5*b* and 5*c* demonstrate the Li-metal full battery performance in different electrolytes, where thin Li foils (about 50 and about 20 μm thickness, about 10 and about 4 mAh $cm^{-2}$ capacity, respectively) are used as finite-excess Li source.

Figure 31:
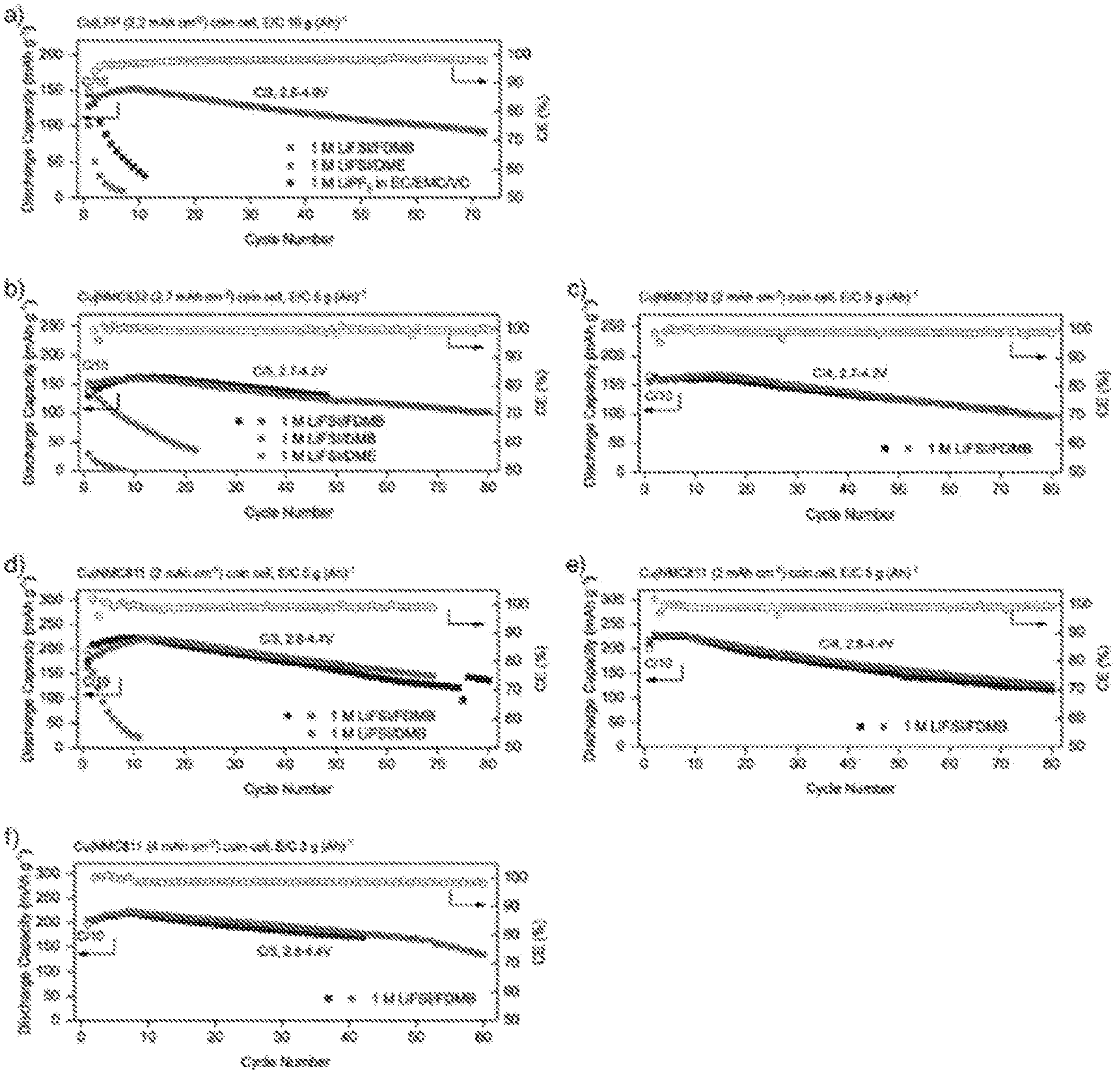
FIG. 31 shows performance of anode-free coin cells with different cathodes, different areal loadings, and different cycling rates: (a) Cu|LFP (about 2.2 mAh $cm^{-2}$), lean electrolyte (about 10 g $(Ah)^{-1}$), C/3 cycling; (b) Cu|NMC532 (about 2.7 mAh $cm^{-2}$), lean electrolyte (about 5 g $(Ah)^{-1}$), C/5 cycling; (c) Cu|NMC532 (about 2 mAh $cm^{-2}$), lean electrolyte (about 5 g $(Ah)^{-1}$), C/4 cycling; (d) Cu|NMC811 (about 2 mAh $cm^{-2}$), lean electrolyte (about 5 g $(Ah)^{-1}$), C/3 cycling; (e) Cu|NMC811 (about 2 mAh $cm^{-2}$), lean electrolyte (about 5 g $(Ah)^{-1}$), C/4 cycling; (f) Cu|NMC811 (about 4 mAh $cm^{-2}$), lean electrolyte (about 3 g $(Ah)^{-1}$), C/5 cycling. For all cells, two pre-cycles at C/10 were conducted.
Figure 32:
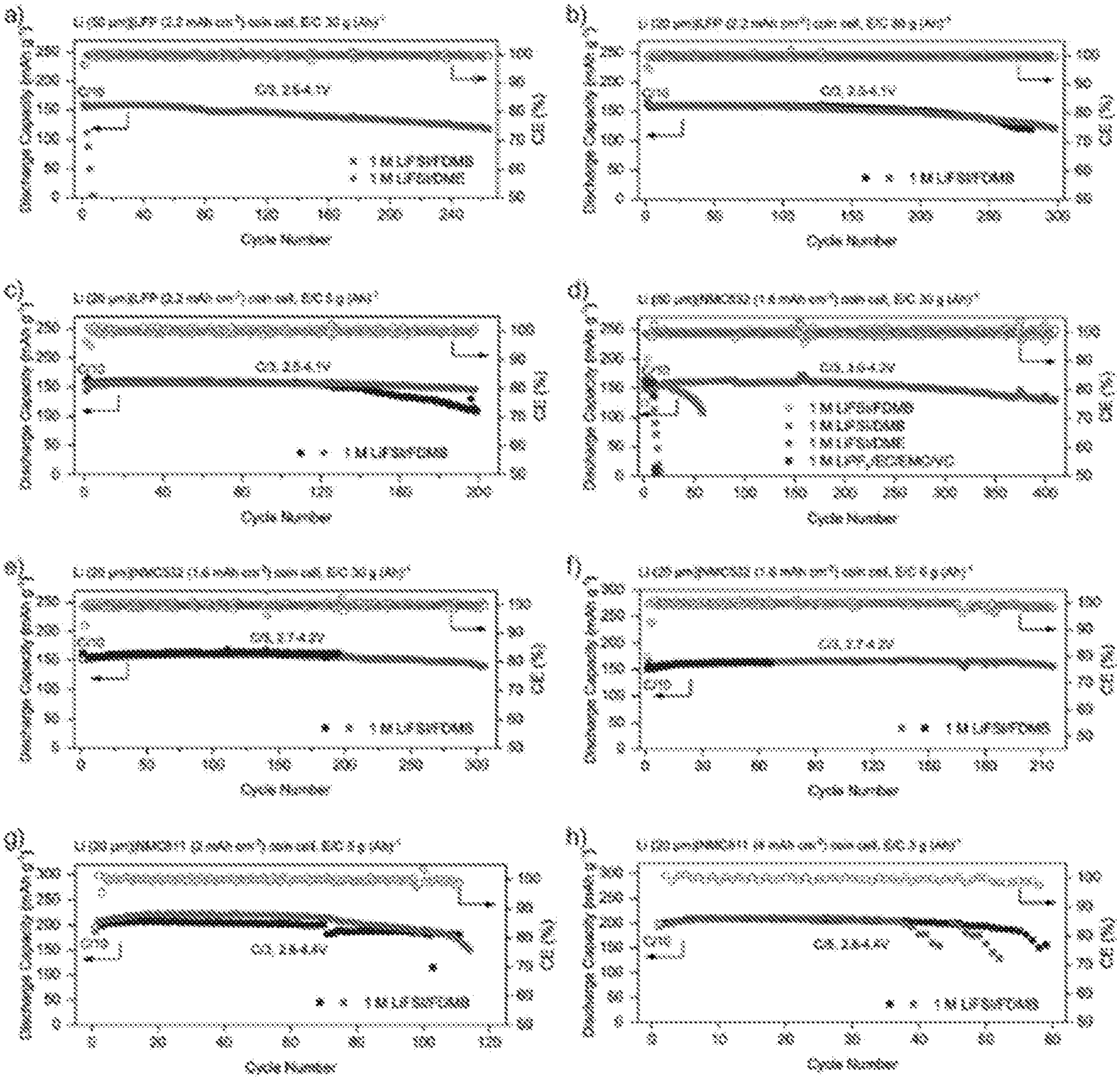
FIG. 32 shows performance of Li-metal full coin cells (finite Li excess) with different cathodes, different areal loadings, different electrolyte amounts, and different cycling rates: (a) Li (about 50 μm)|LFP (about 2.2 mAh $cm^{-2}$), flooded electrolyte (about 30 g $(Ah)^{-1}$), C/3 cycling; (b) Li (about 20 μm)|LFP (about 2.2 mAh $cm^{-2}$), flooded electrolyte (about 30 g $(Ah)^{-1}$), C/3 cycling; (c) Li (about 20 μm)|LFP (about 2.2 mAh $cm^{-2}$), lean electrolyte (about 5 g $(Ah)^{-1}$), C/3 cycling; (d) Li (about 50 μm)|NMC532 (about 1.6 mAh $cm^{-1}$), flooded electrolyte (about 30 g $(Ah)^{-1}$), C/3 cycling; (e) Li (about 20 μm)|NMC532 (about 1.6 mAh $cm^{-2}$), flooded electrolyte (about 30 g $(Ah)^{-1}$), C/3 cycling; (f) Li (about 20 μm)|NMC532 (about 1.6 mAh $cm^{-2}$), lean electrolyte (about 6 g $(Ah)^{-1}$), C/3 cycling; (g) Li (about 20 μm)|NMC811 (about 2 mAh $cm^{-2}$), lean electrolyte (about 5 g $(Ah)^{-1}$), C/3 cycling; (h) Li (about 20 μm)|NMC811 (about 4 mAh $cm^{-1}$), lean electrolyte (about 3 g $(Ah)^{-1}$), C/5 cycling. For all cells, two pre-cycles at C/10 were conducted.
Figure 33:
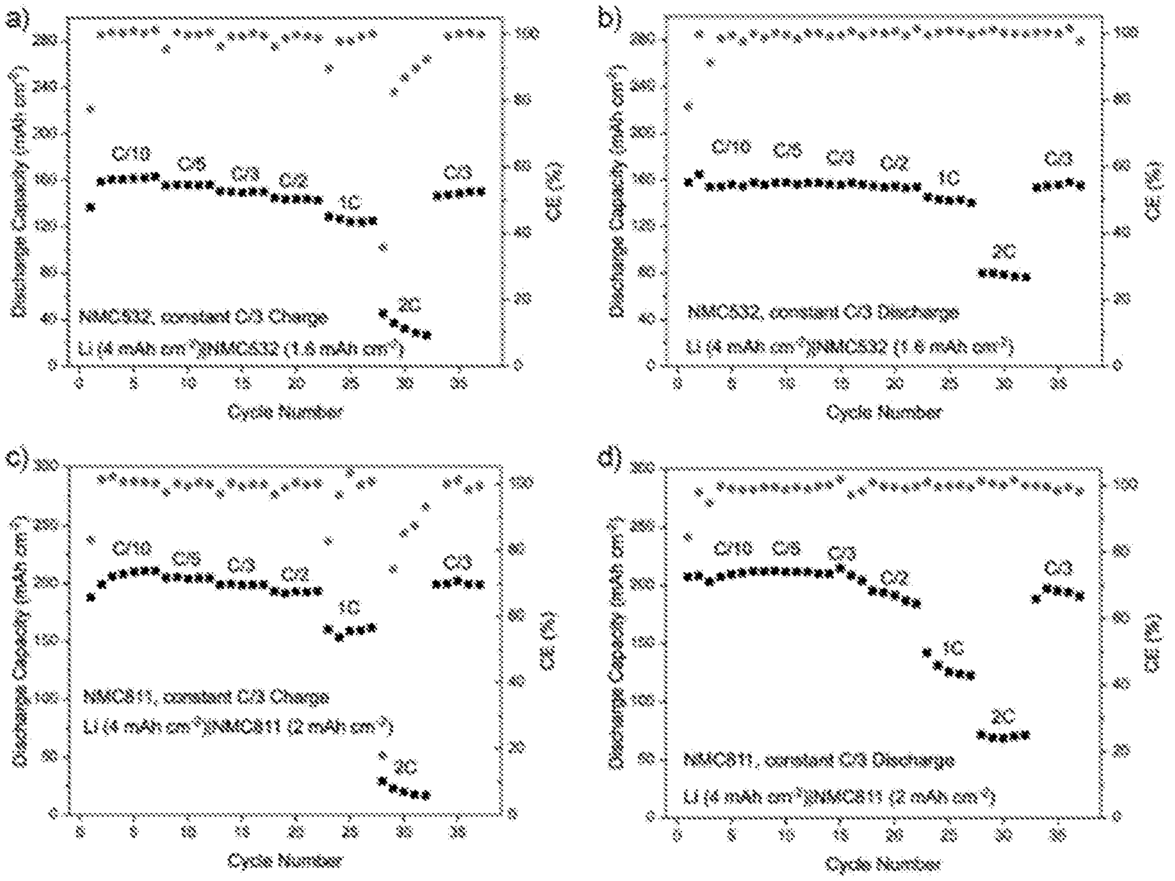
FIG. 33 shows rate capability of Li|NMC coin cells. (a) Li|NMC532 cell, keep constant charging rate (C/3), change discharge rates; (b) Li|NMC532 cell, keep constant discharging rate (C/3), change charge rates; (c) Li|NMC811 cell, keep constant charging rate (C/3), change discharge rates; (d) Li|NMC811 cell, keep constant discharging rate (C/3), change charge rates. About 20 μm thick Li foils (about 4 mAh $cm^{-2}$) were used here.

Shown in FIG. 5*b*, the cell capacity drastically decreases within 20 cycles when about 1 M LiFSI/DME or baseline electrolyte, about 1 M LiPF6 in EC/ethyl methyl carbonate (EC/EMC=about 3/7) plus about 2 w.t. % vinylene carbonate (VC), is used. In contrast, the about 1 M LiFSI/DMB electrolyte prolongs the cycle life of Li-metal battery to >50 cycles. Its high-voltage stability endows it with better performance compared to DME, but the undistinguished Li-metal stability is responsible for the notable capacity drop after 50 cycles. The fast failure using about 1 M LiFSI/DMB in Cu|NMC coin cell confirms its Li-metal instability (FIG. 31). The about 1 M LiFSI/FDMB shows the best performance, maintaining about 90% capacity retention for over 400 cycles, which is difficult to obtain even for Li-metal half cells with infinite Li reservoir. An unprecedentedly high average CE of >about 99.98% is achieved with this Li-metal full cell as well. Moreover, during the long-term cycling, the about 1 M LiFSI/FDMB battery even survives several reasonable yet unexpected temperature fluctuation accidents. This tolerance shows the robustness of the about 1 M LiFSI/FDMB electrolyte. If the negative/positive (N/P) capacity ratio is further reduced to about 2.5 and electrolyte/cathode (E/C) ratio is lowered to about 6 g $(Ah)^{-1}$, the about 1 M LiFSI/FDMB electrolyte can still maintain stable battery cycling for >200 cycles (FIG. 5*c*). In addition to NMC532 batteries, the about 1 M LiFSI/FDMB maintains outstanding long-term cyclability and rate capability under other conditions such as NMC811 ($LiNi_{0.8}Mn_{0.1}Co_{0.1}O_2$) or LFP ($LiFePO_4$) cathodes, different cathode areal capacities, various finite-excess Li (e.g. about 50 or about 20 μm thin Li), and lean electrolyte (FIGS. 32 and 33)).

Furthermore, aggressive anode-free pouch cells using about 1 M LiFSI/FDMB electrolyte are tested to realize the high performance and specific energy. To make it closer to reality, the industry-manufactured dry pouch cells are purchased and directly tested once after adding the electrolyte. Parameters such as areal capacity (about 3-4 mAh $cm^{-2}$), active material percentage (about 94-96%), total capacity (about 200-250 mAh), and electrolyte filling amount (about 2 g $(Ah)^{-1}$) are all at practical and even harsh levels (FIG. 5*c*). FIG. 5*d* shows the performance of anode-free pouch cells. The Cu|NMC811 cell maintains its about 80% capacity for 70 cycles while the Cu|NMC622 and Cu|NM532 ones achieve 100 cycles, respectively. It is worth noting that both cells were cycled to high voltage (about 4.3 or about 4.4 V), and such cycle life is believed to be the longest among the state-of-the-art anode-free cells (Table 1). The specific energy of these pouch cells are further calculated directly based on the total pouch-cell mass, including all active and inactive materials. The NMC811 cells exhibit about 320 Wh $kg^{-1}$ specific energy while the NMC622 and NMC532 ones show lower about 240 Wh $kg^{-1}$ and about 240 Wh $kg^{-1}$, respectively. The specific energy can be further increased if cells with higher total capacity (e.g., Ah-level cylinder or pouch cells) are conducted. Besides, anode-free coin or pouch cells cycled at different voltage ranges, temperatures, and total capacities all show excellent performance (FIG. 31). The anode-free pouch cells maintain shiny and silver-colored Li metal even after 100 cycles while hardly suffer from gas releasing problem (FIG. 34), confirming the superiority of about 1 M LiFSI/FDMB electrolyte (FIG. 35).

H. Conclusions

In this example, a low-concentration, additive-free electrolyte is developed using a synthesized compound, FDMB, solely used as a solvent and LiFSI as a single salt. The about 1 M LiFSI/FDMB electrolyte is found to exhibit both Li metal stability and high-voltage tolerance: an unprecedentedly fast activation process is obtained by starting with about 97.6% CE and reaching >about 99% CE within just 5 cycles in Li|Cu cell; while retaining the stability until >about 6 V keeps its promise for high-voltage cathodes. The thinnest SEI layer (about 6 nm) is observed by Cryo-EM and favorable densely-packed Li morphology is shown in Cu|NMC cell even after long-term cycling. In addition, the special Li—F interaction in the electrolyte is studied thoroughly. A tight structure-property relationship and mutual benefit are revealed between the Li—F solvation and the anodic and cathodic stability. Therefore, an impressive 400 cycles for finite Li excess full batteries is achieved with about 99.98% CE, during which even several accidents are overcome. A more aggressive battery, hundreds-of-mAh-level Cu|NMC532 pouch cell, is found to maintain about 80% capacity retention for over 100 cycles, while the Cu|NMC811 one exhibits an unprecedentedly high specific energy of about 320 Wh $kg^{-1}$. This example creates an electrolyte system that endows the promise of practical Li-metal batteries and also provides the detailed structure-performance correlation for electrolytes through a step-by-step molecular design. More design strategies can be applied to organic molecules.

Methods

Synthesis of DMB and FDMB. Synthesis of DMB: to a round-bottom flask were added about 400 mL dry tetrahydrofuran (THF) and about 30 g of 1,4-butanediol (Sigma-Aldrich). The solution was cooled to 0° C. with an ice bath, purged with nitrogen, and stirred for about 30 minutes. About 30 g of NaH (Alfa Aesar, about 60% in mineral oil) was added slowly in batches. Bubbling can be observed upon NaH addition. The suspension was further stirred under nitrogen atmosphere at 0° C. for about 1 h. Then, about 45 mL of methyl iodide (Sigma-Aldrich) was added dropwise to the flask. The ice bath was withdrawn and the suspension was stirred at room temperature overnight. The mixture was then filtered off and the solvents were removed under vacuo. After removing the top oil layer, the crude product was vacuum distilled for twice to yield the final product as colorless liquid. The product was then filtered off through about 0.45 μm PTFE filter and moved to an argon glovebox where it was stored over a piece of Li metal. Yield: about 45%. Synthesis of FDMB: all conditions were kept the same except changing about 30 g of 1,4-butanediol (Sigma-Aldrich) to about 50 g of 2,2,3,3-tetrafluoro-1,4-butanediol (Synquest). Yield: about 63%. $^{1}H$, $^{13}C$, and $^{19}F$-NMR spectra were used to confirm product structure and purity (See Supplementary Information Syntheses).

Electrolytes. All the electrolytes were made and stored in argon-filled glovebox (Vigor, oxygen <about 0.01 ppm, water <about 0.01 ppm). About 1122 mg LiFSI (Oakwood or Fluolyte) or about 1722 mg LiTFSI (Solvay) was dissolved in about 6 mL DME (Acros Organics) or DMB or FDMB to obtain about 1 M LiFSI/DME or about 1 M LiFSI/DMB or about 1 M LiFSI/FDMB or about 1 M LiTFSI/DME or about 1 M LiTFSI/DMB or about 1 M LiTFSI/FDMB, respectively. The about 1 M LiPF6 in EC/EMC electrolyte (LP57, Gotion) with about 2 w.t. % VC (Sigma-Aldrich) was used as control electrolyte. The about 1 M $LiPF_6$ in EC/DEC electrolyte (LP40, Gotion) with about 10 w.t. % FEC (Sigma-Aldrich) was used in Li|Cu cells for comparison.

Density functional theory calculations. The molecular geometries for the ground states were optimized by density functional theory (DFT) at the B3LYP/6-311G+(d,p) level. And then the energy of molecules were evaluated at the DFT-B3LYP/6-311G+(d,p). The bonding energy was calculated from the energy difference between starting structure and products after bond breakage. All the DFT calculations were carried out with the Gaussian 09 package.

Molecular dynamics simulations. Molecules and ions were described by the Optimized Potentials for Liquid Simulations all atom (OPLS-AA) force field. Partial charges on FDMB atoms were computed by fitting the molecular electrostatic potential (ESP) at the atomic centers with Møller-Plesset second-order perturbation method with the correlation-consistent polarized valence cc-pVTZ(-f) basis set. The simulation boxes were cubic with side length of about 6 nm and contained about 1 M LiFSI solvated in different solvents. During simulation, the temperature was controlled at about 300 K using Nosé-Hoover thermostat with a relaxation time of about 0.2 ps. The pressure was controlled at about 1 bar using Parrinello-Rahman barostat with a relaxation time of about 2.0 ps. All MD simulations were conducted with the Gromacs 2018 program. MD simulations were conducted for about 50 ns and the last about 20 ns were used for analysis. $Li^+$ ion solvation structure were analyzed with self-written script based on the MDAnalysis Python module.

Material characterizations. $^{1}H$, $^{13}C$, and $^{19}F$ NMR spectra were recorded on a Varian Mercury 400 MHz NMR spectrometer and $^{7}Li$ NMR spectra were recorded on a UI 300 MHz NMR spectrometer at room temperature. FTIR spectra were measured using a Nicolet iS50 FT/IR Spectrometer with a diamond ATR attachment. DSC experiments were performed using a DSC-Q2000 (TA Instruments) over a temperature range of about −80 to about 50° C. with a ramp rate of about 10° C. $min^{-1}$. TGA plots were recorded with a Mettler Toledo AG-TGA/SDTA851e. An FEI Titan 80-300 environmental (scanning) TEM and a Gatan 626 Cryo-EM holder were used for Cryo-EM experiments. A FEI Magellan 400 XHR SEM was used for SEM and EDS characterizations. A Bruker D8 Venture X-ray diffractometer was used for single crystal data collection. XPS profiles were collected by PHI VersaProbe 1 Scanning XPS Microprobe. Before XPS measurement, the Li was washed with DME for about 30 seconds to remove the remaining electrolyte. Viscosity measurements were carried out using an Ares G2 Rheometer (TA Instruments) with an advanced Peltier system (APS) at about 25° C. A Karl-Fisher titrator was used to determine the water content in electrolytes. UV-vis spectra were collected by Agilent Cary 6000i UV/Vis/NIR instrument.

Electrochemical measurements. All battery components used in this example were commercial large-scale products and electrochemical testing was all carried out in Swagelok cell, 2032-type coin cell, or custom-made pouch cell configuration. The cells were made in argon-filled glovebox. One layer of Celgard 2325 (about 25 μm PP/PE/PP) was used as separator. Single-side coated $LiFePO_4$ (LFP) and $LiNi_{0.5}Mn_{0.3}Co_{0.2}O_2$ (NMC532) sheets with about 2 mAh $cm^{-2}$ areal capacity loading were purchased from MTI. Single-side coated $LiNi_{0.8}Mn_{0.1}Co_{0.1}O_2$ (NMC811) sheets with about 2 mAh $cm^{-2}$ areal capacity loading were purchased from Targray. Industry-level dry Cu|NMC532, Cu|NMC622, and Cu|NMC811 pouch cells were purchased from Hunan Li-Fun Technology. Thick Li foil (about 750 μm) was purchased from Alfa Aesar and used in Li|Li symmetric cells and Li|Cu cells. Thin Li foils (about 20 μm or about 50 μm) were received from Hydro-Québec and used in all full cells. Copper current collector (about 25 μm, about 99.8% metals basis) was purchased from Alfa Aesar and used as working electrode. The EIS, LTN, LSV, and pouch cell cycling were carried out on a Biologic VMP3 system. The cycling tests for coin cells were carried out on an Arbin system or LAND instrument. The EIS measurements were taken over a frequency range of about 7 MHz to about 100 mHz. For the LTN measurements, about 10 mV constant voltage bias was applied to Li|Li cells. The anodic CV tests were carried out over a voltage range of about −0.1 to about 2 V for three cycles in Li|Cu cells, while the cathodic LSV tests were over a voltage range of about 2.5 to about 7 V. For Li|Cu half-cell CE cycling tests, ten pre-cycles between 0 and about 1 V were initialized to clean Cu electrode surface, and then cycling was done by depositing about 1 (or about 0.5) mAh $cm^{-2}$ of Li onto Cu electrode followed by stripping to about 1 V. The average CE is calculated by dividing the total stripping capacity by the total deposition capacity after the formation cycle. For Aurbach CE test, a standard protocol was followed: (1) perform one initial formation cycle with Li deposition of about 5 mAh $cm^{-2}$ on Cu under about 0.5 mA $cm^{-2}$ current density and stripping to about 1 V; (2) deposit about 5 mAh $cm^{-2}$ Li on Cu under about 0.5 mA $cm^{-2}$ as Li reservoir; (3) repeatedly strip/deposit Li with about 1 mAh $cm^{-2}$ under about 0.5 mA $cm^{-2}$ for 10 cycles; (4) strip all Li to about 1 V. The Li|NMC and Cu|NMC full cells were cycled in the following method (unless specially listed): after the first two activation cycles at C/10 charge/discharge, the cells were cycled at different rates. Then a constant-current-constant-voltage (CC-CV) protocol was used for cycling: cells were charged to top voltage and then held at that voltage until the current dropped below C/20. The NMC532 coin cells were cycled between about 3.0 to about 4.2 V; the NMC532 pouch cells were cycled between about 2.7 to about 4.2 V or between about 2.7 to about 4.4 V; the NMC622 pouch cells were cycled between about 2.7 to about 4.4 V; the NMC811 coin cells were cycled between about 2.8 to about 4.4 V; the NMC811 pouch cells were cycled between about 2.8 to about 4.4 V. Cells were cycled under ambient condition unless specified at controlled temperatures.

SUPPLEMENTARY INFORMATION

I. Chemicals and Materials

Anhydrous 1,2-dimethoxyethane (DME, about 99.5% over molecular sieves) was purchased from Acros Organics. 1,4-Butanediol was purchased from Sigma-Aldrich and 2,2,3,3-tetrafluoro-1,4-butanediol was purchased from Synquest. Methyl iodide (Mel) was purchased from Sigma-Aldrich. Sodium hydride (NaH, about 60% in mineral oil) was purchased from Sigma-Aldrich. Other commercial reactants and solvents were purchased from Sigma-Aldrich or Fisher Scientific, and used without further purification. LiFSI was purchased from Oakwood and LiTFSI was obtained from Solvay. The about 1 M LiPF6 in EC/EMC electrolyte (LP57) and about 1 M LiPF6 in EC/DEC electrolyte (LP40) were purchased from Gotion. Vinylene carbonate (VC) and Fluoroethylene carbonate (FEC) were purchased from Sigma-Aldrich. Commercial lithium battery separator Celgard 2325 (about 25 μm thickness, PP/PE/PP) was purchased from Celgard LLC. Thick Li foil (about 750 μm thickness) and Cu current collector (about 25 μM thickness) were purchased from Alfa Aesar. Thin Li foils (about 50 μm and about 25 μm thickness) were provided by Hydro-Québec. Commercial NMC532 cathode sheets (about 2 mAh $cm^{-2}$ areal capacity) were purchased from MTI and commercial NMC811 cathode sheets (about 2 mAh $cm^{-2}$ areal capacity) were purchased from Targray. Industry-level dry Cu|NMC532, Cu|NMC622, and Cu|NMC811 pouch cells were purchased from Hunan Li-Fun Technology. Other battery materials, such as 2032-type coin cell cases, springs, and spacers were all purchased from MTI.

J. General Characterization Methods $^{1}H$, $^{13}C$, and $^{19}F$ NMR spectra were recorded on a Varian Mercury 400 MHz NMR spectrometer and $^{7}Li$ NMR spectra were recorded on a UI 300 MHz NMR spectrometer at room temperature. FTIR spectra were measured using a Nicolet iS50 FT/IR Spectrometer with a diamond ATR attachment. TGA plots were recorded with a Mettler Toledo AG-TGA/SDTA851e. An FEI Titan 80-300 environmental (scanning) TEM and a Gatan 626 Cryo-EM holder were used for Cryo-EM experiments. A FEI Magellan 400 XHR SEM was used for SEM and EDS characterizations. A Bruker D8 Venture X-ray diffractometer was used for single crystal data collection. XPS profiles were collected by PHI VersaProbe 1 Scanning XPS Microprobe. Before XPS measurement, the Li was washed with DME for about 30 seconds to remove the remaining electrolyte. Viscosity measurements were carried out using an Ares G2 Rheometer (TA Instruments) with an advanced Peltier system (APS) at about 25° C. A Karl-Fisher titrator was used to determine the water content in electrolytes. UV-vis spectra were collected by Agilent Cary 6000i UV/Vis/NIR instrument.

K. Syntheses

Synthesis of DMB

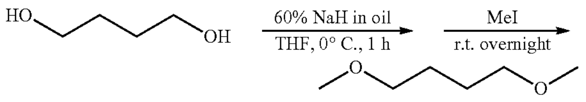

To a round-bottom flask were added about 400 mL dry THF and about 30 g of 1,4-butanediol The solution was cooled to 0° C. with an ice bath, purged with nitrogen, and stirred for about 30 minutes. About 30 g of NaH was added slowly in batches. Bubbling can be observed upon NaH addition. The suspension was further stirred under nitrogen atmosphere at 0° C. for about 1 h. Then, about 45 mL of Mel was added dropwise to the flask. The ice bath was withdrawn and the suspension was stirred at room temperature for about 16 h. The mixture was then filtered off and the solvents were removed under vacuo. After removing the top oil layer, the crude product was vacuum distilled for twice to yield the final product as colorless liquid. The product was then filtered off through about 0.45 μm PTFE filter and moved to an argon glovebox where it was stored over a piece of Li metal. Yield: about 45%.

$^{1}H$ NMR (400 MHz, $d^{6}$-DMSO, δ/ppm): 3.30-3.27 (m, 4H), 3.20 (s, 6H), 1.51-1.48 (m, 4H).

$^{13}C$ NMR (100 MHz, $d^{6}$-DMSO, δ/ppm): 72.36, 58.37, 26.50.

Synthesis of FDMB

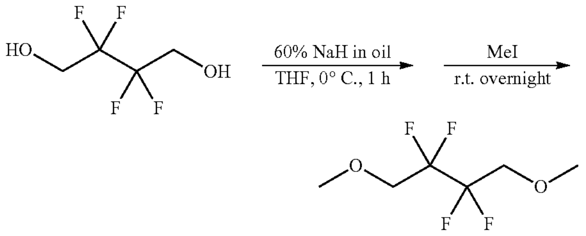

To a round-bottom flask were added about 400 mL dry THF and about 50 g of 2,2,3,3-tetrafluoro-1,4-butanediol. The solution was cooled to 0° C. with an ice bath, purged with nitrogen, and stirred for about 30 minutes. About 30 g of NaH was added slowly in batches. Bubbling can be observed upon NaH addition. The suspension was further stirred under nitrogen atmosphere at 0° C. for about 1 h. Then, about 45 mL of Mel was added dropwise to the flask. The ice bath was withdrawn and the suspension was stirred at room temperature for about 24 h. The mixture was then filtered off and the solvents were removed under vacuo. After removing the top oil layer, the crude product was vacuum distilled for twice to yield the final product as colorless liquid. The product was then filtered off through about 0.45 μm PTFE filter and moved to an argon glovebox where it was stored over a piece of Li metal. Yield: about 63%.

$^{1}H$-NMR (400 MHz, $d^{8}$-THF, δ/ppm): 3.85-3.76 (m, 4H), 3.42 (s, 6H). $^{19}F$-NMR (376 MHz, $d^{8}$-THF, δ/ppm):

−123.50−−123.58 (m, 4F). $^{13}$C-NMR (100 MHz, $d^8$-THF, δ/ppm): 119.09-114.06, 67.04-66.14, 59.48.

L. Molecular Dynamics (MD) Simulations

Molecules and ions were described by the Optimized Potentials for Liquid Simulations all atom (OPLS-AA) force field. Partial charges on FDMB atoms were computed by fitting the molecular electrostatic potential (ESP) at the atomic centers with Møller-Plesset second-order perturbation method with the correlation-consistent polarized valence cc-pVTZ(-f) basis set. The simulation boxes were cubic with side length of about 6 nm and contained about 1 M LiFSI solvated in different solvents. During simulation, the temperature was controlled at about 300 K using Nosé-Hoover thermostat with a relaxation time of about 0.2 ps. The pressure was controlled at about 1 bar using Parrinello-Rahman barostat with a relaxation time of about 2.0 ps. All MD simulations were conducted with the Gromacs 2018 program. MD simulations were conducted for about 50 ns and the last about 20 ns were used for analysis. $Li^+$ ion solvation structure were analyzed with self-written script based on the MDAnalysis Python module.

Design Principles of Polymer Structures

FIG. 39*a* illustrates a battery comprising of a Li metal anode, NMC based high voltage cathode and solid-state polymer electrolyte. Overall, there are five design principles of such a solid polymer (1) non-flammability and high degradation temperature, (2) high room-temperature ion conductivity (at least >0.01 mS/cm), (3) moderate mechanical strength to prevent internal short circuits, (4) high oxidative stability (>4.2 V vs $Li/Li^+$), and (5) facile processability to form conformal interfaces on electrodes. We envision that enabling these physical and electrochemical characteristics is possible through molecular level redesigning of polymer electrolytes. As mentioned earlier, localization of electron clouds on the oxygen molecules of polyethers determine lithium ion coordination and electrochemical behavior, hence we systematically vary the local atomistic environment of ether-monomers and evaluate these properties using ab-initio calculations. Specifically, as shown in FIG. 39*b*, we introduce different degrees of fluorination in the monomers of comb-type polyethers (structures 1, 2), such that the —F groups are linked to either alternate or adjacent carbon to —O— atom (structure 3, 4, respectively), or the monomers are per-fluorinated (structures 5, 6). By analyzing the energy-minimized-structures of (fluoro)ether-chains in vicinity of $Li^+$ ion (FIG. 45), we found that only for structures: 1, 2 and 3, side-chains are able to coordinate; while in rest of the structures: 4, 5 and 6, $Li^+$ prefer carbonyl groups on the acrylate backbone. This observation can be rationalized by the understanding that —F groups are strong electron withdrawing agents, thus close presence —F groups (in the adjacent carbon) significantly deprive the electron clouds on the —O— atom for structures 4, 5 and 6, unlike structure 3. Additionally, we analyzed the theoretical oxidative potential ($E_{ox}$) of these structures by analyzing the HOMO levels and plot them in FIG. 39*c*. Interestingly, $E_{ox}$'s of all fluorinated ethers (structure 3 to 6) are higher by over 250 mV compared to non-fluorinated ethers (structure 1, 2). Thus, all of the fluorinated structures (3 to 6) shown here, are expected to show high oxidative stability as polymer electrolyte, while only structure 3 can appropriately solvate lithium salts. For further generalization of our understanding and quantitative analysis, we investigate the $Li^+$ solvation energy with linear (fluoro)ether monomers, as shown in FIG. 46. We find the results to be consistent with our expectation such that the location of electron withdrawing —F groups in the monomer backbone determines the lithium solvation energy. These atomistic chemistry-property relationships, obtained from first-principle analyses, make a remarkable prediction and experimental guideline that polyether electrolytes with selectively fluorinated monomers (structure 3) can enable metal salt dissolution for ion transport while elevating their oxidative limits to enable high voltage electrochemistry.

To experimentally verify our design concepts, we synthesize and characterize comb-type acrylate polymers having different types of ether-based side chains. FIG. 40*a* shows the molecular structure of poly(fluorobutyl acrylate): PFBA (or, structure 3 in FIG. 39*b*) synthesized using facile free-radical polymerization and its image is displayed in a vial-bottle in the same figure. The molecular weight ($M_w$) was calculated to be 50 kDa and PDI as 2.9. We further synthesized non-fluorinated polymers to compare the respective chemistries with their ionic and electrochemical properties; specifically, they are poly(ethylene glycol acrylate): PEGA (or, structure 1 in FIG. 39*b*) and poly(butyl acrylate): PBA (or, structure 2 in FIG. 39*b*). The synthetic pathways and the NMR confirmation are provided in the Supplementary Information. The thermal properties of these polymers were analyzed using differential scanning calorimetry (DSC) and the corresponding glass transition temperature ($T_g$) plotted in FIG. 40*b*. It is seen that PEGA has the highest $T_g$ (−3.35° C.) compared to that of PBA (−17.5° C.) and PFBA (−17.2° C.). This observation is expected because of the longer flexible side-chain length for both PBA and PFBA compared to PEGA enhances the free volume. The ion transport properties of the polymers were investigated after dissolving LiFSI salt with the same salt-to-monomer ratio (r) as 0.1, using impedance spectroscopy measurements with stainless-steel based blocking electrodes. The ion conductivity of these polymer electrolytes is plotted in FIG. 40*c* in a wide range of temperature from 25° C. to 125° C., which were fitted using a Vogel-Fulcher-Tammann (VFT) model, the details are provided in Table 3. Interestingly, we find that the conductivity values are similar across the measured range. At room temperature, PFBA & PBA based polymer electrolytes have marginally (~$5\times10^{-7}$ S/cm) higher conductivity than that of PEGA (−$1.5\times10^{-7}$ S/cm), this can be understood from differences in glass transition temperatures. Furthermore, we evaluate the oxidative stability of the aforementioned polymer electrolytes in a coin-cell configuration, with lithium metal as the reference and counter electrode, while stainless-steel as the working electrode. The linear scan voltammogram of the polymer electrolytes measured at a scan rate of 10 mV/s is shown in FIG. 40*d*. The divergence in the measured current is an indication of electrolyte degradation at a given potential and the corresponding values are provided in Table 3. The oxidative stability limit follows the following order: PFBA>PBA>PEGA, such that non-fluorinated polyethers are unstable below ~4.2 V vs. $Li/Li^+$, which makes them unsuitable for high voltage battery applications. The increased stability limit for PFBA polymers is because of the delocalization of electron clouds from the —O— molecules due to the —F groups that prevent oxidation of the electrolytes at the electron-deficient cathodic interfaces. These experimental evidences confirm the theoretical predictions in FIG. 39, thus, we have underlined a universal design strategy of selectively fluorinating monomers to decouple the ion transport and electrochemical properties of polyether electrolytes.

TABLE 3

VFT parameters obtained by fitting ion conductivity results as well as the experimentally obtained oxidative potential for the poly(fluoro)ether electrolytes

| Electrolyte Chemistry | LiFSI content (r) | Ea (kJ/mole) | Fitted $T_o$ (K) | Experimental Ox. Potential Li/Li+ (V) |
|---|---|---|---|---|
| PEGA | 0.1 | 36.7 | 106.8 | ~3.7 |
| PBA | 0.1 | 24.05 | 140 | ~4.0 |
| PFBA | 0.1 | 29.9 | 105.6 | ~4.8 |

A. Ion Transport Analysis

There have been several recent studies both involving liquid and solid electrolytes that highlight the importance of metal salt concentration, in addition to the choice of solvent or polymer chemistry. Here, we systematically vary the lithium salt (LiFSI) concentration in the PFBA polymer to evaluate its ionic and physical properties at room temperature (25° C.). FIG. 41*a* shows effect of salt concentration on the complex viscosity (η*) measured using oscillatory shear rheology (shown in FIG. 47) and ionic conductivity (σ) using impedance spectroscopy. The corresponding data is shown on a log-log scale in FIG. 48. We find that the polymer viscosity without addition of any salt (r=0) is marked at ~215 Pa-s, which is interestingly lower than the salt-added polymers until a critical concentration of $r_c$=0.32. The sharp increase in viscosity at low LiFSI salt concentration is due to the formation of a dynamic network by the coordination of ionic moieties with multiple fluoroether-based side chains in the PFBA polymer. Polymer viscosity is seen to decrease by over four orders of magnitudes with successive addition of salt. However, at very high salt concentration (r>0.64), we observe the decreasing viscosity values plateaus out. Corresponding to the trend in the polymer electrolyte viscosities, we see an opposite trend in the ion conductivity results, which increases from $2.8\times10^{-9}$ S/cm (at r=0.0064) to $3.4\times10^{-4}$ S/cm (at r=2.5) at room temperature (25° C.). We find a remarkable (inverse) correlation between the viscosity and conductivity as seen in the inset of FIG. 41*a* over the measurement that spans several orders of magnitude in both quantities. This observation can be explained by the simultaneous dependence of the polymer $(\text{viscosity})^{-1}$ and conductivity to the segmental dynamics. Here, we obtain an empirical relationship as $\sigma=(0.0012)\,\eta^{*-1}$, where conductivity has units of S/cm, viscosity as Pa-s and the power law is a fitting parameter. This result establishes that the interdependence of mechanical and ionic properties in homopolymers is independent of chemistry.

The high ionic conductivity of PFBA polymers arises from the absence of crystallinity (unlike PEO and polyionic liquids) and its high solubility of lithium salt (up to r=2.5). We investigated the coordination structure of polymer and salt molecules using Fourier transform infrared spectroscopy (FTIR) (see FIG. 49 for full spectrum). FIG. 41*b* shows the changes in the —NH bond vibration obtained from FTIR analysis with varying content of LiFSI salt. We find that the —NH peak of the polymer backbone (r=0) at ~3360 $cm^{-1}$ undergoes a blue-shift to ~3580 $cm^{-1}$ at high concentration of LiFSI salt (r≥0.32). We attribute this observation to the disruption of urethane hydrogen bond network at and beyond a critical salt concentration, where the extra ionic moieties coordinate with the polymer backbone in addition to the fluoroether side-chains that results in disruption of the polymer-polymer interactions. This matches well with our observation in FIG. 41*a* that electrolyte viscosity is lower than the neat polymer beyond critical salt concentration $r_c$=0.32. A similar trend found for the —S═O asymmetric stretch in the LiFSI salt (FIG. 41*c*) further cross-validates the argument. Here, we observe a peak at 1380 $cm^{-1}$ at all salt concentrations corresponding to dissociated or 'free' anions. However, at high salt content (r≥0.32), a secondary broadened peak occurs at 1360 $cm^{-1}$, indicating the presence of 'bound'-FSI anions, which reflects the formation of ionic aggregates or contact ion pairs. We can further analyze the solvation structures of the polymer electrolytes using nuclear magnetic resonance (NMR) analysis. The $^7$Li and $^{19}$F nuclear peak shift of LiFSI salt is shown in FIGS. 41*d* and 1*e*, respectively, while, FIG. 41*f* is the $^{19}$F-NMR of the PFBA backbone, collected at 90° C. for better signal-to-noise ratio. The $^7$Li spectrum (FIG. 41*d*) shows that an initial increase in the salt concentration (until r<0.32) results in a downfield shift (implying de-shielding of the $Li^+$ by surrounding electron clouds), which indicates that the $Li^+$ ions are weakly solvated by the fluoroether chains. However, further increase of LiFSI content results in upfield shift due to localization of electron density around $^7$Li by formation of ionic aggregates and contact pairs. A similar non-monotonic trend is seen in the $^{19}$F spectrum of LiFSI salt (FIG. 41*e*), where the transition from downfield to upfield shift also occurs at the same critical concentration, $r_c$=0.32. The additional peaks at high salt content (r>0.32) indicates the occurrence of a variety of solvation structures where the $FSI^-$ ions simultaneously coordinate with $Li^+$ ions and polymer moieties. The $^{19}$F spectrum of the PFBA polymer (FIG. 41*e*), shows no particular change in chemical shift; however, at high salt concentration (r≥0.32), we find significant broadening of NMR peak due to the presence of a wide distribution of coordination environments. Such complex solvation behavior has been previously observed in NMR analysis of liquid-in-salt and localized high concentration electrolytes.

The experimental finding of cation solvation at all LiFSI concentrations and formation of complex ionic aggregate high salt content in PFBA polymers was further evaluated using molecular dynamic (MD) simulations. FIG. 42*a* and FIG. 50 and shows the snapshots of the simulation box comprising of coordination environment of PFBA polymers and LiFSI salt molecules for different concentrations. It is clearly seen that there is the ion clustering is different at low and high salt concentrations. We quantitatively evaluate this using ion speciation analysis in FIG. 42*b*. It is seen that, at low salt concentrations (r<0.42), ions are more likely to exist in evenly separated manner or in form of small clusters due to dissociation and weak solvation. As the concentration increases (r≥0.42), the appearance of larger ion clusters also increases and the odds of finding ions in larger clusters is higher. Thus, a transition occurs in the sense that a percolating cluster (snapshot in FIG. 42*a*) appears and aggregates most of ions in the system indicating formation of interconnected structure of anion-cation-polymer complexes. This agrees well with our experimental findings, which showed a similar transition at $r_c$=0.32.

B. Enhancing Mechanical Strength with Supramolecular Bonding

Due to the strong correlation between ion transport and viscosity in PFBA homopolymers, they show liquid-like behavior at high ionic conductivity. In order to simultaneously achieve high ion conductivity and mechanical strength, we therefore incorporate a small amount of ureidopyrimidinone methacrylate (UpyMA) into the fluorobutyl acrylate monomers because it is known that the ureidopyrimidinone groups form strong supramolecular hydrogen bonds that impart macroscopic rigidity yet are still dynamic at local scale to enable polymer chain mobility. The details of synthesis and NMR confirmation are provided in the Supplementary Information. The chemical structure, scheme and photograph of the poly(fluorobutyl acrylate-co-ureidopyrimidinone methacrylate): P(FBA-co-UpyMA) polymers are shown in FIG. 43*a*. The Upy content in the polymer is maintained to be low ($FBA_{(1-x)}$: $UpyMA_x$, x≤0.15) because it is known that high degree of H-bonding networks causes crystallization. The scheme represents the formation of low density 'Upy-stickers' in the PFBA polymer backbone that have finite de-bonding timescales. We perform oscillatory shear measurements with time-temperature superposition (TTS) to show that the dynamic polymer network has rouse dynamics at high frequency due to segmental mobility, a rubbery plateau at intermediate frequency because of the H-bonds, and a final terminal relaxation of these bonds at longer time-scales (FIG. 51). The rheological behavior of these H-bonded polymers can be understood using the 'Sticky-Rouse Model' that is proposed for associative polymers. FIG. 43*a* also shows the free-standing solid copolymer ($PFBA_{0.93}$-co-$UpyMA_{0.07}$), in contrast to the viscous liquid polymer PFBA in FIG. 3*a*. We perform DSC measurements and plot the thermogram in FIG. 43*b*. As the Upy groups in copolymers induce dynamic crosslinking and corresponding $T_g$ increases: −17.2° C., −11° C. and −6° C. for PFBA, P($FBA_{0.93}$-co-$UpyMA_{0.07}$) and P($FBA_{0.85}$-co-$UpyMA_{0.15}$), respectively.

We analyze the mechanical properties of polymer electrolytes by incorporating LiFSI salt (r=2.5) using oscillatory shear measurements at room temperature (25° C.) and plot the frequency dependent storage (G') and loss (G") modulus in FIG. 43*c*. We find that G">G' for PFBA+LiFSI electrolytes, with a power law of −1 and −2 for G' and G", respectively that signifies that it is a Newtonian liquid having viscosity (η) of 4.7 Pa-s. In contrast, we find the H-bonded polymer electrolytes show rheological response of a viscoelastic material, such that the G">G' at high frequency, followed by a transition to a constant G' (>G") with a rubbery modulus ($G_0$) of 100 Pa and 500 Pa for P($FBA_{0.93}$-co-$UpyMA_{0.07}$)+LiFSI and P($FBA_{0.85}$-co-$UpyMA_{0.15}$)+LiFSI, respectively. Interestingly, we don't observe a terminal relaxation in the measured experimental frequency range, unlike the salt-free H-bonded polymers (as seen in FIG. 51), presumably due to the presence of ionic interactions and solvation networks formed by LiFSI salt as explained in the FIIR, NMR results (FIG. 41) and MD simulations (FIG. 42).

C. Simultaneously Maintaining Ion Conductivity and Mechanical Strength

We further measured ambient condition and temperature dependent ionic conductivity of the polymer electrolytes (with r=2.5), shown in FIG. 43*d* and FIG. 52, respectively. Specifically, the conductivity of PFBA+LiFSI at 25° C. is 0.34 mS/cm, while that of P($FBA_{0.93}$-co-$UpyMA_{0.07}$)+LiFSI and P($FBA_{0.85}$-co-$UpyMA_{0.15}$)+LiFSI is 0.31 mS/cm and 0.13 mS/cm, respectively (FIG. 43*d*). It is remarkable that the H-bonded polymers show only slightly lower ionic conductivity than the liquid-like PFBA electrolytes. We hypothesize that in these solid polymers, local mobility of PFBA chains is maintained in spite of incorporating the Upy network for two reasons: (1) transient nature of the supramolecular (H-bonding) chemistry and (2) low degree of dynamic crosslinking (x≤0.15). As a balance between ion conductivity and mechanical strength, the P($FBA_{0.93}$-co-$UpyMA_{0.07}$)+LiFSI is chosen to be the representative all-solid-state polymer electrolyte. We compare the temperature-dependent ionic conductivity of P($FBA_{0.93}$-co-$UpyMA_{0.07}$)+LiFSI (r=2.5) with previously reported plasticizer-free polymer electrolytes (>0.01 mS/cm) in FIG. 43*e* and Table 4 (partially adopted from recent work). Here, we classify the electrolytes in five categories: (1) branched and comb polymer, (2) block and random copolymer, (3) salt-in-polymer, (4) polymer-in-salt electrolyte, and (5) polymer composite. It is important to note that we don't include every previous study (considering the sheer volume of the same), but the figure summarizes the significant recent efforts in improving conductivity of 'fully-dry' polymers. There is no particular correlation in conductivity among the polymer composite electrolytes, while we do observe apparent relationships (with few exceptions) among the other the categories. To be specific, the ionic conductivity of branched/comb polymers is generally higher than linear polymers or blends, which is expected due to higher free volume of the prior. Similarly, polymer complexation with high content of lithium salts results in significant increase in conductivity (polymer-in-salt >salt-in-polymer), due to the formation of percolating transport pathways. Based on this analysis, we can infer that the poor segmental mobility of high molecular weight PEO polymers and their inability of dissolving large amount of metal salts (≥equimolar) lead to low ion conductivity. In the current study, the rationally designed comb-like polymer with high LiFSI content (r=2.5) yields one of the highest conductivities compared to the previous literature as shown in FIG. 43*e*.

TABLE 4

Comparing conductivity of polymer electrolytes. The number of data from each paper is limited to at most 2 and the only values higher than 0.01 mS/cm are shown.

| Polymer Electrolyte | Type | Cond. (mS/cm) | Temp. (° C.) | Ref. |
|---|---|---|---|---|
| 20% poly-Ac1b/PEO-$[LiN(CF_3SO_2)_2]_{0.125}$ | Branched/Comb | 0.63 | 80 | 43 |
| 20% poly-Ac1b/PEO-$[LiN(CF_3SO_2)_2]_{0.125}$ | Branched/Comb | 0.04 | 25 | 43 |
| P(DMS-co-EO)/$LiClO_4$ | Branched/Comb | 0.25 | 25 | 44 |
| Poly(siloxane-g-ethyleneoxide)-LiTFSI | Branched/Comb | 0.10 | 25 | 45 |
| Polysiloxane-oligoethyleneoxide)-LiTFSI | Branched/Comb | 0.16 | 25 | 46 |
| TEC:poly(oxyethylene)-tri-(oxyethylene) | Branched/Comb | 0.15 | 40 | 47 |
| TEC:poly(oxyethylene)-tri-(oxyethylene) | Branched/Comb | 1.40 | 80 | 47 |
| PEO/MEEGE-LiTFSI | Branched/Comb | 0.10 | 30 | 48 |
| PEO/MEEGE-LiTFSI | Branched/Comb | 1.00 | 80 | 48 |
| P(EO-PO)/[LiTFSI] | Branched/Comb | 1.00 | 80 | 49 |
| P(EO-MEEGE)/[LiTFSI] | Branched/Comb | 0.10 | 30 | 50 |

TABLE 4-continued

Comparing conductivity of polymer electrolytes. The number of data from each paper is limited to at most 2 and the only values higher than 0.01 mS/cm are shown.

| Polymer Electrolyte | Type | Cond. (mS/cm) | Temp. (° C.) | Ref. |
|---|---|---|---|---|
| P(EO-TEC)/[LiClO4] | Branched/Comb | 0.10 | 30 | 51 |
| Poly(siloxane-g-oligo(ethyleneoxide))tetraacrylate-$LiCF_3SO_3$ | Branched/Comb | 0.06 | 30 | 52 |
| (PEO-Psi)/[LiCF3SO3] | Block/Random | 0.03 | 25 | 53 |
| (PEO-Psi)/[LiCF3SO3] | Block/Random | 0.53 | 85 | 53 |
| di-urethanesil hybrids doped with LiCF3SO3 | Block/Random | 0.07 | 24 | 54 |
| PEO-b-PSLiTFSI copolymers | Block/Random | 0.13 | 80 | 55 |
| PEO-b-PSLiTFSI copolymers | Block/Random | 0.05 | 60 | 55 |
| S(EO)3 | Block/Random | 0.11 | 70 | 56 |
| S(EO)3 | Block/Random | 0.01 | 30 | 56 |
| (PEO-b-0(PMMA-ran-PMAALi))/[LiBOB] | Block/Random | 0.01 | 21 | 34 |
| (PEO-PS)/[LiTFSI] | Block/Random | 0.10 | 60 | 57 |
| PEC-PEO | Block/Random | 0.8 | 60 | 58 |
| Poly(Ethylene Oxide Carbonate) | Block/Random | 0.12 | 70 | 59 |
| P(PO)/LiClO4 | salt-in-polymer | 0.10 | 50 | 60 |
| MEEP/LiCF3SO3 | salt-in-polymer | 0.01 | 25 | 61 |
| P(Si)32/LiN(CF3SO2)2 | salt-in-polymer | 0.45 | 25 | 62 |
| Polysiloxane-PVDF-LiTFSI | salt-in-polymer | 0.06 | 25 | 63 |
| Poly(ethylene adipate) with LiClO4 | salt-in-polymer | 0.01 | 30 | 64 |
| PAN:(LiClO4) | salt-in-polymer | 0.03 | 25 | 65 |
| PAN:LiTFSI | salt-in-polymer | 0.10 | 90 | 66 |
| PEO/LiASF6 | salt-in-polymer | 0.14 | 25 | 67 |
| P(EO)24/LiN(CF3SO2)2 | salt-in-polymer | 0.38 | 50 | 68 |
| POE-perfluorosulfonates | salt-in-polymer | 0.20 | 70 | 69 |
| $(PEO)_8LiCF_3SO_3$ | salt-in-polymer | 0.22 | 100 | 70 |
| $(PEO)_8LiCF_3SO_3$ | salt-in-polymer | 0.04 | 60 | 70 |
| (PEO-PMMA)/[LiCF3SO3] | salt-in-polymer | 0.02 | 30 | 71 |
| (PEO-ENR50)/[LiCF3SO3] | salt-in-polymer | 0.14 | 25 | 72 |
| (PEO-P(VDF-TrFE))/[LiClO4] | salt-in-polymer | 0.70 | 25 | 73 |
| (PEO-PPC)/[LiClO4] | salt-in-polymer | 0.07 | 25 | 74 |
| PEC-LiTFSI | polymer-in-salt | 0.47 | 20 | 75 |
| PEC-LiTFSI | polymer-in-salt | 1.32 | 40 | 75 |
| poly(dodecamethylene carbonate) + LiTFSI | polymer-in-salt | 0.10 | 25 | 76 |
| (PSBMC) | polymer-in-salt | 0.06 | 30 | 77 |
| (PSBDC) | polymer-in-salt | 0.15 | 30 | 77 |
| PCOA + LiBOB | polymer-in-salt | 0.20 | 20 | 78 |
| PCOA + LiBOB | polymer-in-salt | 0.41 | 40 | 78 |
| PVICO-LiCF3SO3 | polymer-in-salt | 0.10 | 60 | 79 |
| Poly(AclM/VC)-LiTFSI | polymer-in-salt | 0.70 | 80 | 80 |
| PEEC-LiTFSI | polymer-in-salt | 1.00 | 80 | 81 |
| PEEC-LiTFSI | polymer-in-salt | 0.40 | 60 | 81 |
| Poly(Ionic Liquid)s-in-Salt Electrolytes | polymer-in-salt | 0.07 | 80 | 82 |
| poly(ethylene oxide-co-ehtylene carbonate)-LiCl04 | polymer composites | 0.10 | 30 | 83 |
| PEGMA-(MA-POSS)-EGDMA)/[LiTFSI] | polymer composites | 0.16 | 60 | 84 |
| PEGMA-(MA-POSS)-EGDMA)/[LiTFSI] | polymer composites | 0.06 | 60 | 84 |
| (SPP13-(PEG-POSS))/[LiTFSI] | polymer composites | 0.05 | 30 | 85 |
| (PPG-PEG-PPG)-D2000)/[LiClO4] | polymer composites | 0.06 | 30 | 86 |
| PEO/LiClO4-TiO2 Nanorods | polymer composites | 2.64 | 100 | 87 |
| PEO/LiClO4-TiO2 Nanorods | polymer composites | 0.10 | 40 | 87 |
| in situ CPE | polymer composites | 1.20 | 60 | 88 |
| in situ CPE | polymer composites | 0.04 | 30 | 88 |
| PI/PEO/LiTFSI | polymer composites | 0.23 | 30 | 89 |
| PEO-Aligned nanowires | polymer composites | 0.06 | 30 | 90 |
| $(PEO)_8LiClO_4$-1.4% $BaTiO_3$ (0.6-1.2 μm) | polymer composites | 1.20 | 70 | 91 |
| ($FBA_{0.93}$-co-$UpyMA_{0.07}$)_LiFSI (r = 2.5) | Comb & polymer-in-salt | 0.31 | 25 | This work |
| ($FBA_{0.93}$-co-$UpyMA_{0.07}$)_LiFSI (r = 2.5) | Comb & polymer-in-salt | 0.86 | 60 | This work |
| ($FBA_{0.85}$-co-$UpyMA_{0.15}$)_LiFSI (r = 2.5) | Comb & polymer-in-salt | 0.13 | 25 | This work |
| ($FBA_{0.85}$-co-$UpyMA_{0.15}$)_LiFSI (r = 2.5) | Comb & polymer-in-salt | 0.34 | 60 | This work |

D. Electrochemical Characterizations and Battery Performance

We finally evaluate the solid polymer electrolyte, P($FBA_{0.93}$-co-$UpyMA_{0.07}$)+LiFSI (r=2.5), that has comparable conductivity to the PFBA+LiFSI (r=2.5), for application in all-solid-state lithium metal batteries (FIG. 44). First, we design a symmetric cell with lithium metal electrodes, separated by this solid electrolyte (no plasticizer, thickness ~300 μm). Galvanostatic charge and discharge tests were performed at room temperature (25° C.), using a current density of 0.02 $mA/cm^2$ with each half cycle being one hour long. The voltage profile is shown in FIG. 44*a*, in which the inset shows the zoomed-in profiles. We find that the cell cycles uniform voltage plateaus and with no sign of failure for at least 500 hours. We also show that the overpotentials in the symmetric cell cycling is dependent of the operating current density in FIG. 53. In order to evaluate the stability with the solid electrolytes, we utilized scanning electron microscopy (SEM) and analyzed the morphology of electrodeposited 0.2 $mAh/cm^2$ of lithium on a copper electrode at 0.02 $mA/cm^2$. FIG. 44*b* shows the lithium deposits to be uniform and smooth, unlike dendritic features that have been observed using conventional liquid electrolytes. Most solid electrolytes using PEO-based polymers require elevated temperature (over 60° C.) to operate because of their crystallinity behavior. We, therefore analyze the stability of our solid polymer electrolyte when operated at 60° C. Specifically, we find an order of magnitude decrease in the interfacial resistance compared to that at 25° C. (FIG. 54) and lower overpotential response in cycling measurements at 60° C. (FIG. 55). We also compared the stability of our solid polymer with traditional PEO+LiFSI electrolytes (M.W.=100 kD, r=0.1) in symmetric cell cycling at 60° C. (FIG. 44*c*) using a current density of 0.05 mA/$cm^2$ (each half cycle is one hour long). It is observed that there is a sudden drop in the voltage profile at about 75 hours using the PEO electrolyte (inset of FIG. 44*c*) that indicates dendrite induced internal short-circuiting. In contrary, the PFBA-based solid electrolyte shows significantly enhanced cycling behavior, although the growth in the plateau voltage value (overpotential) was observed after 150 hours, which is hypothesized to be an effect of side-reactions.

The oxidative stability of $P(FBA_{0.93}$-co-$UpyMA_{0.07})$+LiFSI (r=2.5) and PEO+LiFSI (M.W.=100 kD, r=0.1) solid electrolytes were evaluated using linear scan voltammetry in a Li||stainless steel cell with a scan rate of 10 mV/s at 60° C. (FIG. 44*d*). As expected for PEO based electrolytes, we find high anodic current above 3.8 V vs. $Li/Li^+$; however, the fluorinated solid electrolyte enhances the oxidative window >4.5 V vs. $Li/Li^+$. This extended stability enables the application in a high voltage lithium metal battery comprising of NMC622 cathodes. We design a polymeric cathode comprising of 55% active material, 40% PFBA/LiFSI and 5% conducting carbon to allow efficient ionic and electronic pathways even in absence of any liquid. This polymeric NMC622 electrode (0.7 mAh/$cm^2$) was paired against a lithium metal and $P(FBA_{0.93}$-co-$UpyMA_{0.07})$+LiFSI (r=2.5) was used as the solid polymer electrolyte (thickness ~300 μm) to form an all-solid-state battery. FIG. 44*e* shows the cycling performance at C/10 rate, at 60° C. and in absence of any plasticizer or additive. Impedance spectroscopy measurements before cycling and after 2 initial cycles (FIG. 56) show a decrease in the interfacial impedance due to formation of a stable interfacial layer. The cycling results of the Li||NMC cell in FIG. 44*e* shows a capacity retention of over 70% h after 100 cycles. Although many liquid-based electrolytes in the past have shown even superior retention-rate than shown here, we believe this is among the first works that enable high-voltage lithium metal battery cycling (upper cutoff limit being 4.3V) using a solid-state polymer electrolyte, in absence of any plasticizer. Future engineering efforts of reducing electrolyte thickness or increasing modulus using chemical design strategies elaborated in this work, can further boost the battery performance.

E. Conclusions

In conclusion, we show a chemistry-driven approach of decoupling the ion transport and electrochemical stability in polymer electrolytes. A first-principle study showed that selective fluorination of the polyether monomers causes delocalization of electron clouds on the ether molecules that results in poor electron-donating capability at oxidative surfaces (high voltage cathodes), without significantly affecting its solvation ability with metal salts. Based on this prediction, we synthesized poly(fluorinated butyl acrylate) or PFBA polymers that showed lower glass transition temperature, similar ion conductivity and enhanced oxidative voltage as compared to conventional polymer electrolytes based on poly(ethylene glycol acrylate). These PFBA polymers can dissolve significant amount of LiFSI, up to a monomer-to-salt ratio (r) of 2.5. At this high salt content, the polymer electrolytes showed high ionic conductivity and low viscosity at room temperature. This was rationalized using spectroscopic studies and molecular simulations that showed formation of ionic aggregates and complex solvation structures comprising of $Li^+$, $FSI^-$ as well as polymeric moieties. Further, we incorporated low degree of dynamic crosslinking using supramolecular (H-bonding) functionalities that essentially preserves the 'liquid-like' ionic conductivity (0.31 mS/cm) at room temperature by maintaining local segmental mobility, while the polymer has 'solid-like' mechanics ($G_0$=100 Pa) as seen from rheological measurement. Owing to several desired characteristics of conductivity, electrochemical stability, processability, we were able to demonstrate stable cycling of symmetric lithium cells at room temperature and in a battery comprising of NMC622 based high voltage cathode.

Methods

F. Density Functional Theory (DFT) Calculations

The molecular geometries for the ground states were optimized by density functional theory (DFT) at the B3LYP/6-311G+(d,p) level. And then the energy of molecules were evaluated at the DFT-B3LYP/6-311G+(d,p). The bonding energy was calculated from the energy difference between starting structure and products after bond breakage. All the DFT calculations were carried out with the Gaussian 09 package.

G. Molecular Dynamic Simulations

Optimized Potentials for Liquid Simulations all atom (OPLS-AA) was used to describe interactions between atoms in all the systems. The partial charges of the polymer atoms were obtained by fitting electrostatic potential using B3LYP functional with basis set 6-311++g(d,p) in Gaussian 09. A cutoff of 12 Å was used to calculate both Lennard-Jones interactions and the real part of electrostatic interactions, and the particle-mesh Ewald method was used to evaluate the long-range electrostatic interactions with a grid spacing of 1.2 Å. We used a dielectric constant of 2.0 to account for electronic screening in nonpolarizable force fields. To build a simulation box, 12 chains of FBA polymers, each with 25 monomers, were randomly loaded to a cubic box of 15 nm. Corresponding number of ions were then added for systems with varying salt amount. The simulation boxes were first compressed under 1000 bar for 2 ns and then equilibrated under 1 bar for 10 ns. Production runs lasted for 20 ns. MD simulations were conducted using Gromacs 2018.

H. Material Preparation

The detailed synthesis procedure of PFBA, PBA, PEGA and P(FBA-co-UpyMA) is provided in the Supplementary Information. The PFBA, PBA, PEGA and PEO (M.W.=100,000, Sigma Aldrich) based electrolytes were prepared by first dissolving the polymers in anhydrous THF (Sigma Aldrich) in 1 g/ml concentration in a vial bottle, while the P(FBA-co-UpyMA) solid polymer was dissolved in a mixture of anhydrous THF and anhydrous chloroform (Sigma Aldrich), thereafter mixing appropriate amounts of pre-dissolved LiFSI (Solvay) salt in anhydrous THF (1 g/ml) in the polymer solution. The electrolyte solutions were stirred overnight in a glovebox (Vigor, oxygen <0.01 ppm, water <0.01 ppm) to ensure complete dissolution. The solvent was removed by rotovaping for one hour at 60° C., followed by drying at 90° C. under high vacuum in an oven for at least 48 hours. The electrolytes were there-after transferred to the glovebox and further annealed overnight at 90° C. $LiNi_{0.6}Mn_{0.2}Co_{0.2}O_2$ (NMC622) powders (Electrodesandmore), PFBA/LiFSI (r=2.5) and carbon black (TIMCAL) (55:40:5 by weight) were mixed in NMP/THF (v:v=9:1) using a speed mixer. The slurry was then cased on Al foil using doctor blading technique followed by drying at 90° C. in vacuum oven for at least 24 hours. The active material loading of the NMC cathodes was 0.7 $mAh/cm^2$.

I. Material Characterizations $^1H$, $^{13}C$, and $^{19}F$, $^7Li$ NMR spectra were obtained on a Varian Mercury 400 MHz and Varian Inova 300 MHz instruments. The $^7Li/^{19}F$ shift analyses were done at 90° C. for better signal-to-noise ratio. For the NMR shift measurements, the pre-made PFBA+LiFSI electrolytes were re-dissolved in anhydrous THF and the solutions were filled into NMR tubes inside a glovebox, followed by rigorous drying at 90° C. under vacuum for at least 48 hours. FTIR spectra were measured using a Nicolet iS50 FT/IR Spectrometer with a diamond ATR attachment. We utilized FEI Magellan 400 XHR SEM was used for SEM characterizations. Before the SEM measurement, the electrodeposited copper was washed in THF to remove the remaining electrolyte. DSC measurements were done in a TA Instrument Q2000. The samples for DSC were cooled to −90° C., followed by heating up to 80° C. at a rate of 5° C./min, to remove thermal history before the measurement at the same rate. The molecular weight was measured using a Tosoh Ambient Room-Temperature GPC using polymer solution of 1 mg/ml in THF. The rheological measurements were done using an ARES 02 rheometer (TA Instruments) with an advanced Peltier system (APS) at variable temperatures. An 8 mm diameter parallel plate geometry was used for all measurements. The complex viscosity for the PFBA electrolytes were obtained at 25° C. using frequency sweep measurements in the linear viscoelastic region (strain <2%) from high to low frequency ranges until a plateau is observed in the viscosity. The time-temperature-superposition for the polymer electrolytes were also done in the linear viscoelastic region between the frequency range of 100 rad/sec to 0.1 rad/sec between 0° C. to 125° C. The obtained frequency sweep curves were shift horizontally and vertically, with the data at 25° C. as reference to obtain the master curves.

J. Electrochemical Measurements

All electrochemical tests were done using 2032-type coin cells (MTI). All cell fabrications were done in Argon-filled glovebox. 750 µm Li foils (Alfa Aesar) were used for Li||Li, Li||stainless steel, Li||copper and Li||NMC622 cells. No plasticizer/solvent was used in any cell-configuration. No separator was utilized, instead an in-house made PTFE O-ring between the electrodes in all cases was used to prevent any internal short-circuits. The outer diameter of the O-ring was 1 $cm^2$, while inner was 0.32 $cm^2$ and the thickness being ~300 µm. In a typical Li||NMC full cell construction, the solid polymer electrolyte was re-dissolved in an anhydrous THF to form a viscous slurry and doctor-bladed onto the NMC electrode, followed by rigorous drying at 60° C. for 24 hours on a hot plate inside the glovebox. The solid-electrolyte coated electrodes were further-heated in a vacuum oven 90° C. for 48 hours to exclude any residual solvent, before transferring back to the glove-box and annealing at 90° C. overnight. The direct formation of solid polymer electrolytes on the electrode surface allows intimate contact between polymer chains and the electrode materials, as noted in previous studies. All fabricated batteries were baked at 60° C. for 24 hours in an ESPEC environmental chamber before operation to ensure low electrode-electrolyte contact resistances. The measurements and cycling tests were carried out on a Biologic VMP3 system. The electrochemical impedance spectroscopy (EIS) measurements were done over a range of 7 MHz to 100 mHz. In the EIS measurements for conductivity analysis, symmetric cells with blocking electrodes (stainless steel) were used. The interfacial resistance analysis and long-term plate-strip measurements were done in Li||Li configuration. The linear sweep voltammetry tests were performed in Li||stainless steel cell at 60° C. in a range of 1.5 to 6.5V at a rate of 10 mV/sec. For the electrodeposition tests, we design Li||Cu cell and plated 0.2 $mAh/cm^2$ of lithium onto copper electrode at 25° C. The Li||NMC full cell was cycled at C/10 charge/discharge rates. A constant-current-constant-voltage (CC-CV) protocol was also used to hold the voltage for either 2 hours or until current dropped below C/20. The voltage range of cycling was between 2.7 to 4.3 V. All cells were cycled under controlled temperature in an ESPEC environmental chamber.

Synthesis

K. Synthesis of 4-methoxybutan-1-ol: MBO

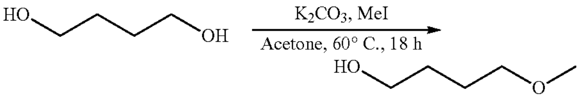

The MBO was synthesized by one-step mono-methylation: To a round-bottom flask were added dry acetone (Sigma Aldrich), 1,4-butanediol (Sigma Aldrich), 1.2 equivalents of $K_2CO_3$ (Sigma Aldrich), and 1.2 equivalents of MeI (Sigma Aldrich). The suspension was heated to 60° C. to reflux for 18 hours. The mixture was then filtered off and the solvents were removed under vacuo. The crude product was vacuum distilled to yield the final product as colorless liquid. Yield: ~80%.

$^1H$ NMR (400 MHz, $CDCl_3$, δ/ppm): 3.60-3.59 (m, 2H), 3.40-3.38 (m, 211), 3.31 (s, 3H), 2.84 (s, 1H), 1.66-1.61 (m, 4H). $^{13}C$ NMR (100 MHz, $CDCl_3$, δ/ppm): 72.99, 62.76, 58.78, 30.23, 26.86.

L. Synthesis of 2,2,3,3-tetrafluoro-4-methoxybutan-1-ol: FMBO

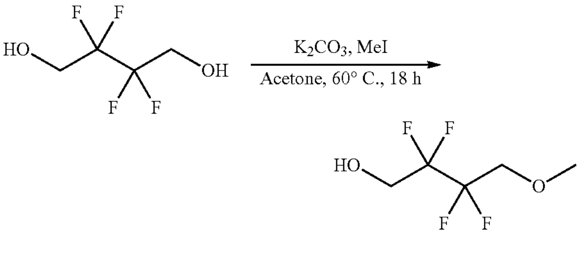

The FMBO was synthesized by one-step mono-methylation: To a round-bottom flask were added dry acetone, 2,2,3,3-tetrafluoro-1,4-butanediol (Synquest), 1.2 equivalents of $K_2CO_3$, and 1.2 equivalents of MeI. The suspension was heated to 60° C. to reflux for 18 hours. The mixture was then filtered off and the solvents were removed under vacuo. The crude product was vacuum distilled to yield the final product as colorless liquid. Yield: ~80%.

$^1$H NMR (400 MHz, d$^6$-DMSO, δ/ppm): 5.83-5.79 (t, 1H), 3.89-3.76 (m, 4H), 3.37 (s, 3H).

$^{13}$C NMR (100 MHz, d$^6$-DMSO, δ/ppm): 119.82-114.73, 69.47-68.99, 60.19, 59.70-59.20.

$^{19}$F NMR (376 MHz, d$^6$-DMSO, δ/ppm): −121.98−-122.07, −123.74−-123.83.

M. One Pot Synthesis of poly(2-(((2,2,3,3-tetrafluoro-4-methoxybutoxy)carbonyl)amino)ethyl acrylate): PFBA

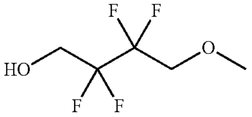

+

-continued

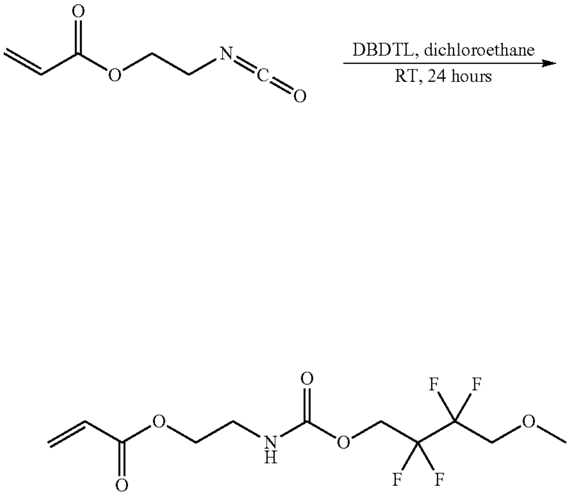

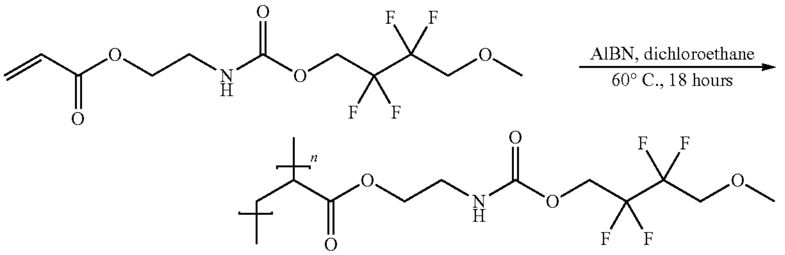

The PFBA was synthesized using a two-step one pot reaction: FBA was synthesized in a round-bottom flask, where, dry dichloroethane (Sigma Aldrich), FMBO, 1 equivalent of 2-isocyanatoethyl acrylate (IEA) (TCI Chemicals) and 2 drops of DBDTL catalyst (Sigma Aldrich) were added and stirred under $N_2$ atmosphere at room temperature for 24 hours. In the next step, 0.1 equivalents AIBN (Sigma Aldrich) was added to the same flask and $N_2$ was bubbled into to the solution for 24 hours to remove any residual $O_2$. Finally, the solution was heated at 60° C. in $N_2$ atmosphere for the free radical polymerization. The polymer solution was concentrated using a rotary evaporator to roughly 50% of the original volume and hexane (Sigma Aldrich) was poured into it to precipitate the polymer. A viscous oily precipitate appeared at the bottom of the flask that was allowed to settle for 30 minutes, thereafter the upper clear solution was decanted, and the leftover precipitate was re-dissolved in dichloroethane. This dissolution-precipitation-decantation process was repeated three times for purification and the final product was dried at 90° C. under vacuum.

N. One Pot Synthesis of poly2-(((4-methoxybutoxy)carbonyl)amino)ethyl acrylate: PBA

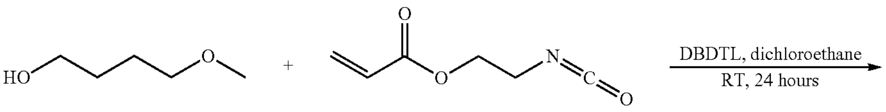

-continued

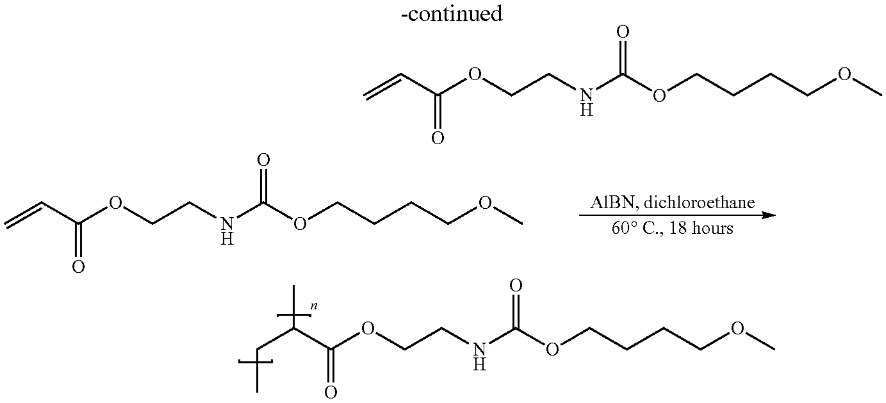

The PBA was synthesized using a two-step one pot reaction: BA was synthesized in a round-bottom flask, where, dry dichloroethane, MBO, 1 equivalent of 2-isocyanatoethyl acrylate and 2 drops of DBDTL catalyst were added and stirred under $N_2$ atmosphere at room temperature for 24 hours. In the next step, 0.1 equivalents AIBN was added to the same flask and $N_2$ was bubbled into to the solution for 24 hours to remove any residual $O_2$. Finally, the solution was heated at 60° C. in $N_2$ atmosphere for the free radical polymerization. The polymer solution was concentrated using a rotary evaporator to roughly 50% of the original volume and hexane was poured into it to precipitate the polymer. A viscous oily precipitate appeared at the bottom of the flask that was allowed to settle for 30 minutes, thereafter the upper clear solution was decanted, and the leftover precipitate was re-dissolved in dichloroethane. This dissolution-precipitation-decantation process was repeated three times for purification and the final product was dried at 90° C. under vacuum.

O. One Pot Synthesis of poly(2-(((2-methoxyethoxy)carbonyl)amino)ethyl acrylate): PEGA

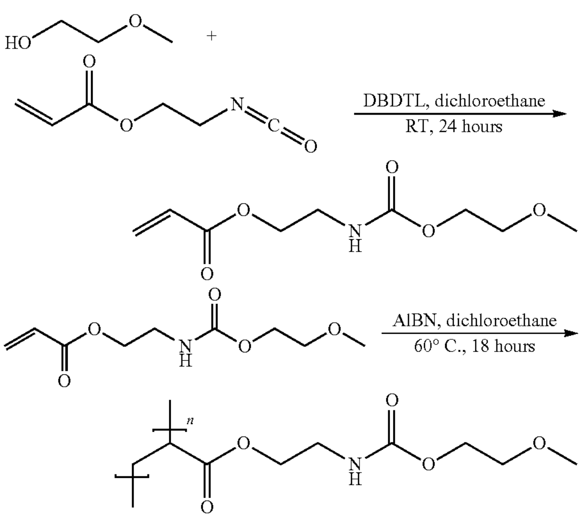

The PEGA was synthesized using a two-step one pot reaction: EGA was synthesized in a round-bottom flask, where, dry dichloroethane, 2-methoxyethan-1-ol (Sigma Aldrich), 1 equivalent of 2-isocyanatoethyl acrylate and 2 drops of DBDTL catalyst were added and stirred under $N_2$ atmosphere at room temperature for 24 hours. In the next step, 0.1 equivalents AIBN was added to the same flask and $N_2$ was bubbled into to the solution for 24 hours to remove any residual $O_2$. Finally, the solution was heated at 60° C. in $N_2$ atmosphere for the free radical polymerization. The polymer solution was concentrated using a rotary evaporator to roughly 50% of the original volume and hexane was poured into it to precipitate the polymer. A viscous oily precipitate appeared at the bottom of the flask that was allowed to settle for 30 minutes, thereafter the upper clear solution was decanted, and the leftover precipitate was re-dissolved in dichloroethane. This dissolution-precipitation-decantation process was repeated three times for purification and the final product was dried at 90° C. under vacuum.

P. Synthesis of 2-(3-(6-methyl-4-oxo-1,4-dihydropyrimidin-2-yl)ureido)ethyl Methacrylate: UpyMA

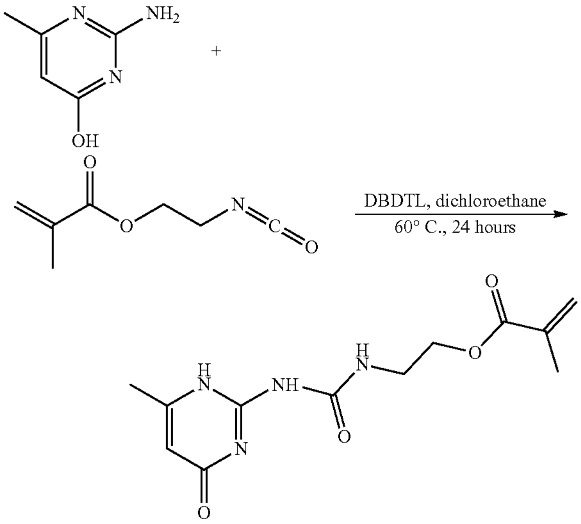

The UpyMA was synthesized using a urethane reaction: In a round-bottom flask, dry dichloroethane, 2-amino-6-methylpyrimidin-4-ol (Sigma Aldrich), 1 equivalent of 2-isocyanatoethyl methacrylate (Sigma Aldrich) and 2 drops of DBDTL catalyst were added and stirred under $N_2$ atmosphere at 60° C. for 24 hours. After the completion of reaction, we concentrated the solution to about 50% of the original volume and hexane was poured into it to form the precipitate that appeared to be white-colored and settled at the bottom. The upper clear solution was decanted, and the leftover precipitate was re-dissolved in dichloroethane. This dissolution-precipitation-decantation process was repeated three times for purification and the final product was dried at 60° C. under vacuum.

Q. Synthesis of poly(2-(((2,2,3,3-tetrafluoro-4-methoxybutoxy)carbonyl)amino)ethyl acrylate)-co-(2-(3-(6-methyl-4-oxo-1,4-dihydropyrimidin-2-yl)ureido)ethyl methacrylate)): P(FBA-co-UpyMA)

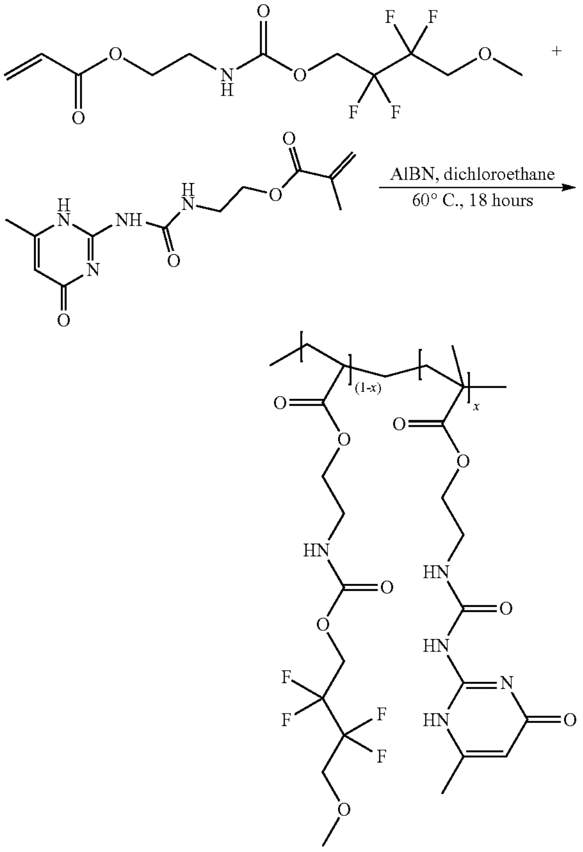

P(FBA-co-UpyMA) copolymers were synthesized by free-radical polymerization: In a round-bottom flask, dry dichloromethane, (1-x) equivalent of FBA, 0.1 equivalents AIBN and x equivalents of UpyMA were added. In two separate variations of the same reaction x was taken as 0.07 and 0.15. $N_2$ was bubbled into to the solution for 24 hours to remove any residual $O_2$, followed by heating the solution at 60° C. in $N_2$ atmosphere for the free radical polymerization. The polymer solution was concentrated using a rotary evaporator to roughly 50% of the original volume and hexane was poured into it to precipitate the polymer. A viscous oily/white precipitate appeared at the bottom of the flask that was allowed to settle for 30 minutes, thereafter the upper clear solution was decanted, and the leftover precipitate was re-dissolved in dichloroethane. This dissolution-precipitation-decantation process was repeated three times for purification and the final product was dried at 90° C. under vacuum.

As used herein, the singular terms "a," "an," and "the" include plural referents unless the context clearly dictates otherwise. Thus, for example, reference to an object can include multiple objects unless the context clearly dictates otherwise.

As used herein, the terms "substantially," "substantial," "approximately," and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A layer of a battery and/or a solvent for an electrolyte of a battery, which is a compound represented by the chemical formula (I):

(I)

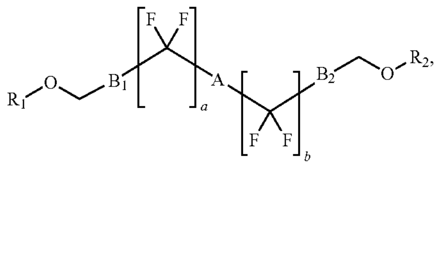

wherein $R_1$ and $R_2$ are independently selected from $C_1$-$C_5$ alkyl groups, fluoroalkyl groups and silicon-containing groups, A is a bond or is selected from $C_1$-$C_{12}$ alkylene groups, silicon-containing groups, and ether groups, $B_1$ and $B_2$ are independently selected from bonds and $C_1$-$C_3$ alkylene groups, a is 1, and b is 0 or 1.

2. The layer of a battery and/or solvent of claim 1, wherein $B_1$ and $B_2$ are bonds, and the compound is represented by the chemical formula:

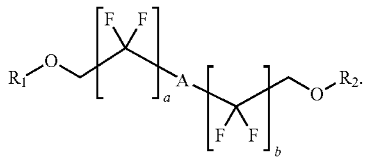

3. The layer of a battery and/or solvent of claim 2, wherein A is a bond, and the compound is represented by the chemical formula:

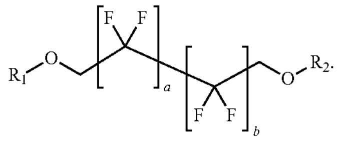

4. The layer of a battery and/or solvent of claim 3, wherein $R_1$=$R_2$=methyl, and the compound is represented by the chemical formula:

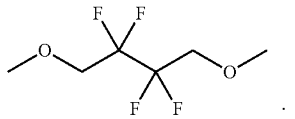

5. The layer of a battery and/or solvent of claim 1, wherein a and b are 1.

6. The layer of a battery and/or solvent of claim 1, wherein a is 1 and b is 0, and $R_1$ and $R_2$ are selected from $CH_3$, $CF_3$, $CH_2CH_3$, $CH_2CH_2F$, $CH_2CHF_2$, and $CH_2CF_3$, wherein at least one of $R_1$ and $R_2$ is $CF_3$, $CH_2CH_2F$, $CH_2CHF_2$, or $CH_2CF_3$.

7. An electrolyte of a battery, comprising the compound of claim 1, and (a) a lithium salt, potassium salt, sodium salt, or a mixture thereof, or (b) at least one of ethylene carbonate (EC), propylene carbonate (PC), dimethyl carbonate (DMC), diethyl carbonate (DEC), ethyl methyl carbonate (EMC), vinyl carbonate (VC), fluoroethylene carbonate (FEC), difluoroethylene carbonate (DFEC), 1,2-dimethyoxylethane (DME), 1,3-dioxolane (DOL), 1,4-dioxane (DOX), tetrahydrofuran (THF), 1,3,2-dioxathiolane-2,2-dioxide (DTD), 1,3-propanesultone (PS), acetonitrile (AN), ethyl acetate (EA), methyl acetate (MA), methyl propanoate (MP), succinonitrile (SN), Trimethyl phosphate (TMP), triethyl phosphate (TEP); tris(trimethylsilyl)phosphate (TTSP), prop-1-ene-1,3-sultone (PES), ethylene sulfite (ES), 1,4-butane sultone (BS), dimethyl sulfoxide (DMSO), methylene methanedisulfonate (MMDS), N,N-Dimethylformamide (DMF), and gamma-butyrolactone (BL).

8. The electrolyte of claim 7, wherein an amount of the solvent in the electrolyte is at least about 60% by weight of a total weight of the electrolyte.

9. A battery comprising:

an anode structure including an anode current collector;

a cathode structure including a cathode current collector and a cathode material disposed on the cathode current collector; and the electrolyte of claim 6 disposed between the anode structure and the cathode structure.

10. The battery of claim 9, wherein the anode structure further includes an anode material disposed on the anode current collector, and the anode material includes lithium metal, graphite, silicon, or a graphite/silicon composite anode.

11. A layer of a battery, comprising a polymer which includes a backbone and side chains bonded to the backbone, and at least one of the side chains includes a moiety represented by the chemical formula:

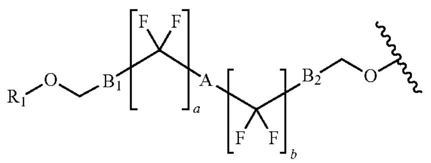

wherein $R_1$ is selected from $C_1$-$C_5$ alkyl groups, fluoroalkyl groups, and silicon-containing groups, A is a bond or is selected from $C_1$-$C_{12}$ alkylene groups, silicon-containing groups, and ether groups, $B_1$ and $B_2$ are independently selected from bonds and $C_1$-$C_3$ alkylene groups, a is 1, and b is 0 or 1.

12. The layer of a battery of claim 11, wherein a and b are 1.

13. The layer of a battery of claim 11, wherein a and b are 0, and $R_1$ is selected from $CF_3$ and $CH_2CF_3$.

14. The layer of a battery of claim 11, wherein the layer of the battery is a binder of a battery electrode, an ex-situ independent coating layer on the surface of a battery electrode, a chemically linked/modified layer(s) on the surface of a battery electrode or a matrix for an inorganic organic composite electrolyte.

15. A battery comprising:

an anode structure including an anode current collector;

a cathode structure including a cathode current collector and a cathode material disposed on the cathode current collector; and the layer of claim 11 disposed as a solid electrolyte between the anode structure and the cathode structure.

16. The battery of claim 15, wherein the anode structure further includes an anode material disposed on the anode current collector, and the anode material includes lithium metal, graphite, silicon, or a graphite/silicon composite.

17. An electrode structure comprising:

a current collector; and the layer of claim 11 disposed as an interfacial coating on the current collector.

18. The electrode structure of claim 17, further comprising an electrode material disposed between the current collector and the interfacial coating.

19. A layer of a battery, comprising a polymer which is represented by the chemical formula:

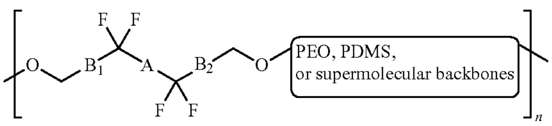

wherein A is a bond or is selected from $C_1$-$C_{12}$ alkylene groups, silicon-containing groups, and ether groups, $B_1$ and $B_2$ are independently selected from bonds and $C_1$-$C_3$ alkylene groups, and n is an integer that is 1 or greater than 1.

20. A layer of a battery, comprising a polymer which is represented by the chemical formula:

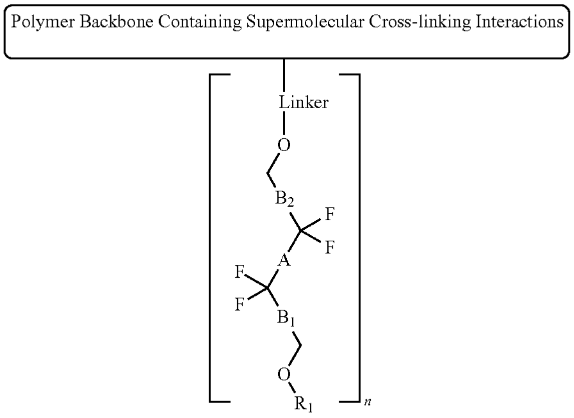

wherein $R_1$ is selected from $C_1$-$C_5$ alkyl groups and silicon-containing groups, A is a bond or is selected from $C_1$-$C_{12}$ alkylene groups, silicon-containing groups, and ether groups, $B_1$ and $B_2$ are independently selected from bonds and $C_1$-$C_3$ alkylene groups, and n is an integer that is 1 or greater than 1.

21. A layer of a battery, comprising a polymer which is represented by the chemical formula:

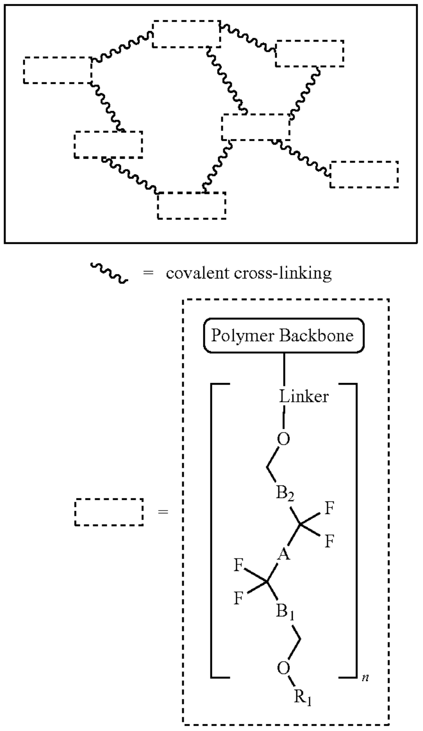

wherein $R_1$ is selected from $C_1$-$C_5$ alkyl groups and silicon-containing groups, A is a bond or is selected from $C_1$-$C_{12}$ alkylene groups, silicon-containing groups, and ether groups, $B_1$ and $B_2$ are independently selected from bonds and $C_1$-$C_3$ alkylene groups, and n is an integer that is 1 or greater than 1.

22. A layer of a battery comprising a compound of Formula (I), or an oligomer or polymer or 2D polymer or inorganic organic framework that incorporates the compound of Formula (I), (I)

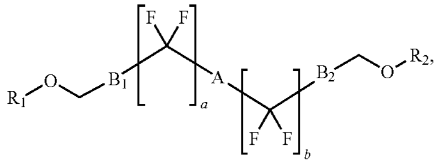

wherein $R_1$ and $R_2$ are independently selected from $C_1$-$C_5$ alkyl groups, fluoroalkyl groups and silicon-containing groups, A is a bond or is selected from $C_1$-$C_{12}$ alkylene groups, silicon-containing groups, and ether groups, $B_1$ and $B_2$ are independently selected from bonds and $C_1$-$C_3$ alkylene groups, a is 1 and b is 0 or 1.

23. The layer of a battery of claim 22, wherein the compound of Formula (I) is incorporated into an oligomer or polymer or 2D polymer or inorganic organic framework through a bond and optional linker at $R_1$ and/or $R_2$.

* * * * *